(12) United States Patent
Bessios et al.

(10) Patent No.: US 7,180,958 B2
(45) Date of Patent: *Feb. 20, 2007

(54) TECHNIQUE FOR UTILIZING SPARE BANDWIDTH RESULTING FROM THE USE OF A TRANSITION-LIMITING CODE IN A MULTI-LEVEL SIGNALING SYSTEM

(75) Inventors: Anthony Bessios, Fremont, CA (US); William Stonecypher, San Jose, CA (US); Carl Werner, Los Gatos, CA (US); Jared Zerbe, Woodside, CA (US)

(73) Assignee: Rambus Inc., Los Altos, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/849,153

(22) Filed: May 20, 2004

(65) Prior Publication Data

US 2004/0208257 A1    Oct. 21, 2004

Related U.S. Application Data

(63) Continuation-in-part of application No. 10/314,985, filed on Dec. 10, 2002.

(51) Int. Cl.
H04L 25/34    (2006.01)
H04L 25/49    (2006.01)

(52) U.S. Cl. ..................................... 375/286
(58) Field of Classification Search ........ 375/286–294, 375/353

See application file for complete search history.

(56) References Cited

U.S. PATENT DOCUMENTS

| | | | |
|---|---|---|---|
| 3,733,550 A * | 5/1973 | Tazaki et al. ............... | 375/288 |
| 3,754,237 A | 8/1973 | de Laage de Meux | |
| 3,781,686 A * | 12/1973 | Ching ........................ | 375/245 |
| 3,940,694 A * | 2/1976 | Price et al. ................. | 708/277 |
| 3,988,676 A * | 10/1976 | Whang ....................... | 375/293 |
| 4,408,189 A | 10/1983 | Betts et al. | |
| 4,486,739 A | 12/1984 | Franaszek et al. | |
| 4,495,626 A | 1/1985 | Brunin et al. | |
| 4,524,462 A * | 6/1985 | Cottatelucci ................ | 398/79 |
| 4,665,517 A | 5/1987 | Widmer | |
| 4,667,337 A | 5/1987 | Fletcher | |
| 4,855,742 A | 8/1989 | Verboom | |
| 5,142,167 A | 8/1992 | Temple et al. | |
| 5,655,078 A | 8/1997 | Anderson et al. | |

(Continued)

OTHER PUBLICATIONS

Mrcea R. Stan et al., "Coding a terminated bus for low power," Great Lakes Sympon VLSI., Mar. 1995, pp. 70-73.

(Continued)

*Primary Examiner*—Don N. Vo
(74) *Attorney, Agent, or Firm*—Hunton & Williams LLP

(57) ABSTRACT

A technique for utilizing spare bandwidth resulting from the use of a transition-limiting code in a multi-level signaling system is disclosed. In one particular exemplary embodiment, the technique may be realized as a method for utilizing spare bandwidth resulting from the use of a transition-limiting code in a multi-level signaling system, wherein the transition-limiting code has a characteristic such that at least one signal level is periodically unused. The method comprises utilizing the at least one periodically unused signal level in a codeword that has been encoded using the transition-limiting code so as to represent additional information in the multi-level signaling system.

45 Claims, 39 Drawing Sheets

U.S. PATENT DOCUMENTS

| | | |
|---|---|---|
| 5,903,231 A | 5/1999 | Emelko |
| 5,999,571 A | 12/1999 | Shin et al. |
| 6,005,895 A | 12/1999 | Perino et al. |
| 6,018,304 A | 1/2000 | Bessios |
| 6,031,472 A | 2/2000 | Johnson et al. |
| 6,067,326 A | 5/2000 | Jonsson et al. |
| 6,078,627 A | 6/2000 | Crayford |
| 6,094,461 A | 7/2000 | Heron |
| 6,147,544 A * | 11/2000 | Tanizaki et al. ............ 327/403 |
| 6,226,330 B1 | 5/2001 | Mansur |
| 6,324,602 B1 | 11/2001 | Chen et al. |
| 6,538,584 B2 | 3/2003 | Borkar et al. |
| 6,731,692 B1 | 5/2004 | Bhoja |
| 2003/0108134 A1 | 6/2003 | Stonick et al. |
| 2003/0152154 A1 | 8/2003 | Johnson |

OTHER PUBLICATIONS

Mrcea R. Stan, "Bus-Invert coding for low power I/O," IEEE Transactions On Very Large Scale Integration (VLSI) Systems, vol. XX, No. Y, 1999, pp. 100-108.

Kazuyuki Nakamura et al., A 500-MHz 4-Mb CMOS pipeline-burst cache SRAM with point-to-point noise reduction coding I/O.

David D. Falconer et al., "Bounds on error-pattern probabilities for digital communications systems," IEEE Transactions Communications, vol. COM-20, No. 2, Apr. 1972, pp. 132-139.

Ramin Farjad-Rad et al., "A 0.3-µm CMOS 8-Gb/s 4-PAM serial link transceiver," IEEE Journal of Solid-State Circuits, vol. 35, No. 5, May 2000.

A. X. Widmer et al., "A dc-balanced, partitioned-block, 8B/10B transmission code," pp. 440-451.

International Search Report dated Oct. 8, 2004 for International Application No. PCT/US03/38889.

* cited by examiner

Encoder Conditions and Actions

Let: k = 2, . . . , N; wherein N is the total number of codewords;

$C^{(k)}$ represent the $k^{th}$ codeword prior to DC voltage balancing;

$C'^{(k)}$ represent the $k^{th}$ codeword subsequent to DC voltage balancing;

$S_j^{(k)}$ represent the $j^{th}$ symbol within the $k^{th}$ codeword $C^{(k)}$;

$S_j'^{(k)}$ represent the $j^{th}$ symbol within the $k^{th}$ codeword $C'^{(k)}$;

$W(C^{(k)})$ represent the current weight of the $k^{th}$ codeword $C^{(k)}$; and $resd^{(k)}$ represent the residual weight of the $k^{th}$ codeword $C'^{(k)}$ and all prior codewords;

wherein $W(C^{(k)}) = \sum S_j^{(k)}$; and wherein $resd^{(k)} = resd^{(k-1)} + W(C'^{(k)})$.

| | |
|---|---|
| If: $(resd^{(k-1)} \times W(C^{(k)})) > 0$ | (requiring condition) |
| & $((S_5^{(k-1)} \times S_1^{(k)} < 0)$ or $(S_5^{(k-1)} = +/-1))$ | (allowing condition 1a) |
| & $((S_1^{(k)} \times S_2^{(k)} > 0)$ or $(S_2^{(k)} = +/-1))$ | (allowing condition 1b) |
| Then: make $S_j'^{(k)} = -S_j^{(k)}$, wherein j = 1,2,3,4,5; and | (polarity reversal) |
| set $LSB(S_1'^{(k)}) = 0$ | (polarity reversal flag) |

Alternatively;

| | |
|---|---|
| If: $(resd^{(k-1)} \times W(C^{(k)})) > 0$ | (requiring condition) |
| & $((S_5^{(k-1)} \times S_1^{(k)} > 0)$ or $(S_5^{(k-1)} = +/-1))$ | (allowing condition 2a) |
| & $((S_1^{(k)} \times S_2^{(k)} < 0)$ or $(S_2^{(k)} = +/-1))$ | (allowing condition 2b) |
| Then: make $S_j'^{(k)} = -S_j^{(k)}$, wherein j = 2,3,4,5; and | (polarity reversal) |
| set $LSB(S_1'^{(k)}) = 0$ | (polarity reversal flag) |

Figure 4

Decoder Condition and Actions

Let: k = 2, ..., N; wherein N is the total number of codewords;

$C^{(k)}$ represent the $k^{th}$ codeword prior to DC voltage balancing;

$C'^{(k)}$ represent the $k^{th}$ codeword subsequent to DC voltage balancing;

$S_j^{(k)}$ represent the $j^{th}$ symbol within the $k^{th}$ codeword $C^{(k)}$; and $S_j'^{(k)}$ represent the $j^{th}$ symbol within the $k^{th}$ codeword $C'^{(k)}$.

If:   $LSB(S_1'^{(k)}) = 0$                           (identifying condition)

Then: set $LSB(S_1^{(k)}) = 1$                        (polarity reversal flag)

make $S_j^{(k)} = -S_j'^{(k)}$; wherein j = 1, 2, 3, 4, 5    (polarity reversal)

Alternatively;

If:   $LSB(S_1'^{(k)}) = 0$                           (identifying condition)

Then: set $LSB(S_1^{(k)}) = 1$                        (polarity reversal flag)

make $S_j^{(k)} = -S_j'^{(k)}$; wherein j = 2, 3, 4, 5       (polarity reversal)

Figure 6

Encoder Conditions and Actions

Let: $k = 2, \ldots, N$; wherein N is the total number of codewords;

$S_j^{(k)}$ represent the $j^{th}$ symbol within the $k^{th}$ codeword $C^{(k)}$;

$S_j'^{(k)}$ represent the $j^{th}$ symbol within the $k^{th}$ codeword $C'^{(k)}$;

$\Delta W_i$ represent the adjustment information for transmitter equalizer coefficients;

A1 represent $((S_5^{(k-1)}, S_1^{(k)}, S_2^{(k)}) \in S+)$; and

A2 represent $((S_5^{(k-1)}, S_1^{(k)}, S_2^{(k)}) \in S-)$.

| | |
|---|---|
| If: (A1 & $\Delta W_i > 0$) | (allowing condition 1) |
| or | |
| If: (A2 & $\Delta W_i < 0$) | (allowing condition 2) |
| Then: set LSB($S_1'^{(k)}$) = 0 | (add adjustment information) |

Alternatively;

| | |
|---|---|
| If: (A1 & $\Delta W_i < 0$) | (allowing condition 3) |
| or | |
| If: (A2 & $\Delta W_i > 0$) | (allowing condition 4) |
| Then: set LSB($S_1'^{(k)}$) = 0 | (add adjustment information) |

Alternatively;

| | |
|---|---|
| If: (A1 & $\Delta W_i > 0$) | (allowing condition 1) |
| or | |
| If: (A2 & $\Delta W_i < 0$) | (allowing condition 2) |

Then: (set LSB($S_1'^{(k)}$) = 0) & (invert MSB: MSB($S_1'^{(k)}$) = $\overline{MSB}(S_1^{(k)})$) (add adj. info)

Alternatively;

| | |
|---|---|
| If: (A1 & $\Delta W_i < 0$) | (allowing condition 3) |
| or | |
| If: (A2 & $\Delta W_i > 0$) | (allowing condition 4) |

Then: (set LSB($S_1'^{(k)}$) = 0) & (invert MSB: MSB($S_1'^{(k)}$) = $\overline{MSB}(S_1^{(k)})$) (add adj. Info.)

Figure 9

Decoder Condition and Actions

Let: $k = 2, \ldots, N$; wherein N is the total number of codewords;

$C^{(k)}$ represent the $k^{th}$ codeword prior to DC voltage balancing;

$C'^{(k)}$ represent the $k^{th}$ codeword subsequent to DC voltage balancing;

$S_j^{(k)}$ represent the $j^{th}$ symbol within the $k^{th}$ codeword $C^{(k)}$;

$S_j'^{(k)}$ represent the $j^{th}$ symbol within the $k^{th}$ codeword $C'^{(k)}$; and $\Delta W_i$ represent the adjustment information for transmitter equalizer coefficients.

if: $LSB(S_1'^{(k)}) = 0 = C'[1]$      (identifying condition)

Then: set $LSB(S_1^{(k)}) = 1 = C[1]$      (remove adjustment data)
$\Delta W_i = \begin{cases} +1 \text{ if } A1=1, A2=0, C'[1]=0 \\ -1 \text{ if } A1=0, A2=1, C'[1]=0 \\ 0 \text{ if } C'[1]=1 \end{cases}$      (retrieve adjustment information)

Alternatively;

If: $LSB(S_1'^{(k)}) = 0 = C'[1]$      (identifying condition)

Then: set $LSB(S_1^{(k)}) = 1 = C[1]$      (remove adjustment data)
$\Delta W_i = \begin{cases} -1 \text{ if } A1=1, A2=0, C'[1]=0 \\ +1 \text{ if } A1=0, A2=1, C'[1]=0 \\ 0 \text{ if } C'[1]=1 \end{cases}$      (retrieve adjustment information)

Alternatively;

If: $LSB(S_1'^{(k)}) = 0$      (identifying condition)

Then: set $LSB(S_1^{(k)}) = 1$      (remove adjustment data)

invert MSB: $MSB(S_1^{(k)}) = \overline{MSB(S_1'^{(k)})}$      (remove adjustment data)
$\Delta W_i = \begin{cases} +1 \text{ if } A1=1, A2=0, C'[1]=0 \\ -1 \text{ if } A1=0, A2=1, C'[1]=0 \\ 0 \text{ if } C'[1]=1 \end{cases}$      (retrieve adjustment information)

Alternatively;

If: $LSB(S_1'^{(k)}) = 0$      (identifying condition)

Then: set $LSB(S_1^{(k)}) = 1$      (remove adjustment data)

invert MSB: $MSB(S_1^{(k)}) = \overline{MSB(S_1'^{(k)})}$      (remove adjustment data)
$\Delta W_i = \begin{cases} -1 \text{ if } A1=1, A2=0, C'[1]=0 \\ +1 \text{ if } A1=0, A2=1, C'[1]=0 \\ 0 \text{ if } C'[1]=1 \end{cases}$      (retrieve adjustment information)

Figure 14

Encoder Conditions and Actions

Let: k = 2, ..., N; wherein N is the total number of codewords;

$C^{(k)}$ represent the $k^{th}$ codeword prior to processing for transmission;

$C'^{(k)}$ represent the $k^{th}$ codeword subsequent to processing for transmission;

$S_j^{(k)}$ represent the $j^{th}$ symbol within the $k^{th}$ codeword $C^{(k)}$;

$W(C^{(k)})$ represent the current weight of the $k^{th}$ codeword $C^{(k)}$; and $resd^{(k)}$ represent the residual weight of the $k^{th}$ codeword $C'^{(k)}$ and all prior codewords;

wherein $W_A(C^{(k)}) = \sum_{j=1}^{5} S_j^{(k)}$;

wherein $W_B(C^{(k)}) = \sum_{j=2}^{5} S_j^{(k)}$; and wherein $resd^{(k)} = resd^{(k-1)} + W(C'^{(k)})$.

| | |
|---|---|
| If: $(resd^{(k-1)} \times W_A(C^{(k)})) > 0$ | (requiring condition 1) |
| & $(S_1^{(k)} \times W_B(C^{(k)})) > 0$ | (requiring condition 2) |
| & $((S_5^{(k-1)} \times S_1^{(k)} < 0)$ or $(S_5^{(k-1)} = +/-1))$ | (allowing condition 1a) |
| & $((S_1^{(k)} \times S_2^{(k)} > 0)$ or $(S_2^{(k)} = +/-1))$ | (allowing condition 1b) |
| Then: make $S_j^{(k)} = -S_j^{(k)}$, for j = 1, 2, ... 5; and | (polarity reversal) |
| set $LSB(S_1^{(k)}) = 0$ | (polarity reversal flag) |
| Else If: $(S_1^{(k)} \times W_B(C^{(k)})) < 0$ | (requiring condition 3) |
| & $((S_5^{(k-1)}, S_1^{(k)}, S_2^{(k)}) \in S+)$ | (allowing condition 2) |
| or | |
| & $((S_5^{(k-1)}, S_1^{(k)}, S_2^{(k)}) \in S-)$ | (allowing condition 3) |
| Then: set $LSB(S_1^{(k)}) = 0$ | (add adjustment information) |

Figure 19

Encoder Conditions and Actions

Let: k = 2, ... , N; wherein N is the total number of codewords;

$C^{(k)}$ represent the $k^{th}$ codeword prior to processing for transmission;

$C'^{(k)}$ represent the $k^{th}$ codeword subsequent to processing for transmission;

$S_j^{(k)}$ represent the $j^{th}$ symbol within the $k^{th}$ codeword $C^{(k)}$;

$W(C^{(k)})$ represent the current weight of the $k^{th}$ codeword $C^{(k)}$; and $resd^{(k)}$ represent the residual weight of the $k^{th}$ codeword $C'^{(k)}$ and all prior codewords;

wherein $W_A(C^{(k)}) = \sum_{j=1}^{5} S_j^{(k)}$;

wherein $W_B(C^{(k)}) = \sum_{j=2}^{5} S_j^{(k)}$; and wherein $resd^{(k)} = resd^{(k-1)} + W(C'^{(k)})$.

| | |
|---|---|
| If: $(resd^{(k-1)} \times W_A(C^{(k)}) > 0)$ | (requiring condition 1) |
| & $(S_1^{(k)} \times W_B(C^{(k)}) > 0)$ | (requiring condition 2) |
| & $((S_5^{(k-1)} \times S_1^{(k)} > 0)$ or $(S_5^{(k-1)} = +/-1))$ | (allowing condition 1a) |
| & $((S_1^{(k)} \times S_2^{(k)} < 0)$ or $(S_2^{(k)} = +/-1))$ | (allowing condition 1b) |
| Then: make $S_j^{(k)} = -S_j^{(k)}$ for j = 2, ...5; and | (polarity reversal) |
| set $LSB(S_1^{(k)}) = 0$ | (polarity reversal flag) |
| Else If: $(S_1^{(k)} \times W_B(C^{(k)}) < 0)$ | (requiring condition 3) |
| & $((S_5^{(k-1)}, S_1^{(k)}, S_2^{(k)}) \in S+)$ | (allowing condition 2) |
| or | |
| & $((S_5^{(k-1)}, S_1^{(k)}, S_2^{(k)}) \in S-)$ | (allowing condition 3) |
| Then: (set $LSB(S_1^{(k)}) = 0$) & (invert $MSB(S_1^{(k)})$) | (add adjustment information) |

Figure 23

Encoder Conditions and Actions

Let: k = 2, ..., N; wherein N is the total number of codewords;

$C^{(k)}$ represent the $k^{th}$ codeword prior to processing for transmission;

$C'^{(k)}$ represent the $k^{th}$ codeword subsequent to processing for transmission;

$C''^{(k)}$ represent $[S_2^{(k)}, S_3^{(k)}, S_4^{(k)}, S_5^{(k)}]$;

$S_j^{(k)}$ represent the $j^{th}$ symbol within the $k^{th}$ codeword $C^{(k)}$;

$S_j'^{(k)}$ represent the $j^{th}$ symbol within the $k^{th}$ codeword $C'^{(k)}$;

$W(C^{(k)})$ represent the current weight of the $k^{th}$ codeword $C^{(k)}$; and $resd^{(k)}$ represent the residual weight of the $k^{th}$ codeword $C'^{(k)}$ and all prior codewords;

wherein $W_A(C^{(k)}) = \sum_{j=1}^{5} S_j^{(k)}$;

wherein $W_B(C''^{(k)}) = S_x$;

wherein $W_C(C''^{(k)}) = S_z + S_w + S_y$;

wherein $x,y,z,w \neq 1$; $x \neq y \neq z \neq w$; and $x,y,z,w$ take value from set of $\{2,3,4,5\}$; and wherein $resd^{(k)} = resd^{(k-1)} + W(C'^{(k)})$.

If:  $(resd^{(k-1)} \times W_A(C^{(k)})) > 0$   (requiring condition 1)

& $(W_C(C''^{(k)}) \times W_B(C''^{(k)})) > 0$   (requiring condition 2)

& (( $S_5^{(k-1)} \times S_1^{(k)} < 0$) or ($S_5^{(k-1)} = +/-1$))   (allowing condition 1a)

& (($S_1^{(k)} \times S_2^{(k)} > 0$, $x \neq 2$)   (allowing condition 1b)

or ($S_1^{(k)} \times S_2^{(k)} < 0$, $x = 2$))

or ($S_2^{(k)} = +/-1$)

Then: make $S_j'^{(k)} = -S_j^{(k)}$ for j = 1,y,z,w; and   (polarity reversal)

set $LSB(S_1'^{(k)}) = 0$   (polarity reversal flag)

Else If: $(W_C(C''^{(k)}) \times W_B(C''^{(k)})) < 0$   (requiring condition 3)

& (( $S_5^{(k-1)} \times S_1^{(k)} > 0$) or ($S_5^{(k-1)} = +/-1$))   (allowing condition 2a)

& (($S_1^{(k)} \times S_2^{(k)} > 0$, $x \neq 2$)   (allowing condition 2b)

or ($S_1^{(k)} \times S_2^{(k)} < 0$, $x = 2$)

or ($S_2^{(k)} = +/-1$))

Then: (set $LSB(S_1'^{(k)}) = 0$) & (invert $MSB(S_x^{(k)})$)   (add adjustment information)

Figure 27

TECHNIQUE FOR UTILIZING SPARE BANDWIDTH RESULTING FROM THE USE OF A TRANSITION-LIMITING CODE IN A MULTI-LEVEL SIGNALING SYSTEM

CROSS-REFERENCE TO RELATED APPLICATIONS

This patent application is a continuation-in-part application of U.S. patent application Ser. No. 10/314,985, filed Dec. 10, 2002, which is hereby incorporated by reference herein in its entirety.

FIELD OF THE DISCLOSURE

The present disclosure relates generally to multi-level signaling and, more particularly, to a technique for utilizing spare bandwidth resulting from the use of a transition-limiting code in a multi-level signaling system.

BACKGROUND OF THE DISCLOSURE

High-speed serial link channels delivering an effective data rate above 5 Gb/s in a backplane environment are subject to significant signal distortion due to inter-symbol interference (ISI). Transmitters and receivers need to compensate for most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, conventional 2-level pulse amplitude modulation (2-PAM) signaling may be replaced by other multi-level signaling schemes that utilize more than two signal levels. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data per bit time. However, in a 4-level pulse amplitude modulation (4-PAM) signaling system, for example, each conductor in the system may carry signals at four different signal levels (i.e., four different symbols). Thus, in a 4-PAM signaling system, each conductor in the system can transmit two bits of data simultaneously at one half the symbol rate for an equivalent bandwidth.

While advantageous in channels with dominant attenuation, signaling systems that utilize more than two signal levels may be more sensitive to reflections and cross-talk than 2-PAM signaling systems due to the reduction in signal margin as a result of carrying more information per symbol. Thus, in cases where high loss and reflections are combined, the advantages of signaling systems that utilize more than two signal levels over 2-PAM signaling systems may be lost.

In order to preserve the advantages of signaling systems that utilize more than two signal levels over 2-PAM signaling, it is desirable to eliminate full-swing transitions (FST) between sequential symbols, as illustrated in the above-referenced U.S. patent application Ser. No. 10/314,985. This enhances system performance in terms of: 1.) voltage margins (Vm) by reducing peak distortion (PD) via the elimination of one or more worst case sequences; and 2.) timing margins (Tm), especially at outer eyes where FST close eyes the most.

It is also desirable to secure a minimum density of desirable symbol transitions useful for clock recovery, as also illustrated in the above-referenced U.S. patent application Ser. No. 10/314,985. These clock data recovery (CDR) transitions prevent continuous phase drifting from an optimum sampling point at the center of an eye in plesiochronous systems with frequency offsets between received data and a local receive clock.

As described in the above-referenced U.S. patent application Ser. No. 10/314,985, transition-limiting codes may be utilized in multi-PAM signaling systems to realize the above-mentioned desirable qualities. As also described in the above-referenced U.S. patent application Ser. No. 10/314,985, a unique property exists in certain transition-limiting codes, whereby certain outer multi-PAM signal levels are periodically unused. As further described in the above-referenced U.S. patent application Ser. No. 10/314,985, these periodically unused outer multi-PAM signal levels may be used in framing codewords (i.e., identifying the boundary of a codeword). However, the use of these periodically unused outer multi-PAM signal levels is not limited in this regard. That is, since these periodically unused outer multi-PAM signal levels essentially constitute spare bandwidth, it may be desirable to use these periodically unused outer multi-PAM signal levels for other beneficial purposes.

In view of the foregoing, it would be desirable to provide a technique for utilizing spare bandwidth resulting from the use of a transition-limiting code in a multi-level signaling system in an efficient and cost effective manner.

SUMMARY OF THE DISCLOSURE

A technique for utilizing spare bandwidth resulting from the use of a transition-limiting code in a multi-level signaling system is disclosed. In one particular exemplary embodiment, the technique may be realized as a method for utilizing spare bandwidth resulting from the use of a transition-limiting code in a multi-level signaling system, wherein the transition-limiting code has a characteristic such that at least one signal level is periodically unused. The method comprises utilizing the at least one periodically unused signal level in a codeword that has been encoded using the transition-limiting code so as to represent additional information in the multi-level signaling system.

In accordance with other aspects of this particular exemplary embodiment, the codeword may beneficially be formed by encoding digital values represented by sets of N bits to provide corresponding sets of P symbols. If such is the case, each set of P symbols may beneficially be formed with Q bits, wherein Q is greater than N. For example, N may equal 8 and Q may equal 10, wherein each symbol represents two bits.

In accordance with further aspects of this particular exemplary embodiment, the method may further beneficially comprise changing the polarity of the codeword so as to provide a DC balancing property to the transition-limiting code. If such is the case, the polarity of the codeword may beneficially be changed so as not to violate a transition-limiting property of the transition-limiting code. Alternatively, the polarity of the codeword may beneficially be changed by reversing the polarity of the codeword. Also, utilizing the at least one periodically unused signal level may then beneficially comprise changing the logic state of at least one bit of the codeword so as to provide an indicator of such polarity change. If such is the case, the logic state of the at least one bit of the codeword may beneficially be changed so as not to violate a transition-limiting property of the transition-limiting code.

In accordance with additional aspects of this particular exemplary embodiment, utilizing the at least one periodically unused signal level may beneficially comprise changing the logic state of at least one bit of the codeword so as to represent the additional information. If such is the case, the logic state of the at least one bit of the codeword may beneficially be changed so as not to violate a transition-limiting property of the transition-limiting code. Also, the additional information may beneficially comprise transmitter equalizer coefficient adjustment information.

In accordance with still other aspects of this particular exemplary embodiment, the method may further beneficially comprise transmitting the codeword that utilizes the at least one periodically unused signal level to represent additional information in the multi-level signaling system. If such is the case, the codeword may beneficially be transmitted at four signal levels on a single transmission medium. The single transmission medium may beneficially comprise, for example, a single electrical conductor, a differential pair of electrical conductors, or an optical fiber. Also, the method may then beneficially comprise receiving the transmitted codeword, and detecting the additional information in the received codeword. The method may then further beneficially comprise removing the additional information from the received codeword so as to return the codeword to an original state. The method may then additionally beneficially comprise decoding the received codeword after the additional information is removed.

In another particular exemplary embodiment, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment, the technique may be realized as at least one processor readable carrier for storing a computer program of instructions configured to be readable by at least one processor for instructing the at least one processor to execute a computer process for performing the above-described method.

In yet another particular exemplary embodiment, the technique may be realized as an apparatus for utilizing spare bandwidth resulting from the use of a transition-limiting code in a multi-level signaling system, wherein the transition-limiting code has a characteristic such that at least one signal level is periodically unused. The apparatus comprises an encoder configured to utilize the at least one periodically unused signal level in a codeword that has been encoded using the transition-limiting code so as to represent additional information in the multi-level signaling system.

In accordance with other aspects of this particular exemplary embodiment, the apparatus may further beneficially comprise a transmitter configured to transmit the codeword that utilizes the at least one periodically unused signal level to represent additional information in the multi-level signaling system. If such is the case, the apparatus may still further beneficially comprise a receiver configured to receive the transmitted codeword, and a detector configured to detect the additional information in the received codeword. The detector may also be configured to remove the additional information from the received codeword so as to return the codeword to an original unutilized state. The apparatus may then still further beneficially comprise a decoder configured to decode the received codeword after the additional information is removed.

In accordance with further aspects of this particular exemplary embodiment, the apparatus may beneficially possess one or more of the features associated with the above-described method.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 4 shows triggering conditions and subsequent weight polarity reversal and flagging actions which may be taken by the encoder shown in FIG. 3 to provide a DC voltage balancing property to the 4S5S transition-limiting code being utilized within the 4-PAM signaling system shown in FIG. 3.

FIG. 6 shows a triggering condition and subsequent weight polarity reversal and deflagging actions which may be taken by the decoder shown in FIG. 3 to provide a DC voltage balancing property to the 4S5S transition-limiting code being utilized within the 4-PAM signaling system of FIG. 3.

FIG. 9 shows conditions and subsequent actions which may be taken by the encoders shown in FIG. 8 to transfer transmitter equalizer coefficient adjustment information in the bidirectional 4-PAM signaling system of FIG. 8.

FIG. 14 shows a condition and subsequent actions which may be taken by the decoders shown in FIG. 8 to transfer transmitter equalizer coefficient adjustment information in the bidirectional 4-PAM signaling system of FIG. 8.

FIG. 19 shows conditions and subsequent actions which may be taken by the encoders of FIG. 8 to provide a DC voltage balancing property to the 4S5S transition-limiting code being utilized within the bidirectional 4-PAM signaling system of FIG. 8 and to transfer transmitter equalizer coefficient adjustment information in the bidirectional 4-PAM signaling system of FIG. 8.

FIG. 23 shows alternative conditions and subsequent actions which may be taken by the encoders of FIG. 8 to provide a DC voltage balancing property to the 4S5S transition-limiting code being utilized within the bidirectional 4-PAM signaling system of FIG. 8 and to transfer transmitter equalizer coefficient adjustment information in the bidirectional 4-PAM signaling system of FIG. 8.

FIG. 27 shows generalized conditions and subsequent actions which may be taken by the encoders of FIG. 8 to provide a DC voltage balancing property to the 4S5S transition-limiting code being utilized within the bidirectional 4-PAM signaling system of FIG. 8 and to transfer transmitter equalizer coefficient adjustment information in the bidirectional 4-PAM signaling system of FIG. 8.

DETAILED DESCRIPTION OF EXEMPLARY EMBODIMENT(S)

Figure 1:
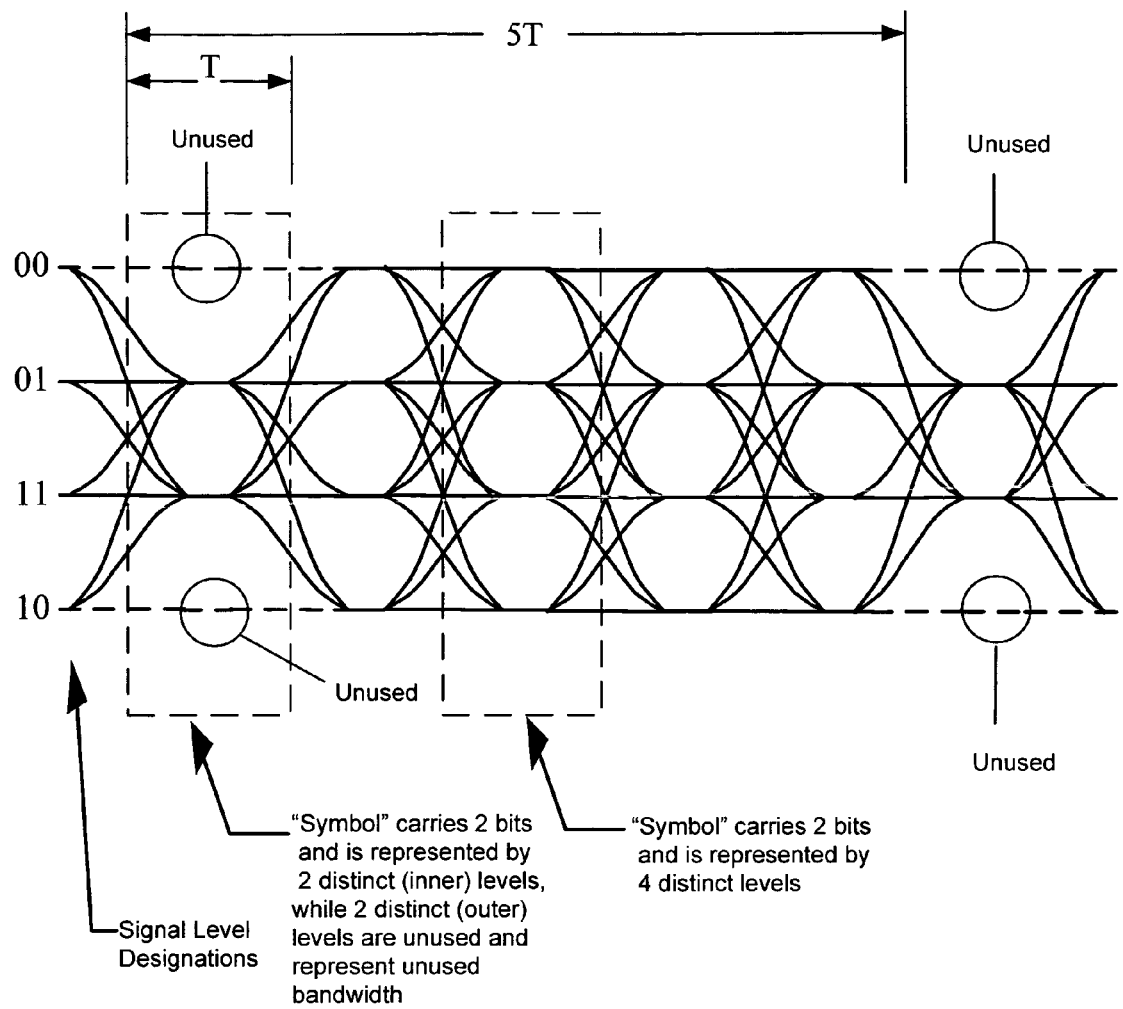
FIG. 1 shows a signal transition diagram for a 4-PAM signaling system utilizing a 4S5S transition-limiting code.

Referring to FIG. 1, there is shown a signal transition diagram for a 4-PAM signaling system utilizing a 4S5S transition-limiting code as described in the above-referenced U.S. patent application Ser. No. 10/314,985. As shown in FIG. 1, the 4S5S transition-limiting code has a unique property wherein two outer 4-PAM signal levels are periodically unused. That is, assuming T is a symbol period, every 5T two outer 4-PAM signal levels (i.e., the uppermost and lowermost signal levels) are not used (i.e., there are no transitions starting from or ending at two outer 4-PAM signal levels). As described in the above-referenced U.S. patent application Ser. No. 10/314,985, these periodically unused outer 4-PAM signal levels may be used in framing codewords (i.e., identifying the boundary of a codeword). However, the use of these periodically unused outer 4-PAM signal levels is not limited in this regard. That is, since these periodically unused outer 4-PAM signal levels essentially constitute spare bandwidth, these periodically unused outer 4-PAM signal levels may be used for other beneficial purposes in accordance with the present disclosure.

Figure 2:
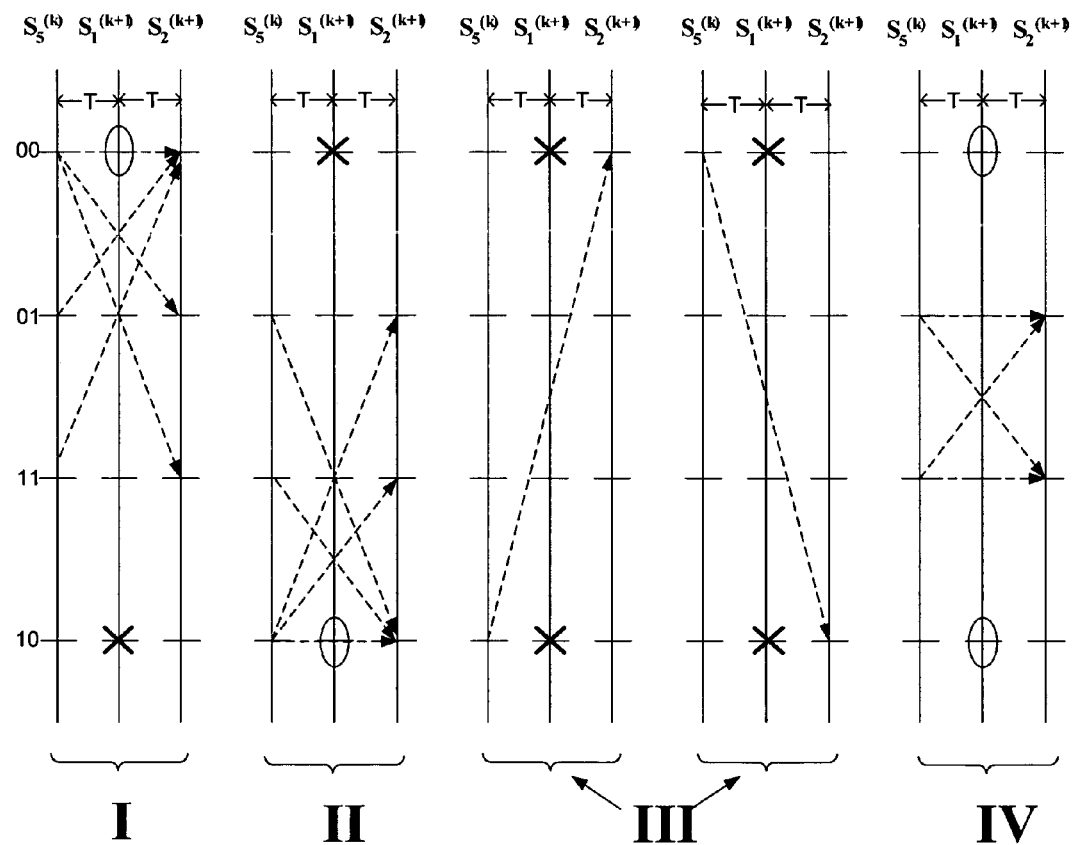
FIG. 2 shows a plurality of state transition diagrams for a 4-PAM signaling system utilizing a 4S5S transition-limiting code.

Referring to FIG. 2, there is shown a plurality of state transition diagrams for a 4-PAM signaling system utilizing a 4S5S transition-limiting code as described in the above-referenced U.S. patent application Ser. No. 10/314,985. In the 4S5S transition-limiting code described in the above-referenced U.S. patent application Ser. No. 10/314,985, the outer 4-PAM signal levels are periodically unused. One reason for periodically not using the outer 4-PAM signal levels is to eliminate full-swing transitions between sequential blocks of symbols (e.g., between every 5 consecutive symbols). Eliminating full-swing transitions can reduce signal distortions, such as inter-symbol interference (ISI), which can affect the speed and/or the error rate at which data can be transmitted.

The plurality of state transition diagrams shown in FIG. 2 illustrate four separate cases (i.e., Cases I, II, III, and IV) when the above-described periodically unused outer 4-PAM signal levels may or may not be used for other beneficial purposes in accordance with the present disclosure. In each case, a symbol may be represented by $s_j^{(k)}$, wherein j represents the symbol number within a codeword, and k represents the codeword number. In the embodiment described with respect to FIG. 2, the periodically unused outer 4-PAM signal levels are located in the $1^{st}$ symbol of each codeword (i.e., at each $s_1^{(k+1)}$ symbol). For example, in Case I, when the signal level of the fifth symbol in a first codeword (i.e., $S_5^{(k)}$, wherein k=1, 2, 3, . . . ) is 00 and the signal level of the second symbol in a second codeword (i.e., $s_2^{(k+1)}$, wherein k=1, 2, 3, . . . ) is 00, 01, or 11, then the uppermost signal level (i.e., 00) of the first symbol in the second codeword (i.e., $s_1^{(k+1)}$, wherein k=1, 2, 3, . . . ) may be used for other beneficial purposes in accordance with the present disclosure. This is because such use would not violate the transition-limiting properties (e.g., elimination of full-swing transitions) of the transition-limiting code. For example, if $s_5^{(k)}$ is 00 and $s_2^{(k+1)}$ is 11, then $s_1^{(k+1)}$ may be 00 because neither the transition from $s_5^{(k)}$ to $s_1^{(k+1)}$ (i.e., 00 to 00) nor the transition from $s_1^{(k+1)}$ to $s_2^{(k+1)}$ (i.e., 00 to 11) is a full-swing transition when using the Gray code assignment shown in FIG. 2. Also in Case I, when the signal level of the second symbol in the second codeword (i.e., $s_2^{(k+1)}$, wherein k=1, 2, 3, . . . ) is 00 and the signal level of the fifth symbol in the first codeword (i.e., $s_5^{(k)}$, wherein k=1, 2, 3, . . . ) is 01 or 11, then the uppermost signal level (i.e., 00) of the first symbol in the second codeword (i.e., $s_1^{(k+1)}$, wherein k=1, 2, 3, . . . ) may be used for other beneficial purposes in accordance with the present disclosure because such use would not violate the transition-limiting properties of the transition-limiting code. However, the lowermost signal level (i.e., 10) of the first symbol in the second codeword (i.e., $S_1^{(k+1)}$, wherein k=1, 2, 3, . . . ) may not be used for other beneficial purposes in accordance with the present disclosure in any of the above-mentioned Case I scenarios because such use would violate the transition-limiting properties of the transition-limiting code.

Analogously, in Case II, when the signal level of the fifth symbol in the first codeword (i.e., $s_5^{(k)}$, wherein k=1, 2, 3, . . . ) is 10 and the signal level of the second symbol in the second codeword (i.e., $s_2^{(k+1)}$, wherein k=1, 2, 3, . . . ) is 01, 11, or 10, then the lowermost signal level (i.e., 10) of the first symbol in the second codeword (i.e., $s_1^{(k+1)}$, wherein k=1, 2, 3, . . . ) may be used for other beneficial purposes in accordance with the present disclosure because such use would not violate the transition-limiting properties of the transition-limiting code. Also in Case II, when the signal level of the second symbol in the second codeword (i.e., $s_2^{(k+1)}$, wherein k=1, 2, 3, . . . ) is 10 and the signal level of the fifth symbol in the first codeword (i.e., $s_5^{(k)}$, wherein k=1, 2, 3, . . . ) is 01 or 11, then the lowermost signal level (i.e., 10) of the first symbol in the second codeword (i.e., $s_1^{(k+1)}$, wherein k=1, 2, 3, . . . ) may be used for other beneficial purposes in accordance with the present disclosure because such use would not violate the transition-limiting properties of the transition-limiting code. However, the uppermost signal level (i.e., 00) of the first symbol in the second codeword (i.e., $s_1^{(k+1)}$, wherein k=1, 2, 3, . . . ) may not be used for other beneficial purposes in accordance with the present disclosure in any of the above-mentioned Case II scenarios because such use would violate the transition-limiting properties of the transition-limiting code.

In Case III, when the signal level of the fifth symbol in the first codeword (i.e., $s_5^{(k)}$, wherein k=1, 2, 3, . . . ) is 10 and the signal level of the second symbol in the second codeword (i.e., $s_2^{(k+1)}$, wherein k=1, 2, 3, . . . ) is 00, then neither the uppermost signal level (i.e., 00) nor the lowermost signal level (i.e., 10) of the first symbol in the second codeword (i.e., $s_1^{(k+1)}$, wherein k=1, 2, 3, . . . ) may be used for other beneficial purposes in accordance with the present disclosure because such use would violate the transition-limiting properties of the transition-limiting code. Also in Case III, when the signal level of the fifth symbol in the first codeword (i.e., $s_5^{(k)}$, wherein k=1, 2, 3, . . . ) is 00 and the signal level of the second symbol in the second codeword (i.e., $s_2^{(k+1)}$, wherein k=1, 2, 3, . . . ) is 10, then neither the uppermost signal level (i.e., 00) nor the lowermost signal level (i.e., 10) of the first symbol in the second codeword (i.e., $s_1^{(k+1)}$, wherein k=1, 2, 3, . . . ) may be used for other beneficial purposes in accordance with the present disclosure because such use would violate the transition-limiting properties of the transition-limiting code.

However, in Case IV, when the signal level of the fifth symbol in the first codeword (i.e., $s_5^{(k)}$, wherein k=1, 2, 3, . . . ) is 01 and the signal level of the second symbol in the second codeword (i.e., $s_2^{(k+1)}$, wherein k=1, 2, 3, . . . ) is 01 or 11, then either the uppermost signal level (i.e., 00) or the lowermost signal level (i.e., 10) of the first symbol in the second codeword (i.e., $s_1^{(k+1)}$ wherein k=1, 2, 3, . . . ) may be used for other beneficial purposes in accordance with the present disclosure because such use would not violate the transition-limiting properties of the transition-limiting code. Also in Case IV, when the signal level of the fifth symbol in the first codeword (i.e., $s_5^{(k)}$, wherein k=1, 2, 3, . . . ) is 11 and the signal level of the second symbol in the second codeword (i.e., $s_2^{(k+1)}$, wherein k=1, 2, 3, . . . ) is 01 or 11, then either the uppermost signal level (i.e., 00) or the lowermost signal level (i.e., 10) of the first symbol in the second codeword (i.e., $s_1^{(k+1)}$, wherein k=1, 2, 3, . . . ) may be used for other beneficial purposes in accordance with the present disclosure because such use would not violate the transition-limiting properties of the transition-limiting code.

At this point it should be noted that the signal level designations shown in FIGS. 1 and 2 are such that a two-bit binary value is assigned to each signal level (e.g., a Gray code assignment). Each sequential symbol carries this two-bit binary value in a 4-PAM signaling system. It should be noted, however, that the present disclosure is not limited to 4-PAM signaling systems or to signal level designations having Gray code assignments.

At this point it should be noted that the binary signal level designations shown in FIGS. 1 and 2 may be associated with many different combinations of signal voltage, current, or other unit levels. For example, in a very simplified case, the 00 binary signal level designation may be associated with +0.500 volts, the 01 binary signal level designation may be associated with +0.167 volts, the 11 binary signal level designation may be associated with −0.167 volts, and the 10 binary signal level designation may be associated with −0.500 volts. Of course, the present disclosure is not limited in this regard since, as mentioned above, the binary signal level designations shown in FIGS. 1 and 2 may be associated with many different combinations of signal voltages. The present disclosure may also be helpful in systems in which the signal level designations are expressed in terms of current, or other unit, levels. In some instances, it is useful to express the binary signal level designations using unitless values which are representative of normalized amplitudes of voltages associated with the binary signal level designations. For example, in a 4-PAM signaling system, the binary signal level designations may be expressed as −3, −1, +1, and +3. Expressing the binary signal level designations in this manner facilitates expressing the sum of the levels and differences between levels as integer values.

It should also be noted that, with respect to Cases I–IV shown in FIG. 2, the primary transition-limiting property of the transition-limiting code was generally the elimination of full-swing transitions between symbols, and specifically the elimination of full-swing transitions to/from the first symbol of each codeword. Other transition-limiting codes using different transition-limiting properties in addition to, or instead of, the elimination of full-swing transitions may be used. For example, in order to further reduce signal distortion, a transition-limiting code having transition-limiting properties of eliminating both full and second order swing transitions may be used. In such an example, again using a Gray code assignment and the symbol definition provided above, when $s_5^{(k)}$ is 00 and $s_2^{(k+1)}$ is either 00 or 01, then $s_1^{(k+1)}$ may be 00 because neither the transition from $s_5^{(k)}$ to $s_1^{(k+1)}$ (i.e., 00 to 00) nor the transitions from $s_1^{(k+1)}$ to $s_2^{(k+1)}$ (i.e., 00 to 00 or 00 to 01) are full or second order swing transitions, and the upper 4-PAM signal level can still be used for other beneficial purposes. In another example, the transition-limiting properties of the transition-limiting code may include the elimination of full-swing transitions and a guaranteed clock data recovery (CDR) transition density. For example, the guaranteed CDR transition density may require that there be at least one symbol transition in the 4 possible symbol transitions in a 5 symbol codeword. In such an example, if $s_2^{(k+1)}$ is 00, $s_3^{(k+1)}$ is 00, $s_4^{(k+1)}$ is 00, and $s_5^{(k+1)}$ is 00, then the CDR transition density property would prohibit $s_1^{(k+1)}$ from being changed from 01 to 00.

Figure 3:
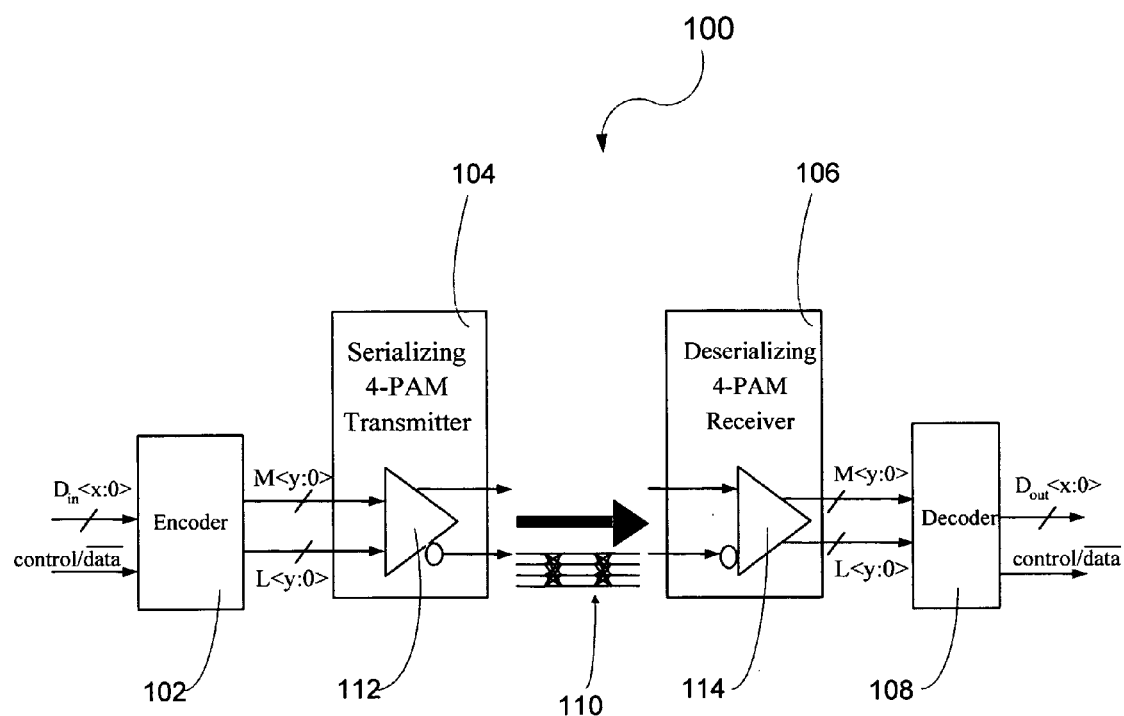
FIG. 3 shows a generic 4-PAM signaling system for supporting a technique for utilizing spare bandwidth resulting from the use of transition-limiting codes in accordance with an embodiment of the present disclosure.

Referring to FIG. 3, there is shown an exemplary embodiment of a 4-PAM signaling system 100 comprising an encoder 102, a serializing 4-PAM transmitter 104, a deserializing 4-PAM receiver 106, and a decoder 108. The serializing 4-PAM transmitter 104 and the deserializing 4-PAM receiver 106 are interconnected by a pair of signal carrying conductors 110.

In the embodiment of FIG. 3, the encoder 102 receives parallel input data $D_{in}$, and then encodes the received parallel input data $D_{in}$ so as to provide parallel codewords to the serializing 4-PAM transmitter 104 that are organized as MSB codewords (M) and LSB codewords (L). The MSB codewords (M) and the LSB codewords (L) together include multiple consecutive symbols. The parallel input data $D_{in}$ is received as a word having x+1 bits. The MSB codewords (M) and the LSB codewords (L) each have y+1 bits. The encoder 102 may be implemented with binary logic, as described in the above-referenced U.S. patent application Ser. No. 10/314,985.

At this point it should be noted that the encoder 102 also receives a control/data input signal, which indicates whether the parallel input data $D_{in}$ is carrying control or data information. The control/data signal is used in the operation of the encoder 102 as described in more detail below.

The serializing 4-PAM transmitter 104 receives the MSB codewords (M) and the LSB codewords (L) in parallel form from the encoder 102. The serializing 4-PAM transmitter 104 comprises a differential transmitter 112 for differentially serially transmitting the received multiple consecutive symbols in the MSB codewords (M) and the LSB codewords (L) over the pair of signal carrying conductors 110 to the deserializing 4-PAM receiver 106.

The deserializing 4-PAM receiver 106 comprises a differential receiver 114 for differentially serially receiving the multiple consecutive symbols in the MSB codewords (M) and the LSB codewords (L) over the pair of signal carrying conductors 110 from the serializing 4-PAM transmitter 104. The differential receiver 114 then transmits the MSB codewords (M) and the LSB codewords (L) in parallel form to the decoder 108.

The decoder 108 is essentially the inverse of the encoder 102. That is, the decoder 108 receives the MSB codewords (M) and the LSB codewords (L) in parallel form from the deserializing 4-PAM receiver 106, and then decodes the received MSB codewords (M) and the received LSB codewords (L) so as to provide parallel output data $D_{out}$. The parallel output data $D_{out}$ is provided as a word having x+1 bits. The decoder 108 may be implemented with binary logic, as described in the above-referenced U.S. patent application Ser. No. 10/314,985.

At this point it should be noted that the decoder 108 also provides the control/data input signal, which indicates whether the parallel output data $D_{out}$ is carrying control or data information The control/data signal is used in the operation of the decoder 108 as described in more detail below.

At this point it should be noted that, while FIG. 3 shows the serializing 4-PAM transmitter 104 as having the differential transmitter 112 and the deserializing 4-PAM receiver 106 as having the differential receiver 114, the present disclosure is not limited in this regard. That is, the MSB codewords (M) and the LSB codewords (L) may be transmitted from the serializing 4-PAM transmitter 104 to the deserializing 4-PAM receiver 106 in a single-ended manner requiring only a single-ended transmitter and a single-ended receiver. Thus, the serializing 4-PAM transmitter 104 and the deserializing 4-PAM receiver 106 may alternatively be interconnected by a single signal carrying conductor instead of the pair of signal carrying conductors 110. Alternatively still, in an optical based system, the serializing 4-PAM transmitter 104 and the deserializing 4-PAM receiver 106 may be interconnected by an optical fiber capable carrying signals at multiple optical signal levels. Alternatively even still, in a wireless based system, the serializing 4-PAM transmitter 104 and the deserializing 4-PAM receiver 106 may not be interconnected by any fixed transmission medium, but rather the MSB codewords (M) and the LSB codewords (L) may be transmitted from the serializing 4-PAM transmitter 104 to the deserializing 4-PAM receiver 106 via a wireless protocol.

For purposes of clearly describing the present disclosure, assume that the 4-PAM signaling system 100 shown in FIG. 3 is utilizing a 4S5S transition-limiting code as described in the above-referenced U.S. patent application Ser. No. 10/314,985. Thus, in the embodiment of FIG. 3, the encoder 102 receives parallel input data $D_{in}$<7:0>, and then encodes the received parallel input data $D_{in}$<7:0> so as to provide parallel codewords to the serializing 4-PAM transmitter 104 that are organized as MSB codewords (M<4:0>) and LSB codewords (L<4:0>). The parallel input data $D_{in}$<7:0> is received as an 8-bit word. The MSB codewords (M<4:0>) and the LSB codewords (L<4:0>) each have 5 bits, wherein each MSB codeword (M<4:0>) has five codeword bits organized as <$C_1$, $C_3$, $C_5$, $C_7$, $C_9$> and each LSB codeword (L<4:0>) has five codeword bits organized as <$C_2$, $C_4$, $C_6$, $C_8$, $C_{10}$>. Thus, the MSB codewords (M<4:0>) and the LSB codewords (L<4:0>) together form 10-bit codewords (i.e., $C_1$, $C_2$, $C_3$, $C_4$, $C_5$, $C_6$, $C_7$, $C_8$, Cg, $C_{10}$) that are represented by groups of consecutive 2-bit symbols (i.e., $C_1$ & $C_2$, $C_3$ & $C_4$, $C_5$ & $C_6$, $C_7$ & $C_8$, and $C_9$ & $C_{10}$).

As mentioned above, since the above-described periodically unused outer 4-PAM signal levels associated with the 4S5S transition-limiting code being utilized within the 4-PAM signaling system 100 of FIG. 3 essentially constitute spare bandwidth; these periodically unused outer 4-PAM signal levels associated with the 4S5S transition-limiting code being utilized within the 4-PAM signaling system 100 of FIG. 3 may be used for other beneficial purposes in accordance with the present disclosure. One such beneficial purpose may be to indicate that a codeword has been altered in some manner. For example, the periodically unused outer 4-PAM signal levels associated with the 4S5S transition-limiting code being utilized within the 4-PAM signaling system 100 of FIG. 3 may be used to indicate that a codeword has been altered to provide a DC voltage balancing property to the 4S5S transition-limiting code being utilized within the 4-PAM signaling system 100 of FIG. 3. Such a DC voltage balancing property may be realized by determining a residual disparity weight polarity of a number of previously transmitted codewords, and then changing the weight polarity of a current codeword if the current codeword has the same weight polarity and such a weight polarity change would not violate the transition-limiting properties of the 4S5S transition-limiting code.

Referring to FIG. 4, there are shown triggering conditions and subsequent weight polarity reversal and flagging actions which may be taken by the encoder 102 of FIG. 3 to provide a DC voltage balancing property to the 4S5S transition-limiting code being utilized within the 4-PAM signaling system 100 of FIG. 3. The triggering conditions shown in FIG. 4 include both a requiring condition and an allowing condition which must be met before the encoder 102 will act to reverse the weight polarity of a current codeword, and thereby provide a DC voltage balancing property to the 4S5S transition-limiting code being utilized within the 4-PAM signaling system 100 of FIG. 3. The requiring condition is such that the residual disparity weight polarity of a number of previously transmitted codewords must be the same as the initial weight polarity of the current codeword. The allowing condition is such that any change in the initial weight polarity of the current codeword, as well as any use of the periodically unused outer 4-PAM signal levels, must not violate the transition-limiting properties of the 4S5S transition-limiting code. The weight polarity reversal and flagging actions are described below.

As indicated in FIG. 4, when the triggering conditions are met, the encoder 102 will reverse the weight polarity of the current codeword by changing the signal levels of all of the symbols in the current codeword. For example, using the integer-based binary signal level designation representations described above, assume that the 5 symbols in the current codeword have initial signal level values of $s_1^{(k+1)}$=+1 (i.e., a binary signal level designation of 01), $s_2^{(k+1)}$=−3 (i.e., a binary signal level designation of 10), $s_3^{(k+1)}$=−1 (i.e., a binary signal level designation of 11), $s_4^{(k+1)}$=+1 (i.e., a binary signal level designation of 01), and $s_5^{(k+1)}$=+3 (i.e., a binary signal level designation of 00). Then, the weight polarity of the current codeword is reversed by changing the signal level values of the 5 symbols in the current codeword such that the 5 symbols in the current codeword have changed signal level values of $s_1^{(k+1)}$=−1 (i.e., a binary signal level designation of 11), $s_2^{(k+1)}$=+3 (i.e., a binary signal level designation of 00), $s_3^{(k+1)}$=+1 (i.e., a binary signal level designation of 01), $s_4^{(k+1)}$=−1 (i.e., a binary signal level designation of 11), and $S_5^{(k+1)}$=−3 (i.e., a binary signal level designation of 10).

As also indicated in FIG. 4, when the triggering conditions are met, the encoder 102 will set the LSB of the first symbol in the current codeword to a "0" logic level so as to indicate that the weight polarity of the current codeword has been reversed to provide a DC voltage balancing property to the 4S5S transition-limiting code being utilized within the 4-PAM signaling system 100. This change in the LSB of the first symbol in the current codeword results in a utilization of the periodically unused outer 4-PAM signal levels associated with the 4S5S transition-limiting code being utilized within the 4-PAM signaling system 100. That is, this change in the LSB of the first symbol in the current codeword causes the signal level of the first symbol in the current codeword to change to one of the periodically unused outer 4-PAM signal levels associated with the 4S5S transition-limiting code being utilized within the 4-PAM signaling system 100. For example, using the integer-based binary signal level designation representations described above, assume that the first symbol in the current codeword has a weight polarity reversed signal level value of $s_1^{(k+1)}$=−1 (i.e., a binary signal level designation of 11). Then, setting the LSB of the first symbol in the current codeword to a "0" logic level causes the signal level of the first symbol in the current codeword to change such that the first symbol in the current codeword has a weight polarity reversed signal level value of $s_1^{(k+1)}$=−3 (i.e., a binary signal level designation of 10), which is one of the periodically unused outer 4-PAM signal levels associated with the 4S5S transition-limiting code being utilized within the 4-PAM signaling system 100. Thus, the encoder 102 utilizes the periodically unused outer 4-PAM signal levels associated with the 4S5S transition-limiting code being utilized within the 4-PAM signaling system 100 to indicate that the weight polarity of the current codeword has been reversed to provide a DC voltage balancing property to the 4S5S transition-limiting code being utilized within the 4-PAM signaling system 100.

Figure 5:
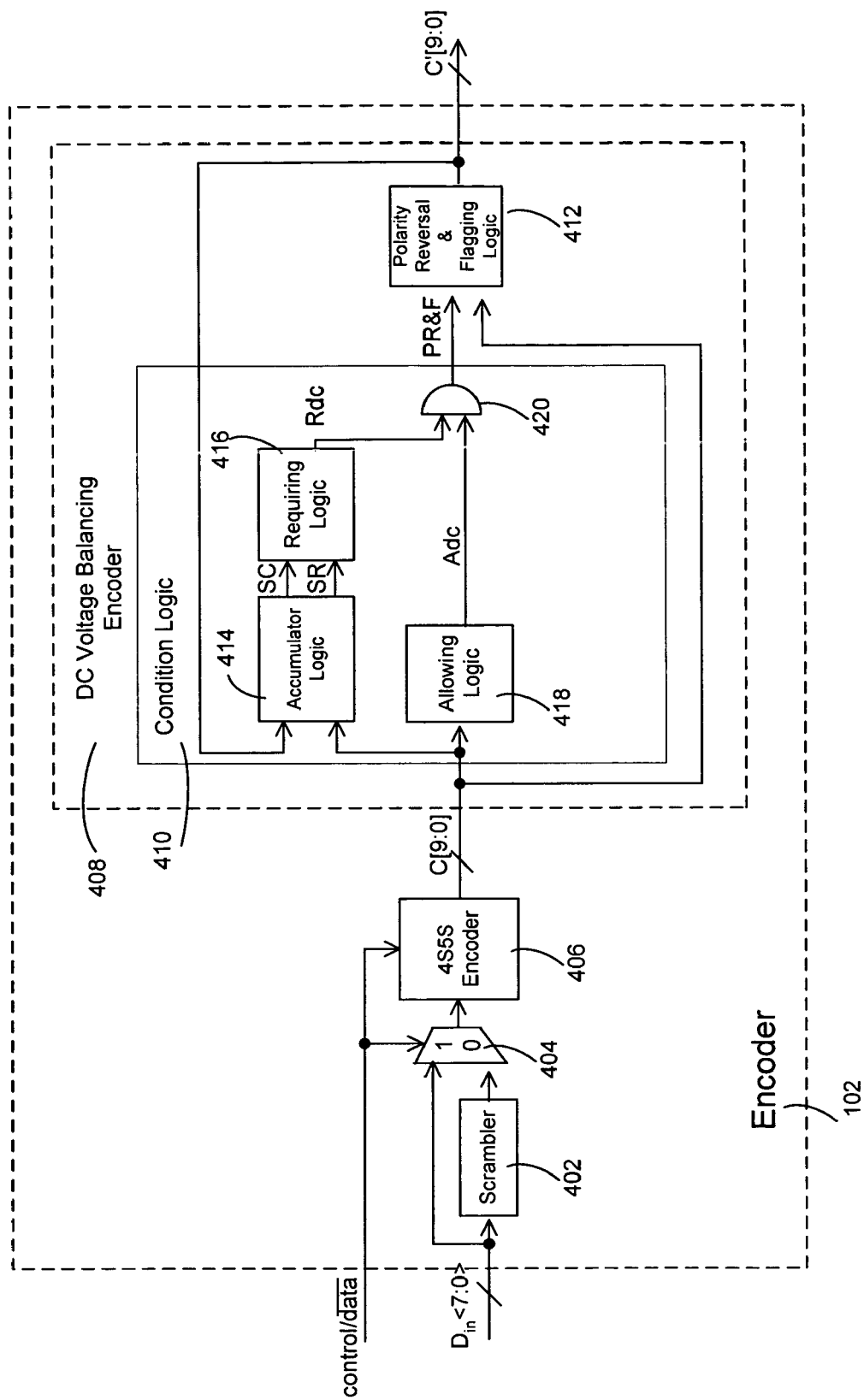
FIG. 5 shows a high level view of a DC voltage balancing encoder in accordance with an embodiment of the present disclosure.

Referring to FIG. 5, there is shown a high level view of an exemplary embodiment of the encoder 102 of FIG. 3 which operates in accordance with the triggering conditions and subsequent weight polarity reversal and flagging actions as set forth in FIG. 4 to provide a DC voltage balancing property to the 4S5S transition-limiting code being utilized within the 4-PAM signaling system 100 of FIG. 3. The encoder 102 comprises a scrambler 402, a multiplexer 404, a 4S5S encoder 406, and a DC voltage balancing encoder 408.

The encoder 102 receives the parallel input data $D_{in}$<7:0>, which is passed both through and around the scrambler 402. The scrambler 402 operates to randomize the parallel input data $D_{in}$<7:0> that is passed therethrough, which is a common function in many code-based signaling systems. The multiplexer 404 operates to provide either a scrambled or unscrambled version of the parallel input data $D_{in}$<7:0> to the 4S5S encoder 406, which operates to encode its received data using a 4S5S transition-limiting code such as, for example, as described in the above-referenced U.S. patent application Ser. No. 10/314,985. Both the multiplexer 404 and the 4S5S encoder 406 are controlled via the control/data input signal, which indicates whether the parallel input data $D_{in}$<7:0> is carrying control or data information. The multiplexer 404 uses the control/data input signal to provide an unscrambled version of the parallel input data $D_{in}$<7:0> to the 4S5S encoder 406 if the parallel input data $D_{in}$<7:0> is carrying control information. Otherwise, the multiplexer 404 uses the control/data input signal to provide a scrambled version of the parallel input data $D_{in}$<7:0> to the 4S5S encoder 406 if the parallel input data $D_{in}$<7:0> is carrying data information. The 4S5S encoder 406 uses the control/data input signal to encode the unscrambled control information or the scrambled data information accordingly such as, for example, as described in the above-referenced U.S. patent application Ser. No. 10/314,985. The 4S5S encoder 406 provides a 10-bit codeword (i.e., C[9:0]=$C_{10}$, $C_9$, $C_8$, $C_7$, $C_6$, $C_5$, $C_4$, $C_3$, $C_2$, $C_1$) to the DC voltage balancing encoder 408.

The DC voltage balancing encoder 408 comprises condition logic 410 and weight polarity reversal and flagging logic 412. The condition logic 410 comprises accumulator logic 414, requiring condition logic 416, allowing condition logic 418, and an AND logic device 420. The accumulator logic 414 receives the 10-bit codeword (i.e., C[9:0]=$C_{10}$, $C_9$, $C_8$, $C_7$, $C_6$, $C_5$, $C_4$, $C_3$, $C_2$, , $C_1$) output from the 4S5S encoder 406, as well as a 10-bit DC balanced codeword (i.e., C'[9:0]=$C'_{10}$, $C'_9$, $C'_8$, $C'_7$, $C'_6$, $C'_5$, $C'_4$, $C'_3$, $C'_2$, $C'_1$) output from the DC voltage balancing encoder 408, and operates to determine the current weight of the current codeword (i.e., $W(C^{(k)})$ as defined in FIG. 4), as well as residual weight of the current codeword and all prior codewords (i.e., $resd^{(k)}$ as defined in FIG. 4). Based upon these weight determinations, the accumulator logic 414 generates a signal representing the sign of the current weight of the current codeword (i.e., the SC signal) and a signal representing the sign of the residual weight of the current codeword and all prior codewords (i.e., the SR signal).

The requiring condition logic 416 receives the SC signal and the SR signal from the accumulator logic 414 and generates an $R_{dc}$ signal, which is set to a logic "1" state if the requiring condition as set forth in FIG. 4 is met.

The allowing condition logic 418 receives the 10-bit codeword (i.e., C[9:0]=$C_{10}$, $C_9$, $C_8$, $C_7$, $C_6$, $C_5$, $C_4$, $C_3$, $C_2$, $C_1$) output from the 4S5S encoder 406 and generates an $A_{dc}$ signal, which is set to a logic "1" state if the allowing condition as set forth in FIG. 4 is met.

The AND logic device 420 receives the $R_{dc}$ signal from the requiring condition logic 416 and the $A_{dc}$ signal from the allowing condition logic 418 and generates a PR&F signal for the weight polarity reversal and flagging logic 412.

The weight polarity reversal and flagging logic 412 receives the PR&F signal from the AND logic device 420, as well as the 10-bit codeword (i.e., C[9:0]=$C_{10}$, $C_9$, $C_8$, $C_7$, $C_6$, $C_5$, $C_4$, $C_3$, $C_2$, $C_1$) output from the 4S5S encoder 406, and generates the 10-bit DC balanced codeword (i.e., C'[9:0]=$C'_{10}$, $C'_9$, $C'_8$, $C'_7$, $C'_6$, $C'_5$, $C'_4$, $C'_3$, $C'_2$, $C'_1$) for the DC voltage balancing encoder 408, and hence the entire encoder 102.

Figure 5A:
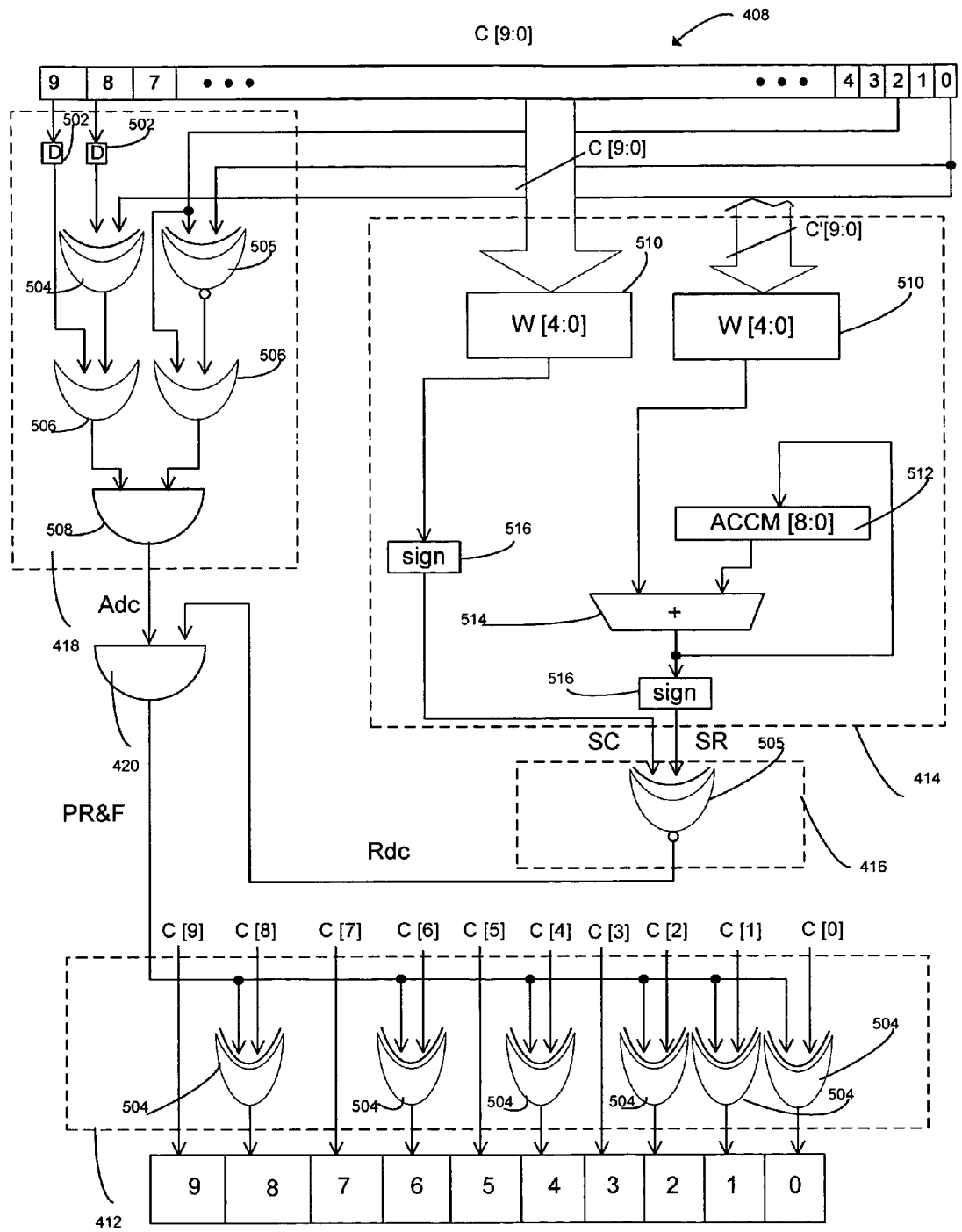
FIG. 5A shows a more detailed view of an exemplary embodiment of the DC voltage balancing encoder of FIG. 5.

Referring to FIG. 5A, there is shown a more detailed view of an exemplary embodiment of the DC voltage balancing encoder 408 of FIG. 5. Similar to the DC voltage balancing encoder 408 of FIG. 5, the DC voltage balancing encoder 408 of FIG. 5A comprises the weight polarity reversal and flagging logic 412, the accumulator logic 414, the requiring condition logic 416, the allowing condition logic 418, and the AND logic device 420. The weight polarity reversal and flagging logic 412 comprises a plurality of exclusive OR logic devices 504. The accumulator logic 414 comprises a plurality of weight calculators 510, a weight accumulator 512, an adder 514, and sign generators 516. The requiring condition logic 416 comprises an exclusive NOR logic device 505. The allowing condition logic 418 comprises a plurality of delay devices 502, an exclusive OR logic device 504, an exclusive NOR logic device 505, a plurality of OR logic devices 506, and an AND logic device 508. As described above, the DC voltage balancing encoder 408 operates by receiving the 10-bit codeword (i.e., C[9:0]=$C_{10}$, $C_9$, $C_8$, $C_7$, $C_6$, $C_5$, $C_4$, $C_3$, $C_2$, $C_1$) output from the 4S5S encoder 406, and then generating the 10-bit DC balanced codeword (i.e., C'[9:0]=$C'_{10}$, $C'_9$, $C'_8$, $C'_7$, $C'_6$, $C'_5$, $C'_4$, $C'_3$, $C'_2$, $C'_1$). The 10-bit DC balanced codeword (i.e., C'[9:0]=$C'_{10}$, $C'_9$, $C'_8$, $C'_7$, $C'_6$, $C'_5$, $C'_4$, $C'_3$, $C'_2$, $C'_1$) is then provided to the serializing 4-PAM transmitter 104 as an MSB codeword (M<4:0>) and an LSB codeword (L<4:0>) for transmission over the pair of signal carrying conductors 110 to the deserializing 4-PAM receiver 106 and then on to the decoder 108, as described above with respect to FIG. 3. FIG. 5A corresponds to the first set of triggering conditions and subsequent weight polarity reversal and flagging actions as set forth in FIG. 4.

Figure 5B:
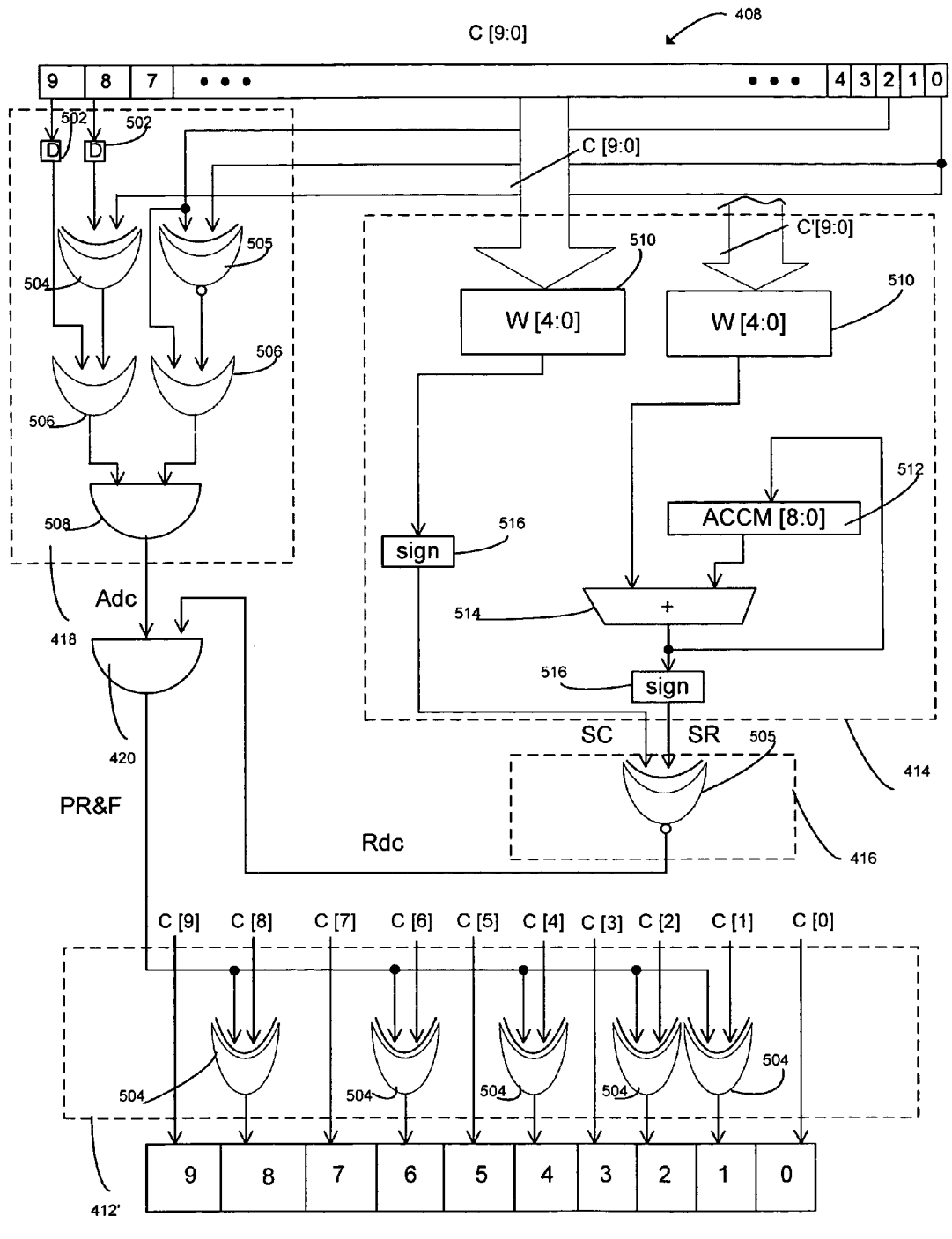
FIG. 5B shows a more detailed view of an alternative exemplary embodiment of the DC voltage balancing encoder of FIG. 5.

Referring to FIG. 5B, there is shown a more detailed view of an alternative exemplary embodiment of the DC voltage balancing encoder 408 of FIG. 5. FIG. 5B is similar to FIG. 5A, with the exception of having one less exclusive OR logic device 504 in the weight polarity reversal and flagging logic 412', as well as a different electrical connection scheme to accommodate same. FIG. 5B corresponds to the alternative set of triggering conditions and subsequent weight polarity reversal and flagging actions as set forth in FIG. 4.

Referring to FIG. 6, there are shown a triggering condition and subsequent weight polarity reversal and deflagging actions which may be taken by the decoder 108 of FIG. 3 to provide a DC voltage balancing property to the 4S5S transition-limiting code being utilized within the 4-PAM signaling system 100 of FIG. 3. The triggering condition shown in FIG. 6 includes an identifying condition which must be met before the decoder 108 will act to again reverse the weight polarity of a current codeword, and thereby provide a DC voltage balancing property to the 4S5S transition-limiting code being utilized within the 4-PAM signaling system 100 of FIG. 3. The identifying condition is such that the LSB of the first symbol in the current codeword must have a "0" logic level, which indicates that the weight polarity of the current codeword was previously reversed by the encoder 102 to provide a DC voltage balancing property to the 4S5S transition-limiting code being utilized within the 4-PAM signaling system 100. The weight polarity reversal and deflagging actions are described below.

As indicated in FIG. 6, when the triggering condition is met, the decoder 108 will set the LSB of the first symbol in the current codeword to a "1" logic level so that the signal level of the first symbol in the current codeword is no longer at one of the periodically unused outer 4-PAM signal levels associated with the 4S5S transition-limiting code being utilized within the 4-PAM signaling system 100. For example, using the integer-based binary signal level designation representations described above, assume that the first symbol in the current codeword has a weight polarity reversed signal level value of $s_1^{(k+1)}=-3$ (i.e., a binary signal level designation of 10). Then, setting the LSB of the first symbol in the current codeword to a "1" logic level causes the signal level of the first symbol in the current codeword to change such that the first symbol in the current codeword has a weight polarity reversed signal level value of $s_1^{(k+1)}=-1$ (i.e., a binary signal level designation of 11), which is not one of the periodically unused outer 4-PAM signal levels associated with the 4S5S transition-limiting code being utilized within the 4-PAM signaling system 100.

As also indicated in FIG. 6, when the triggering condition is met, the decoder 108 will again reverse the weight polarity of the current codeword by changing the signal levels of all of the symbols in the current codeword. For example, using the integer-based binary signal level designation representations described above, assume that the 5 symbols in the current codeword have weight polarity reversed signal level values of $s_1^{(k+1)}=-1$ (i.e., a binary signal level designation of 11), $s_2^{(k+1)}=+3$ (i.e., a binary signal level designation of 00), $s_3^{(k+1)}=+1$ (i.e., a binary signal level designation of 01), $s_4^{(k+1)}=-1$ (i.e., a binary signal level designation of 11), and $s_5^{(k+1)}=-3$ (i.e., a binary signal level designation of 10). Then, the weight polarity of the current codeword is reversed by changing the signal level values of the 5 symbols in the current codeword such that the 5 symbols in the current codeword have changed signal level values of $s_1^{(k+1)}=+1$ (i.e., a binary signal level designation of 01), $s_2^{(k+1)}=-3$ (i.e., a binary signal level designation of 10), $s_3^{(k+2)}=-1$ (i.e., a binary signal level designation of 11), $s_4^{(k+1)}=+1$ (i.e., a binary signal level designation of 01), and $s_5^{(k+1)}=+3$ (i.e., a binary signal level designation of 00).

Figure 7:
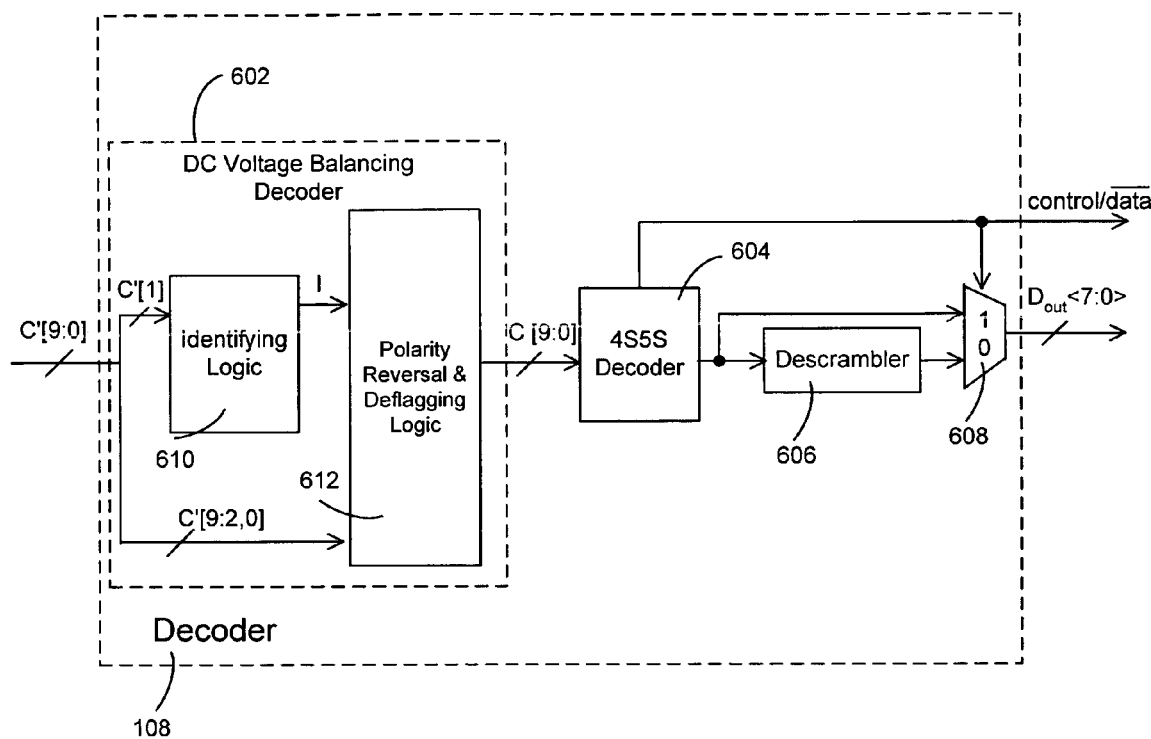
FIG. 7 shows a high level view of a DC voltage balancing decoder in accordance with an embodiment of the present disclosure.

Referring to FIG. 7, there is shown a high level view of an exemplary embodiment of the decoder 108 of FIG. 3 which operates in accordance with the triggering condition and subsequent weight polarity reversal and deflagging actions as set forth in FIG. 6 to provide a DC voltage balancing property to the 4S5S transition-limiting code being utilized within the 4-PAM signaling system 100 of FIG. 3. The decoder 108 comprises a DC voltage balancing decoder 602, a 4S5S decoder 604, a descrambler 606, and a multiplexer 608.

The DC voltage balancing decoder 602 comprises identifying condition logic 610 and weight polarity reversal and deflagging logic 612. The DC voltage balancing decoder 602 receives the 10-bit DC balanced codeword (i.e., $C'[9:0]=C'_{10}, C'_9, C'_8, C'_7, C'_6, C'_5, C'_4, C'_3, C'_2, C'_1$), which is divided between the identifying logic 610 and the weight polarity reversal and deflagging logic 612.

The identifying condition logic 610 receives one bit (i.e., $C'[1]$) of the 10-bit DC balanced codeword (i.e., $C'[9:0]=C'_{10}, C'_9, C'_8, C'_7, C'_6, C'_5, C'_4, C'_3, C'_2, C'_1$), and operates to determine if the LSB of the first symbol in the current codeword has a "0" logic level (i.e., if $LSB(S_1^{(k)})=0$, as defined in FIG. 6), which indicates that the weight polarity of the current codeword was previously reversed by the encoder 102 to provide a DC voltage balancing property to the 4S5S transition-limiting code being utilized within the 4-PAM signaling system 100. The identifying condition logic 610 generates an I signal, which is set to a logic "1" state if the identifying condition as set forth in FIG. 6 is met.

The weight polarity reversal and deflagging logic 612 receives the I signal from the identifying condition logic 610, as well as nine bits (i.e., $C'[9:2,0]$) of the 10-bit DC balanced codeword (i.e., $C'[9:0]=C'_{10}, C'_9, C'_8, C'_7, C'_6, C'_5, C'_4, C'_3, C'_2, C'_1$), and generates 10-bit codeword (i.e., $C[9:0]=C_{10}, C_9, C_8, C_7, C_6, C_5, C_4, C_3, C_2, C_1$) for the 4S5S decoder 604.

The 4S5S decoder 604 receives the 10-bit codeword (i.e., $C[9:0]=C_{10}, C_9, C_8, C_7, C_6, C_5, C_4, C_3, C_2, C_1$) from the DC voltage balancing decoder 602, and operates to decode the 10-bit codeword (i.e., $C[9:0]=C_{10}, C_9, C_8, C_7, C_6, C_5, C_4, C_3, C_2, C_1$) using a 4S5S transition-limiting code such as, for example, as described in the above-referenced U.S. patent application Ser. No. 10/314,985. The 4S5S decoder 604 provides either a scrambled or unscrambled version of the parallel input data $D_{in}<7:0>$ to both the descrambler 606 and the multiplexer 608, as well as a control/data output signal for controlling the multiplexer 608. The control/data output signal indicates whether the 10-bit codeword (i.e., $C[9:0]=C_{10}, C_9, C_8, C_7, C_6, C_5, C_4, C_3, C_2, C_1$) is carrying control or data information. If the parallel input data $D_{in}<7:0>$ was not scrambled by the encoder 102 (e.g., if the parallel input data $D_{in}<7:0>$ was carrying control information), then an unscrambled version of the parallel input data $D_{in}<7:0>$ is passed through the multiplexer 608 and output as the parallel output data $D_{out}<7:0>$. However, if the parallel input data $D_{in}<7:0>$ was scrambled by the encoder 102 (e.g., if the parallel input data $D_{in}<7:0>$ was carrying data information), then a scrambled version of the parallel input data $D_{in}<7:0>$ is passed through the descrambler 606, which operates to descramble the scrambled version of the parallel input data $D_{in}<7:0>$ that is passed therethrough, which is a common function in many code-based signaling systems. The descrambler 606 then provides an unscrambled version of the parallel input data $D_{in}<7:0>$ to the multiplexer 608 for output as the parallel output data $D_{out}<7:0>$.

Figure 7A:
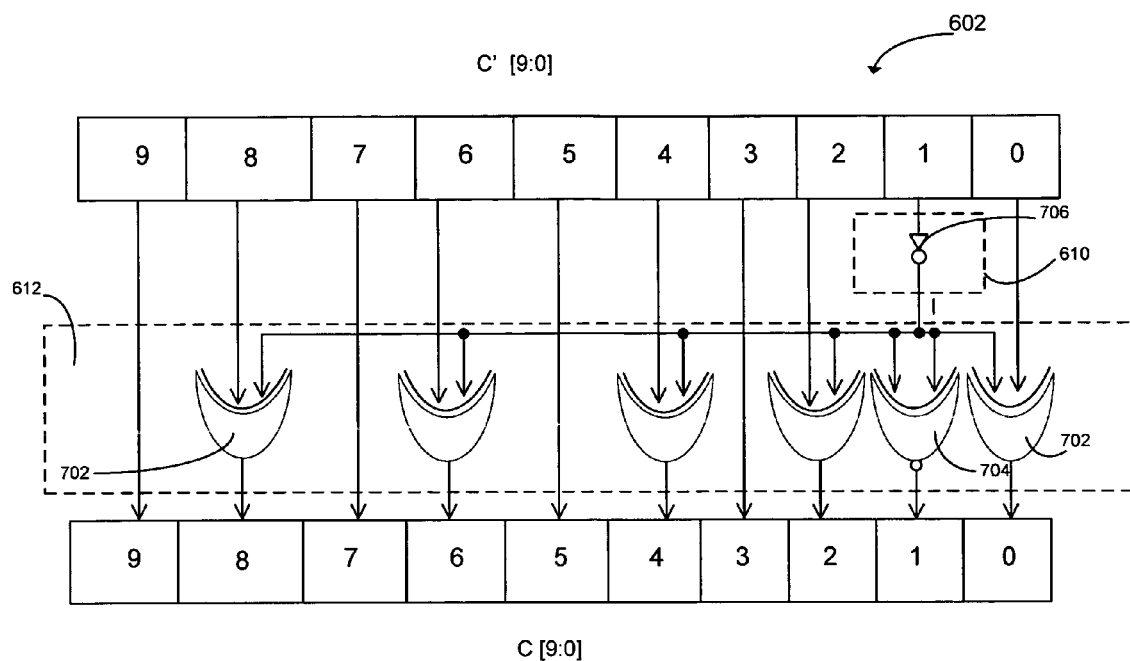
FIG. 7A shows a more detailed view of an exemplary embodiment of the DC voltage balancing decoder of FIG. 7.

Referring to FIG. 7A, there is shown a more detailed view of an exemplary embodiment of the DC voltage balancing decoder 602 of FIG. 7. Similar to the DC voltage balancing decoder 602 of FIG. 7, the DC voltage balancing decoder 602 of FIG. 7A comprises the identifying logic 610 and the weight polarity reversal and deflagging logic 612. The identifying logic 610 comprises an inverter device 706. The weight polarity reversal and deflagging logic 612 comprises a plurality of exclusive OR logic devices 702 and an exclusive NOR logic device 704. As described above, the DC voltage balancing decoder 602 operates by receiving the 10-bit DC balanced codeword (i.e., $C'[9:0]=C'_{10}, C'_9, C'_8, C'_7, C'_6, C'_5, C'_4, C'_3, C'_2, C'_1$), which is generated by the encoder 102 of FIG. 3 as described above, and then generating the original 10-bit codeword (i.e., $C[9:0]=C_{10}, C_9, C_8, C_7, C_6, C_5, C_4, C_3, C_2, C_1$). FIG. 7A corresponds to the first set of triggering condition and subsequent weight polarity reversal and deflagging actions as set forth in FIG. 6.

Figure 7B:
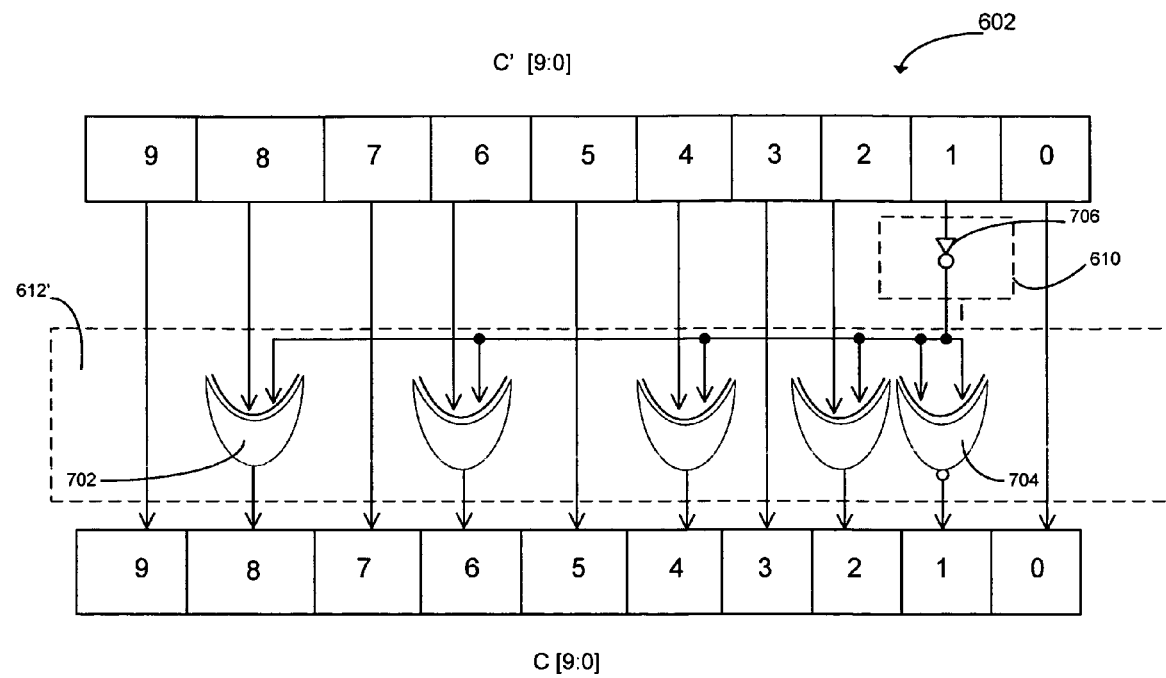
FIG. 7B shows a more detailed view of an alternative exemplary embodiment of the DC voltage balancing decoder of FIG. 7.

Referring to FIG. 7B, there is shown a more detailed view of an alternative exemplary embodiment of the DC voltage balancing decoder 602 of FIG. 7. FIG. 7B is similar to FIG. 7A, with the exception of having one less exclusive OR logic device 702 in the weight polarity reversal and deflagging logic 612', as well as a different electrical connection scheme to accommodate same. FIG. 7B corresponds to the alternative set of triggering condition and subsequent weight polarity reversal and deflagging actions as set forth in FIG. 6.

In summary, the DC voltage balancing encoder 408 of FIGS. 5 and 5A and the DC voltage balancing decoder 602 of FIGS. 7 and 7A operate in conjunction to utilize the periodically unused outer 4-PAM signal levels associated with the 4S5S transition-limiting code being utilized within the 4-PAM signaling system 100 to provide a DC voltage balancing property to the 4S5S transition-limiting code being utilized within the 4-PAM signaling system 100.

Figure 8:
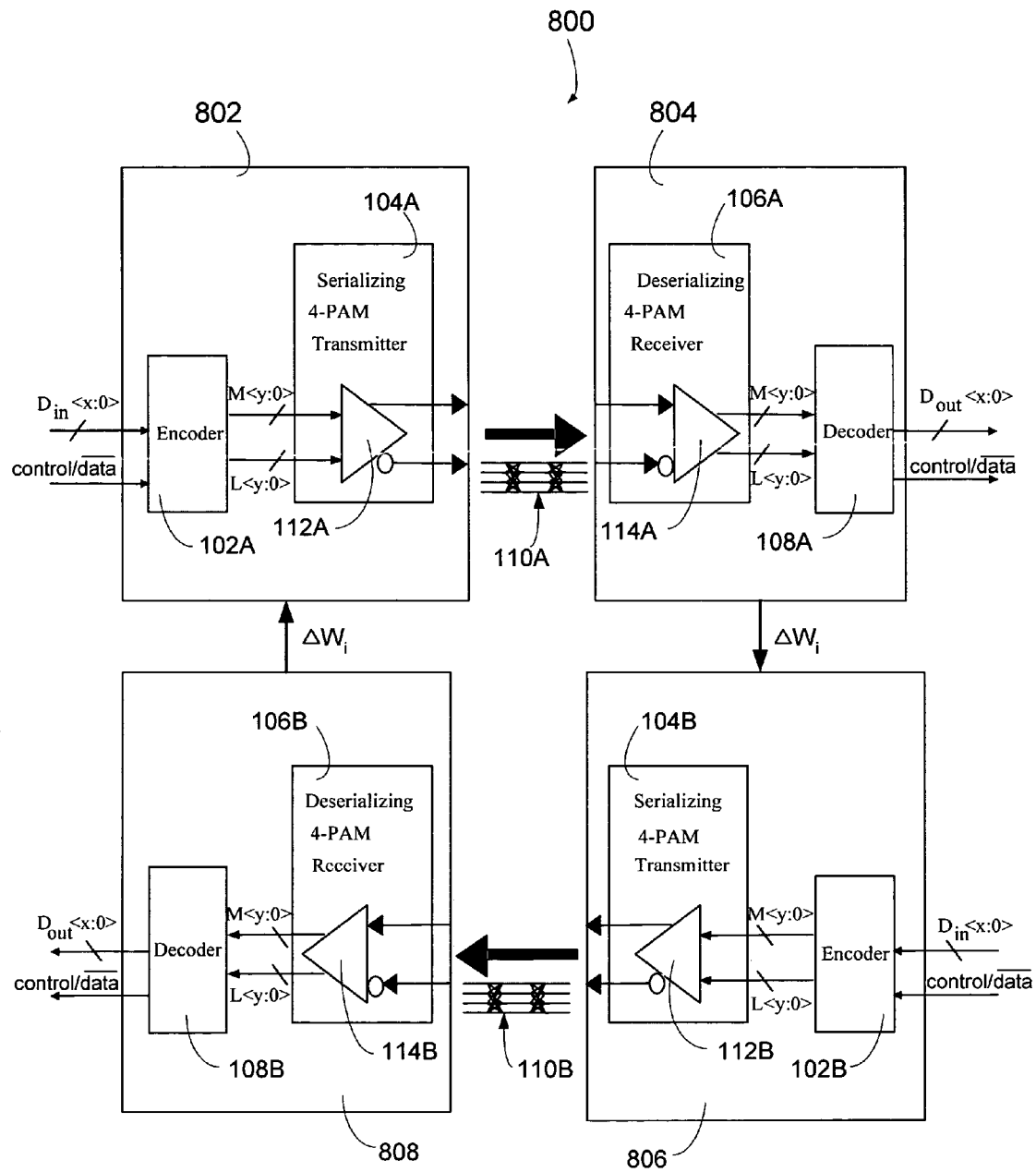
FIG. 8 shows a bidirectional 4-PAM signaling system which utilizes a 4S5S transition-limiting code having periodically unused outer 4-PAM signal levels.

Of course, the periodically unused outer 4-PAM signal levels associated with the 4S5S transition-limiting code being utilized within the 4-PAM signaling system 100 of FIG. 3 may also be used for still other beneficial purposes in accordance with the present disclosure. One such other beneficial purpose may be to transfer information between transmitter circuitry and receiver circuitry via a backchannel in a system having information being transferred in opposite directions. In one particular exemplary embodiment, the information could be adjustment information for equalizer coefficients in the transmitter circuitry. For example, referring to FIG. 8, there is shown a bidirectional 4-PAM signaling system 800 which utilizes a 4S5S transition-limiting code having periodically unused outer 4-PAM signal levels. The bidirectional 4-PAM signaling system 800 comprises first transmitter circuitry 802, first receiver circuitry 804, second transmitter circuitry 806, and second receiver circuitry 808, all of which comprise elements which may operate similar to corresponding elements shown in FIG. 3 having similar reference designators. As shown in FIG. 8, adjustment information for transmitter equalizer coefficients (i.e., $\Delta W_i$, wherein i equals the number of coefficients requiring adjustment (i.e., i=1, 2, 3, . . . )) is being provided from the first receiver circuitry 804 to the second transmitter circuitry 806 and from the second receiver circuitry 808 to the first transmitter circuitry 802. This adjustment information for transmitter equalizer coefficients (i.e., $\Delta W_i$, wherein i=1, 2, 3, . . . ) may be derived by the first receiver circuitry 804 and/or the second receiver circuitry 808 based upon recently received transmissions from the first transmitter circuitry 802 and/or the second transmitter circuitry 806, respectively. Once derived, this adjustment information for transmitter equalizer coefficients (i.e., $\Delta W_i$, wherein i=1, 2, 3, . . . ) may be transferred back to the appropriate transmitter circuitry utilizing the bidirectional characteristics of the bidirectional 4-PAM signaling system 800 of FIG. 8 and the periodically unused outer 4-PAM signal levels associated with the 4S5S transition-limiting code being utilized within the bidirectional 4-PAM signaling system 800 of FIG. 8. For example, coefficient adjustment information regarding an equalizer at the first transmitter circuitry 802 (second transmitter circuitry 806) may be generated at the first receiver circuitry 804 (second receiver circuitry 808) and then passed to and encoded by the second transmitter circuitry 806 (first transmitter circuitry 802) for transmission using spare bandwidth to the second receiver circuitry 808 (first receiver circuitry 804), which decodes and passes the coefficient adjustment information to the equalizer of the first transmitter circuitry 802 (second transmitter circuitry 806) for use therein. Thus, the periodically unused outer 4-PAM signal levels associated with the 4S5S transition-limiting code being utilized within the bidirectional 4-PAM signaling system 800 of FIG. 8 may be utilized to provide transmitter equalizer coefficient adjustment in accordance with an embodiment of the present disclosure. Such transmitter equalizer coefficient adjustment, which may be desirable to further counteract channel ISI at high bit rates, may be realized by utilizing the periodically unused outer 4-PAM signal levels associated with the 4S5S transition-limiting code being utilized within the bidirectional 4-PAM signaling system 800 of FIG. 8 to transfer transmitter equalizer coefficient adjustment information (i.e., $\Delta W_i$, wherein i=1, 2, 3, . . . ) if such utilization of the periodically unused outer 4-PAM signal levels associated with the 4S5S transition-limiting code being utilized within the bidirectional 4-PAM signaling system 800 of FIG. 8 does not violate the transition-limiting properties of the 4S5S transition-limiting code.

Referring to FIG. 9, there are shown conditions and subsequent actions which may be taken by the encoders 102A and 102B of FIG. 8 to transfer transmitter equalizer coefficient adjustment information (i.e., $\Delta W_i$, wherein i=1, 2, 3, . . . ) in the bidirectional 4-PAM signaling system 800 of FIG. 8. The conditions shown in FIG. 9 include allowing conditions (i.e., allowing condition 1, allowing condition 2, allowing condition 3, and allowing condition 4) which must be met before the encoders 102A and 102B will act to utilize the periodically unused outer 4-PAM signal levels associated with the 4S5S transition-limiting code being utilized within the bidirectional 4-PAM signaling system 800 of FIG. 8 to transfer transmitter equalizer coefficient adjustment information within the bidirectional 4-PAM signaling system 800 of FIG. 8. The first allowing condition (i.e., allowing condition 1) is such that the signal level values of the fifth symbol of a previous codeword, the first symbol of the current codeword, and the second symbol of the current codeword must match the signal level values contained within a first group of sets of signal level values (i.e., S+). Also, the first allowing condition (i.e., allowing condition 1) requires that the transmitter equalizer coefficient adjustment information (i.e., $\Delta W_i$, wherein i=1, 2, 3, . . . ) have a positive value, assuming that if $\Delta W_i=0$ (binary value), then $\Delta W_i>0$. The second allowing condition (i.e., allowing condition 2) is such that the signal level values of the fifth symbol of a previous codeword, the first symbol of the current codeword, and the second symbol of the current codeword must match the signal level values contained within a second group of sets of signal level values (i.e., S−). Also, the second allowing condition (i.e., allowing condition 2) requires that the transmitter equalizer coefficient adjustment information (i.e., $\Delta W_i$, wherein i=1, 2, 3, . . . ) have a negative value, assuming that if $\Delta W_i=1$ (binary value), then $\Delta W_i<0$. The third allowing condition (i.e., allowing condition 3) is such that the signal level values of the fifth symbol of a previous codeword, the first symbol of the current codeword, and the second symbol of the current codeword must match the signal level values contained within a first group of sets of signal level values (i.e., S+). Also, the third allowing condition (i.e., allowing condition 3) requires that the transmitter equalizer coefficient adjustment information (i.e., $\Delta W_i$, wherein i=1, 2, 3, . . . ) have a negative value, assuming that if $\Delta W_i=1$ (binary value), then $\Delta W_i<0$. The fourth allowing condition (i.e., allowing condition 4) is such that the signal level values of the fifth symbol of a previous codeword, the first symbol of the current codeword, and the second symbol of the current codeword must match the signal level values contained within a second group of sets of signal level values (i.e., S−). Also, the fourth allowing condition (i.e., allowing condition 4) requires that the transmitter equalizer coefficient adjustment information (i.e., $\Delta W_i$, wherein i=1, 2, 3, . . . ) have a positive value, assuming that if $\Delta W_i=0$ (binary value), then $\Delta W_i>0$. Both the first group of sets of signal level values (i.e., S+) and the second group of sets of signal level values (i.e., S−) are derived so that utilization of the periodically unused outer 4-PAM signal levels associated with the 4S5S transition-limiting code being utilized within the bidirectional 4-PAM signaling system 800 of FIG. 8 does not violate the transition-limiting properties of the 4S5S transition-limiting code.

As indicated in FIG. 9, when any of the allowing conditions (i.e., allowing condition 1, allowing condition 2, allowing condition 3, or allowing condition 4) are met, the encoders 102A and 102B will set the LSB of the first symbol in the current codeword to a "0" logic level, thereby utilizing the periodically unused outer 4-PAM signal levels associated with the 4S5S transition-limiting code being utilized within the bidirectional 4-PAM signaling system 800 to transfer transmitter equalizer coefficient adjustment information (i.e., $\Delta W_i$, wherein i=1, 2, 3, . . . ) in the bidirectional 4-PAM signaling system 800 of FIG. 8. That is, this change in the LSB of the first symbol in the current codeword causes the signal level of the first symbol in the current codeword to change to one of the periodically unused outer 4-PAM signal levels associated with the 4S5S transition-limiting code being utilized within the bidirectional 4-PAM signaling system 800. For example, using the integer-based binary signal level designation representations described above, assume that the first symbol in the current codeword has an initial signal level value of $s_1^{(k+1)}=-1$ (i.e., a binary signal level designation of 11). Then, setting the LSB of the first symbol in the current codeword to a "0" logic level causes the signal level of the first symbol in the current codeword to change such that the first symbol in the current codeword has an information transfer signal level value of $s_1^{(k+1)}=-3$ (i.e., a binary signal level designation of 10), which is one of the periodically unused outer 4-PAM signal levels associated with the 4S5S transition-limiting code being utilized within the bidirectional 4-PAM signaling system 800. Thus, the encoders 102A and 102B utilize the periodically unused outer 4-PAM signal levels associated with the 4S5S transition-limiting code being utilized within the bidirectional 4-PAM signaling system 800 to transfer transmitter equalizer coefficient adjustment information (i.e., $\Delta W_i$, wherein i=1, 2, 3, . . . ) in the bidirectional 4-PAM signaling system 800 of FIG. 8.

Figure 10:
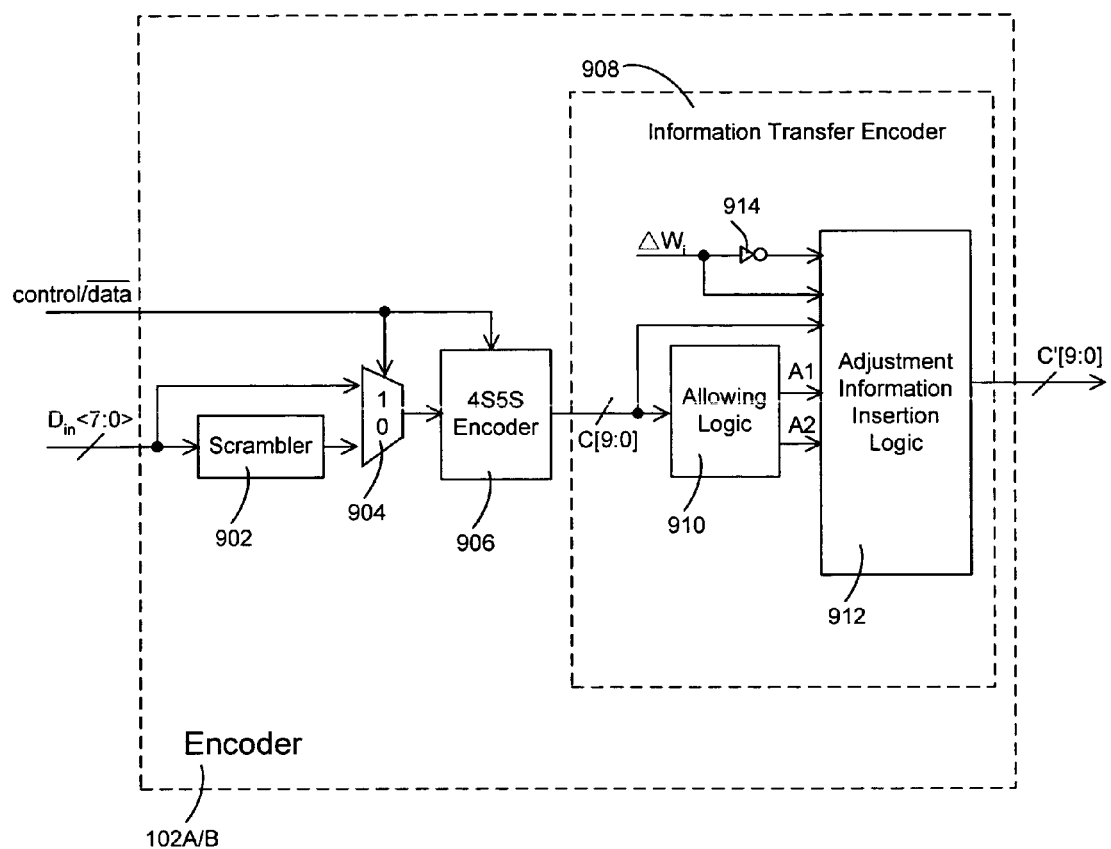
FIG. 10 shows a high level view of an information transfer encoder in accordance with an embodiment of the present disclosure.

Referring to FIG. 10, there is shown a high level view of an exemplary embodiment of the encoder 102A/B of FIG. 8 which operates in accordance with the conditions and subsequent actions as set forth in FIG. 9 to provide an information transfer aspect to the 4S5S transition-limiting code being utilized within the 4-PAM signaling system 800 of FIG. 8. The encoder 102A/B comprises a scrambler 902, a multiplexer 904, a 4S5S encoder 906, and an information transfer encoder 908.

The encoder 102A/B receives the parallel input data $D_{in}<7:0>$, which is passed both through and around the scrambler 902. The scrambler 902 operates to randomize the parallel input data $D_{in}<7:0>$ that is passed therethrough, which is a common function in many code-based signaling systems. The multiplexer 904 operates to provide either a scrambled or unscrambled version of the parallel input data $D_{in}<7:0>$ to the 4S5S encoder 906, which operates to encode its received data using a 4S5S transition-limiting code such as, for example, as described in the above-referenced U.S. patent application Ser. No. 10/314,985. Both the multiplexer 904 and the 4S5S encoder 906 are controlled via a control/data input signal, which indicates whether the parallel input data $D_{in}<7:0>$ is carrying control or data information. The multiplexer 904 uses the control/data input signal to provide an unscrambled version of the parallel input data $D_{in}<7:0>$ to the 4S5S encoder 906 if the parallel input data $D_{in}<7:0>$ is carrying control information. Otherwise, the multiplexer 904 uses the control/data input signal to provide a scrambled version of the parallel input data $D_{in}<7:0>$ to the 4S5S encoder 906 if the parallel input data $D_{in}<7:0>$ is carrying data information. The 4S5S encoder 906 uses the control/data input signal to encode the unscrambled control information or the scrambled data information accordingly such as, for example, as described in the above-referenced U.S. patent application Ser. No. 10/314,985. The 4S5S encoder 906 provides a 10-bit codeword (i.e., $C[9:0]=C_{10}, C_9, C_8, C_7, C_6, C_5, C_4, C_3, C_2, C_1$) to the information transfer encoder 908.

The information transfer encoder 908 comprises allowing condition logic 910, adjustment information insertion logic 912, and an inverter device 914. The allowing condition logic 910 receives the 10-bit codeword (i.e., $C[9:0]=C_{10}, C_9, C_8, C_7, C_6, C_5, C_4, C_3, C_2, C_1$) output from the 4S5S encoder 906, and generates allowing signals A1 and A2, which are set to logic "1" states if the first allowing condition or the second allowing condition as set forth in FIG. 9 is met, respectively. The adjustment information insertion logic 912 receives the 10-bit codeword (i.e., $C[9:0]=C_{10}, C_9, C_8, C_7, C_6, C_5, C_4, C_3, C_2, C_1$) output from the 4S5S encoder 906, the allowing signals A1 and A2 from the allowing condition logic 910, and inverted and non-inverted versions of the transmitter equalizer coefficient adjustment information (i.e., $\Delta W_i$, wherein i=1, 2, 3, . . . ), and generates a 10-bit information transfer codeword (i.e., $C'[9:0]=C'_{10}, C'_9, C'_8, C'_7, C'_6, C'_5, C'_4, C'_3, C'_2, C'_1$) for the information transfer encoder 908, and hence the entire encoder 102A/B.

Figure 10A:
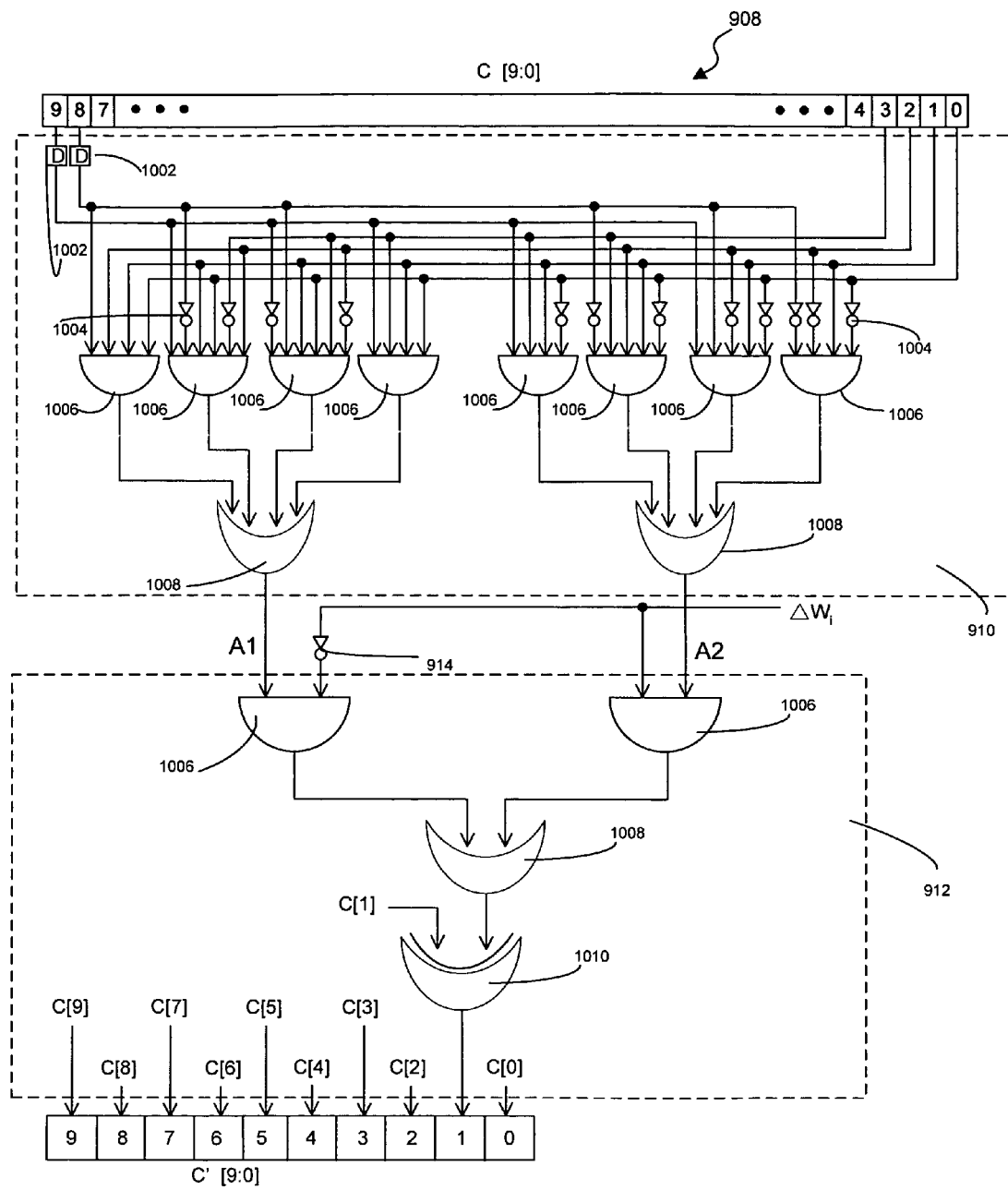
FIG. 10A shows a more detailed view of an exemplary embodiment of the information transfer encoder of FIG. 10.

Referring to FIG. 10A, there is shown a more detailed view of an exemplary embodiment of the information transfer encoder 908 of FIG. 10. Similar to the information transfer encoder 908 of FIG. 10, the information transfer encoder 908 of FIG. 10A comprises allowing condition logic 910, adjustment information insertion logic 912, and an inverter device 914. The allowing condition logic 910 comprises a plurality of delay devices 1002, a plurality of inverter devices 1004, a plurality of AND logic devices 1006, and a plurality of OR logic devices 1008. The adjustment information insertion logic 912 comprises a plurality of AND logic devices 1006, an OR logic device 1008, and an exclusive OR logic device 1010. As described above, the information transfer encoder 908 operates by receiving the 10-bit codeword (i.e., $C[9:0]=C_{10}, C_9, C_8, C_7, C_6, C_5, C_4, C_3, C_2, C_1$) output from the 4S5S encoder 906, and then generating the 10-bit information transfer codeword (i.e., $C'[9:0]=C'_{10}, C'_9, C'_8, C'_7, C'_6, C'_5, C'_4, C'_3, C'_2, C'_1$). The 10-bit information transfer codeword (i.e., $C'[9:0]=C'_1, C'_2, C'_3, C'_4, C'_5, C'_6, C'_7, C'_8, C'_9, C'_{10}$) is then provided to a serializing 4-PAM transmitter 104A/B (and to a differential transmitter 112A/B) as an MSB codeword (M<4:0>) and an LSB codeword (L<4:0>) for transmission over a pair of signal carrying conductors 110A/B to a deserializing 4-PAM receiver 106A/B (and to a differential receiver 114A/B) and then on to a decoder 108A/B, respectively, as described above with respect to FIG. 8.

At this point it should be noted that the information transfer encoder 908 of FIG. 10A is designed such that the first group of sets of signal level values (i.e., $S_1^{(+)}$) comprises the sets of (1,1,3), (3,1,1), (−1,1,3), (3,1,−1), (3,1,3), (1,1,1), (1,1,−1), (−1,1,1), and (−1,1,−1). Also, the information transfer encoder 908 of FIG. 10A is designed such that the second group of sets of signal level values (i.e., $S_1^{(-)}$) comprises the sets of (1,−1,−3), (−3,−1,1), (−3,−1,−1), (−1,−1,−3), (−3,−1,−3), (−1,−1,−1), (−1,−1,1), (1,−1,−1), and (1,−1,1). Further, in the information transfer encoder 908 of FIG. 10A, the transmitter equalizer coefficient adjustment information (i.e., $\Delta W_i$, wherein i=1, 2, 3, . . . ) may be defined by $\Delta W_i=0$ (binary value) for $\Delta W_i>0$ and $\Delta W_i=1$ (binary value) for $\Delta W_i<0$. FIG. 10A corresponds to the first set of conditions and subsequent actions as set forth in FIG. 9.

Figure 11:
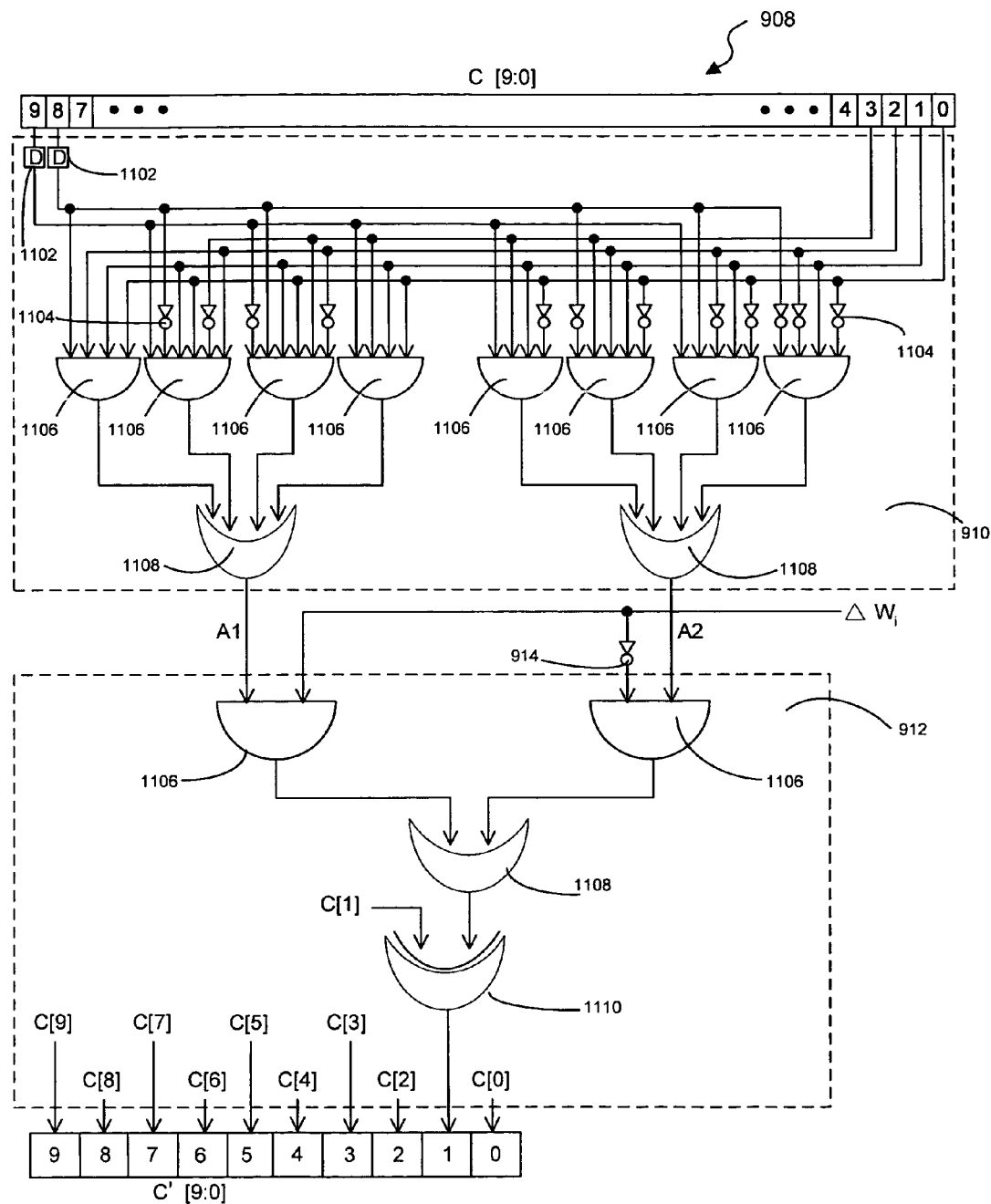
FIG. 11 shows a more detailed view of an alternative exemplary embodiment of the information transfer encoder of FIG. 10.

Referring to FIG. 11, there is shown a more detailed view of an alternative exemplary embodiment of the information transfer encoder 908 of FIG. 10. Similar to the information transfer encoder 908 of FIG. 10, the information transfer encoder 908 of FIG. 11 comprises allowing condition logic 910, adjustment information insertion logic 912, and an inverter device 914. The allowing condition logic 910 comprises a plurality of delay devices 1102, a plurality of inverter devices 1104, a plurality of AND logic devices 1106, and a plurality of OR logic devices 1108. The adjustment information insertion logic 912 comprises a plurality of AND logic devices 1106, an OR logic device 1108, and an exclusive OR logic device 1110. As described above, the information transfer encoder 908 operates by receiving a 10-bit codeword (i.e., C[9:0]=C$_{10}$, C$_9$, C$_8$, C$_7$, C$_6$, C$_5$, C$_4$, C$_3$, C$_2$, C$_1$) output from the 4S5S encoder 906, and then generating a 10-bit information transfer codeword (i.e., C'[9:0]=C'$_{10}$, C'$_9$, C'$_8$, C'$_7$, C'$_6$, C'$_5$, C'$_4$, C'$_3$, C'$_2$, C'$_1$). The 10-bit information transfer codeword (i.e., C'[9:0]=C'$_{10}$, C'$_9$, C'$_8$, C'$_7$, C'$_6$, C'$_5$, C'$_4$, C'$_3$, C'$_2$, C'$_1$) is then provided to a serializing 4-PAM transmitter 104A/B (and to a differential transmitter 112A/B) as an MSB codeword (M<4:0>) and an LSB codeword (L<4:0>) for transmission over a pair of signal carrying conductors 110A/B to a deserializing 4-PAM receiver 106A/B (and to a differential receiver 114A/B) and then on to a decoder 108A/B, respectively, as described above with respect to FIG. 8.

At this point it should be noted that the information transfer encoder 908 of FIG. 11 is designed such that the first group of sets of signal level values (i.e., $S_2^{(+)}=S_1^{(-)}$) comprises the sets of (1,−1,−3), (−3,−1,1), (−3,−1,−1), (−1,−1,−3), (−3,−1,−3), (−1,−1,−1), (−1,−1,−1), (−1,−1,−1), and (1,−1,1) Also, the information transfer encoder 908 of FIG. 11 is designed such that the second group of sets of signal level values (i.e., $S_2^{(-)}=S_1^{(+)}$) comprises the sets of (1,1,3), (3,1,1), (−1,1,3), (3,1,−1), (3,1,3), (1,1,1), (1,1,−1), (−1,1,1), and (−1,1,−1). FIG. 11 corresponds to the first alternative set of conditions and subsequent actions as set forth in FIG. 9.

Figure 12:
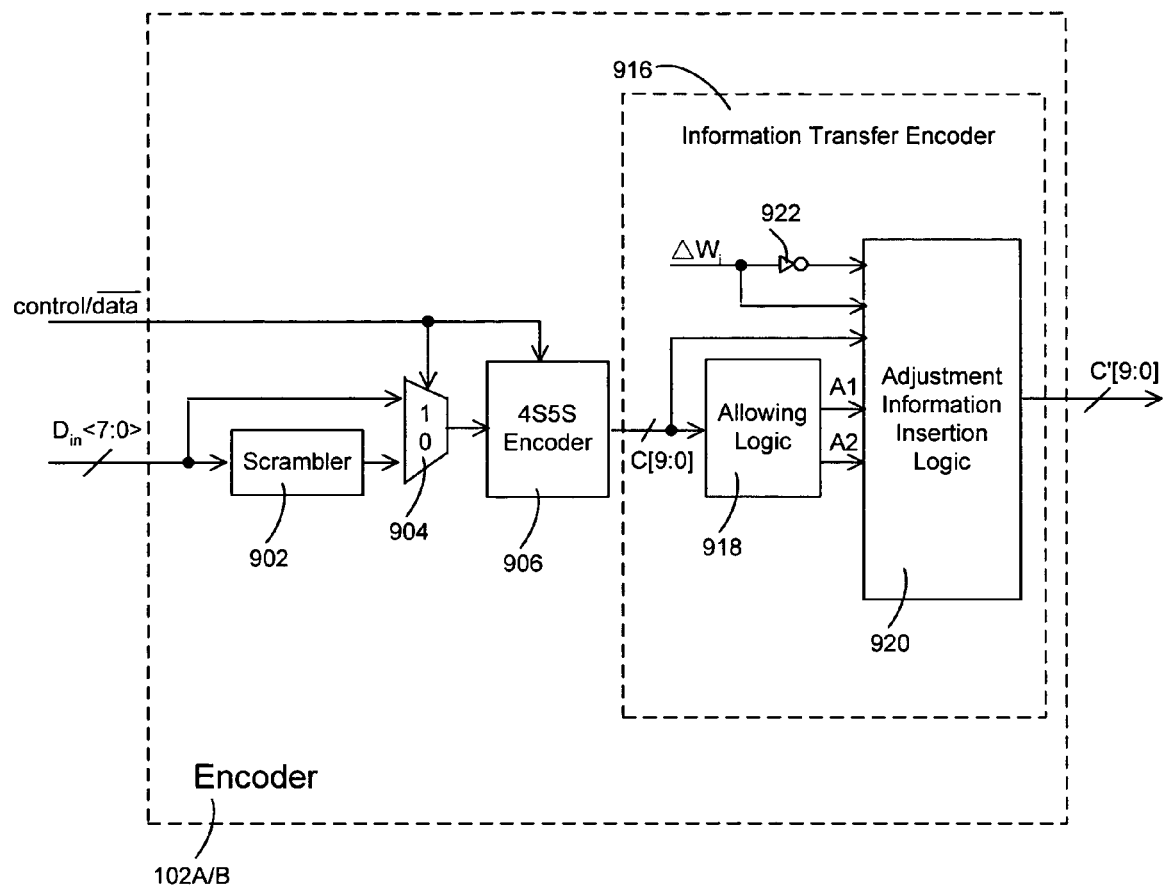
FIG. 12 shows a high level view of an information transfer encoder in accordance with an alternate embodiment of the present disclosure.

Referring to FIG. 12, there is shown a high level view of an alternative exemplary embodiment of the encoder 102A/B of FIG. 8 which operates in accordance with the conditions and subsequent actions as set forth in FIG. 9 to provide an information transfer aspect to the 4S5S transition-limiting code being utilized within the 4-PAM signaling system 800 of FIG. 8. The encoder 102A/B comprises a scrambler 902, a multiplexer 904, a 4S5S encoder 906, and an information transfer encoder 916.

The encoder 102A/B receives the parallel input data D$_{in}$<7:0>, which is passed both through and around the scrambler 902. The scrambler 902 operates to randomize the parallel input data D$_{in}$<7:0> that is passed therethrough, which is a common function in many code-based signaling systems. The multiplexer 904 operates to provide either a scrambled or unscrambled version of the parallel input data D$_{in}$<7:0> to the 4S5S encoder 906, which operates to encode its received data using a 4S5S transition-limiting code such as, for example, as described in the above-referenced U.S. patent application Ser. No. 10/314,985. Both the multiplexer 904 and the 4S5S encoder 906 are controlled via a control/data input signal, which indicates whether the parallel input data D$_{in}$<7:0> is carrying control or data information. The multiplexer 904 uses the control/data input signal to provide an unscrambled version of the parallel input data D$_{in}$<7:0> to the 4S5S encoder 906 if the parallel input data D$_{in}$<7:0> is carrying control information. Otherwise, the multiplexer 904 uses the control/data input signal to provide a scrambled version of the parallel input data D$_{in}$<7:0> to the 4S5S encoder 906 if the parallel input data D$_{in}$<7:0> is carrying data information. The 4S5S encoder 906 uses the control/data input signal to encode the unscrambled control information or the scrambled data information accordingly such as, for example, as described in the above-referenced U.S. patent application Ser. No. 10/314,985. The 4S5S encoder 906 provides a 10-bit codeword (i.e., C[9:0]=C$_{10}$, C$_9$, C$_8$, C$_7$, C$_6$, C$_5$, C$_4$, C$_3$, C$_2$, C$_1$) to the information transfer encoder 916.

The information transfer encoder 916 comprises allowing condition logic 918, adjustment information insertion logic 920, and an inverter device 922. The allowing condition logic 918 receives the 10-bit codeword (i.e., C[9:0]=C$_{10}$, C$_9$, C$_8$, C$_7$, C$_6$, C$_5$, C$_4$, C$_3$, C$_2$, C$_1$) output from the 4S5S encoder 906, and generates allowing signals A1 and A2, which are set to logic "1" states if the first allowing condition or the second allowing condition as set forth in FIG. 9 is met, respectively. The adjustment information insertion logic 920 receives the 10-bit codeword (i.e., C[9:0]=C$_{10}$, C$_9$, C$_8$, C$_7$, C$_6$, C$_5$, C$_4$, C$_3$, C$_2$, C$_1$) output from the 4S5S encoder 906, the allowing signals A1 and A2 from the allowing condition logic 918, and inverted and non-inverted versions of the transmitter equalizer coefficient adjustment information (i.e., ΔW$_i$, wherein i=1, 2, 3, . . . ), and generates a 10-bit information transfer codeword (i.e., C'[9:0]=C'$_{10}$, C'$_9$, C'$_8$, C'$_7$, C'$_6$, C'$_5$, C'$_4$, C'$_3$, C'$_2$, C'$_1$) for the information transfer encoder 916, and hence the entire encoder 102A/B.

Figure 12A:
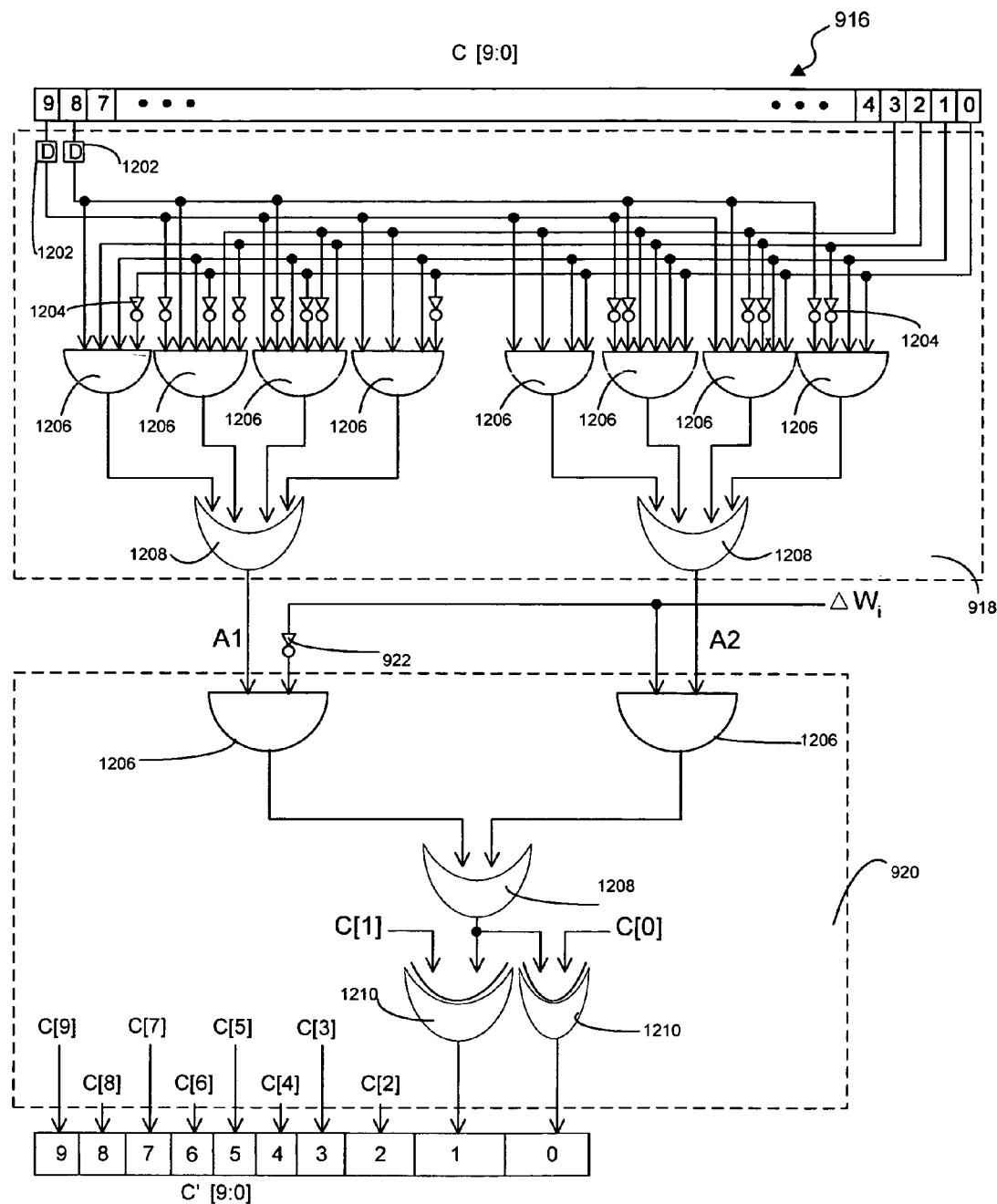
FIG. 12A shows a more detailed view of an exemplary embodiment of the information transfer encoder of FIG. 12.

Referring to FIG. 12A, there is shown a more detailed view of an exemplary embodiment of the information transfer encoder 916 of FIG. 12. Similar to the information transfer encoder 908 of FIG. 10, the information transfer encoder 916 of FIG. 12A comprises allowing condition logic 918, adjustment information insertion logic 920, and an inverter device 922. The allowing condition logic 918 comprises a plurality of delay devices 1202, a plurality of inverter devices 1204, a plurality of AND logic devices 1206, and a plurality of OR logic devices 1208. The adjustment information insertion logic 920 comprises a plurality of AND logic devices 1206, an OR logic device 1208, and a plurality of exclusive OR logic devices 1210. As described above, the information transfer encoder 916 operates by receiving a 10-bit codeword (i.e., C[9:0]=C$_{10}$, C$_9$, C$_8$, C$_7$, C$_6$, C$_5$, C$_4$, C$_3$, C$_2$, C$_1$) output from the 4S5S encoder 906, and then generating a 10-bit information transfer codeword (i.e., C'[9:0]=C'$_{10}$, C'$_9$, C'$_8$, C'$_7$, C'$_6$, C'$_5$, C'$_4$, C'$_3$, C'$_2$, C'$_1$). The 10-bit information transfer codeword (i.e., C'[9:0]=C'$_{10}$, C'$_9$, C'$_8$, C'$_7$, C'$_6$, C'$_5$, C'$_4$, C'$_3$, C'$_2$, C'$_1$) is then provided to a serializing 4-PAM transmitter 104A/B (and to a differential transmitter 112A/B) as an MSB codeword (M<4:0>) and an LSB codeword (L<4:0>) for transmission over a pair of signal carrying conductors 110A/B to a deserializing 4-PAM receiver 106A/B (and to a differential receiver 114A/B) and then on to a decoder 108A/B, respectively, as described above with respect to FIG. 8.

At this point it should be noted that the information transfer encoder 916 of FIG. 12A is designed such that the first group of sets of signal level values (i.e., $S_3^{(+)}$) comprises the sets of (3,−1,3), (3,−1,1), (1,−1,3), (1,−1,1), (3,−1,−1), (−1,−1,3), (1,−1,−1), (1,−1,−1) and (1,1,−1). Also, the information transfer encoder 916 of FIG. 12A is designed such that the second group of sets of signal level values (i.e., $S_3^{(-)}$) comprises the sets of (−3,1,−3), (−3,1,1), (1,1,−3), (1,1,1), (−3,1,−1), (−1,1,−3), (−1,1,−1), (1,−1,1), and (1,1,−1). Further, in the information transfer encoder 916 of FIG. 12A, the transmitter equalizer coefficient adjustment information (i.e., ΔW$_i$, wherein i=1, 2, 3, . . . ) may be defined by ΔW$_i$=0 (binary value) for ΔW$_i$>0 and ΔW$_i$=1 (binary value) for ΔW$_i$<0. FIG. 12A corresponds to the second alternative set of conditions and subsequent actions as set forth in FIG. 9.

Figure 13:
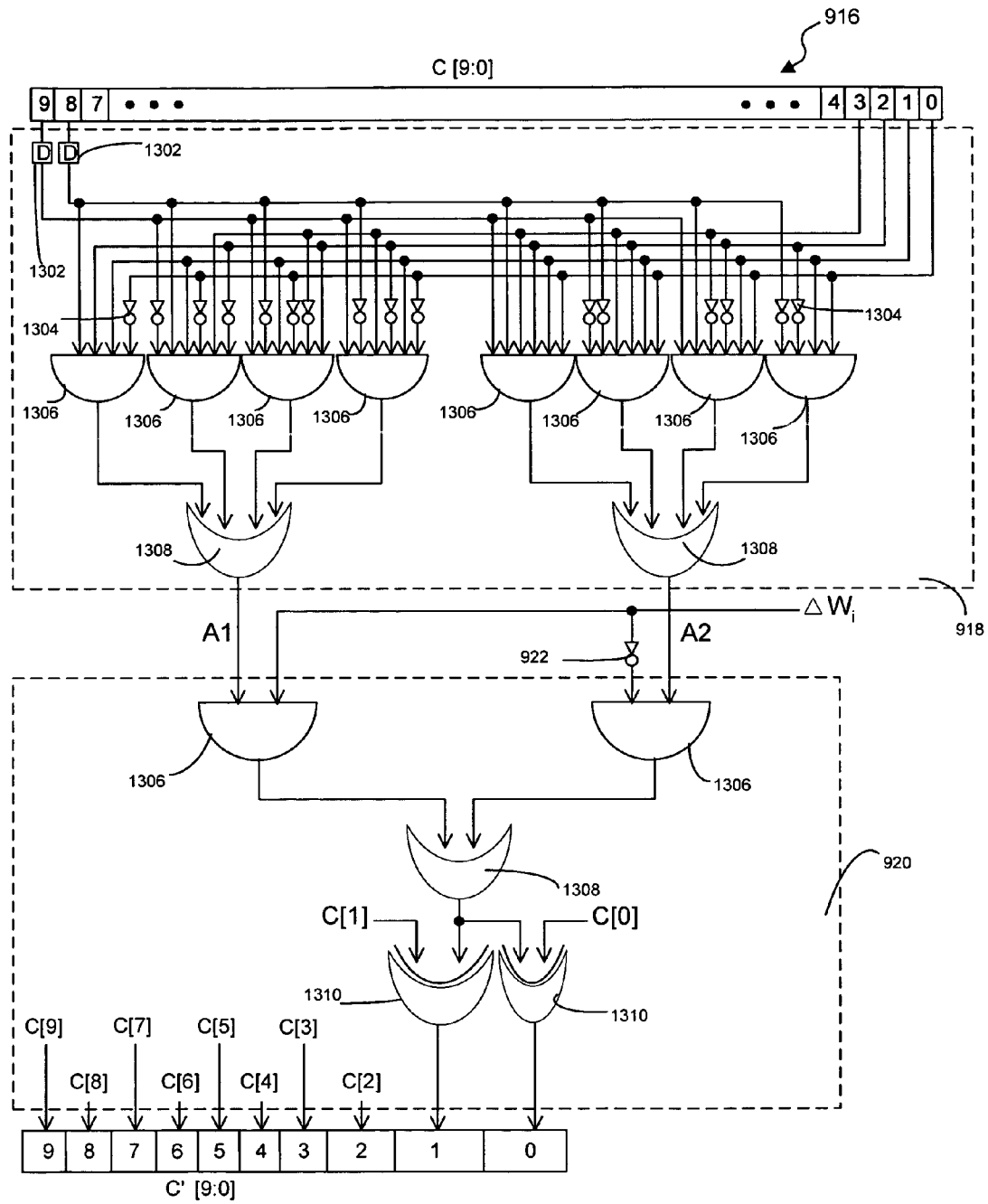
FIG. 13 shows a more detailed view of an alternative exemplary embodiment of the information transfer encoder of FIG. 12.

Referring to FIG. 13, there is shown a more detailed view of an alternative exemplary embodiment of the information transfer encoder 916 of FIG. 12. Similar to the information transfer encoder 916 of FIG. 12, the information transfer encoder 916 of FIG. 13 comprises allowing condition logic 918, adjustment information insertion logic 920, and an inverter device 922. The allowing condition logic 918 comprises a plurality of delay devices 1302, a plurality of inverter devices 1304, a plurality of AND logic devices 1306, and a plurality of OR logic devices 1308. The adjustment information insertion logic 920 comprises a plurality of AND logic devices 1306, an OR logic device 1308, and a plurality of exclusive OR logic devices 1310. As described above, the Information transfer encoder 916 operates by receiving a 10-bit codeword (i.e., C[9:0]=$C_{10}$, $C_9$, $C_8$, $C_7$, $C_6$, $C_5$, $C_4$, $C_3$, $C_2$, $C_1$) output from the 4S5S encoder 906, and then generating a 10-bit information transfer codeword (i.e., C'[9:0]=$C'_{10}$, $C'_9$, $C'_8$, $C'_7$, $C'_6$, $C'_5$, $C'_4$, $C'_3$, $C'_2$, $C'_1$). The 10-bit information transfer codeword (i.e., C'[9:0]=$C'_{10}$, $C'_9$, $C'_8$, $C'_7$, $C'_6$, $C'_5$, $C'_4$, $C'_3$, $C'_2$, $C'_1$) is then provided to a serializing 4-PAM transmitter 104A/B (and to a differential transmitter 112A/B) as an MSB codeword (M<4:0>) and an LSB codeword (L<4:0>) for transmission over a pair of signal carrying conductors 110A/B to a deserializing 4-PAM receiver 106A/B (and to a differential receiver 114A/B) and then on to a decoder 108A/B, respectively, as described above with respect to FIG. 8.

At this point it should be noted that the information transfer encoder 916 of FIG. 13 is designed such that the first group of sets of signal level values (i.e., $S_4^{(+)}=S_3^{(-)}$) comprises the sets of (−3,1,−3), (−3,1,1), (1,1,−3), (1,1,1), (−3,1,−1), (−1,1,−3), (−1,1,−1), (−1,1,1), and (1,1,−1). Also, the information transfer encoder 916 of FIG. 13 is designed such that the second group of sets of signal level values (i.e., $S_4^{(-)}=S_3^{(+)}$) comprises the sets of (3,−1,3), (3,−1,1), (1,−1,3), (1,1,−1). FIG. 13 corresponds to the third alternative set of conditions and subsequent actions as set forth in FIG. 9.

Referring to FIG. 14, there are shown a condition and subsequent actions which may be taken by the decoders 108A and 108B of FIG. 8 to transfer transmitter equalizer coefficient adjustment information (i.e., $\Delta W_i$, wherein i=1, 2, 3, . . . ) in the bidirectional 4-PAM signaling system 800 of FIG. 8. The condition shown in FIG. 14 includes an identifying condition which must be met before the decoders 108A and 108B will act to retrieve transmitter equalizer coefficient adjustment information from the current codeword, and thereby complete the transfer of transmitter equalizer coefficient adjustment information within the bidirectional 4-PAM signaling system 800 of FIG. 8. The identifying condition is such that the LSB of the first symbol in the current codeword must have a "0" logic level, which indicates that transmitter equalizer coefficient adjustment information was previously added by the encoders 102A and 102B so as to transfer the transmitter equalizer coefficient adjustment information within the bidirectional 4-PAM signaling system 800 of FIG. 8.

As indicated in FIG. 14, when the identifying condition is met, the decoders 108A and 108B will set the LSB of the first symbol in the current codeword to a "1" logic level so that the signal level of the first symbol in the current codeword is no longer at one of the periodically unused outer 4-PAM signal levels associated with the 4S5S transition-limiting code being utilized within the bidirectional 4-PAM signaling system 800. For example, using the integer-based binary signal level designation representations described above, assume that the first symbol in the current codeword has an information transfer signal level value of $s_1^{(k+1)}$=−3 (i.e., a binary signal level designation of 10). Then, setting the LSB of the first symbol in the current codeword to a "1" logic level causes the signal level of the first symbol in the current codeword to change such that the first symbol in the current codeword has its original signal level value of $s_1^{(k+1)}$=−1 (i.e., a binary signal level designation of 11), which is not one of the periodically unused outer 4-PAM signal levels associated with the 4S5S transition-limiting code being utilized within the bidirectional 4-PAM signaling system 800.

Figure 15:
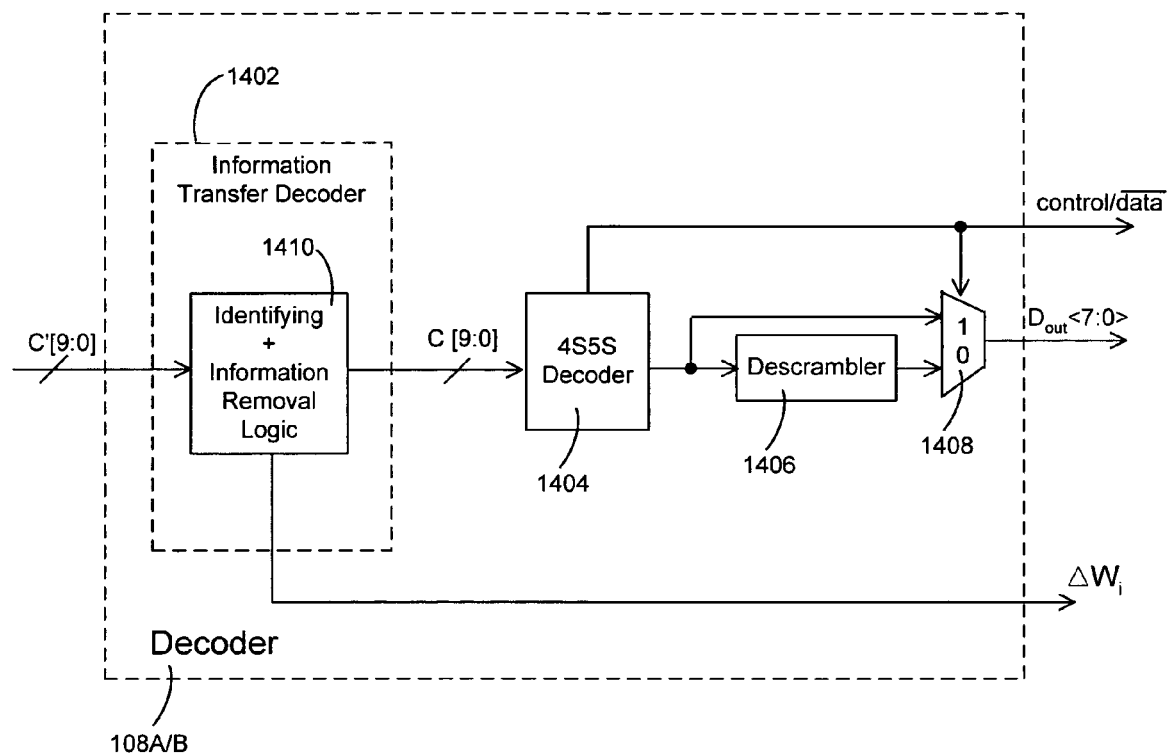
FIG. 15 shows a high level view of an information transfer decoder, which corresponds to the information transfer encoder of FIG. 10, in accordance with an embodiment of the present disclosure.

Referring to FIG. 15, there is shown a high level view of an exemplary embodiment of the decoder 108A/B of FIG. 8 which operates in accordance with the identifying condition and subsequent actions as set forth in FIG. 14 to provide a information transfer aspect to the 4S5S transition-limiting code being utilized within the 4-PAM signaling system 800 of FIG. 8. The decoder 108A/B comprises an information transfer decoder 1402, a 4S5S decoder 1404, a descrambler 1406, and a multiplexer 1408.

The information transfer decoder 1402 comprises identifying condition and information removal logic 1410, which receives the 10-bit DC balanced codeword (i.e., C'[9:0]= $C'_{10}$, $C'_9$, $C'_8$, $C'_7$, $C'_6$, $C'_5$, $C'_4$, $C'_3$, $C'_2$, $C'_1$), and operates to determine if the LSB of the first symbol in the current codeword has a "0" logic level (i.e., if LSB($S_1'^{(k)}$)=0, as defined in FIG. 14), which indicates that transmitter equalizer coefficient adjustment information was previously added by an encoder 102A/B so as to transfer the transmitter equalizer coefficient adjustment information within the bidirectional 4-PAM signaling system 800 of FIG. 8. If the LSB of the first symbol in the current codeword has a "0" logic level (i.e., if LSB($S_1^{(k)}$)=0, as defined in FIG. 14), then the identifying condition and information removal logic 1410 removes the adjustment information by setting LSB of the first symbol in the current codeword to a "1" logic level (i.e., set LSB($S_1^{(k)}$)=1, as defined in FIG. 14), thereby regenerating 10-bit codeword (i.e., C[9:0]=$C_{10}$, $C_9$, $C_8$, $C_7$, $C_6$, CS, $C_4$, $C_3$, $C_2$, $C_1$) for the 4S5S decoder 1404.

The 4S5S decoder 1404 receives the 10-bit codeword (i.e., C[9:0]=$C_{10}$, $C_9$, $C_8$, $C_7$, $C_6$, CS, $C_4$, $C_3$, $C_2$, $C_1$) from the identifying condition and information removal logic 1410, and operates to decode the 10-bit codeword (i.e., C[9:0]=$C_{10}$, $C_9$, $C_8$, $C_7$, $C_6$, $C_5$, $C_4$, $C_3$, $C_2$, $C_1$) using a 4S5S transition-limiting code such as, for example, as described in the above-referenced U.S. patent application Ser. No. 10/314,985. The 4S5S decoder 1404 provides either a scrambled or unscrambled version of the parallel input data $D_{in}$<7:0> to both the descrambler 1406 and the multiplexer 1408, as well as a control/data output signal for controlling the multiplexer 1408. The control/data output signal indicates whether the 10-bit codeword (i.e., C[9:0]=$C_{10}$, $C_9$, $C_8$, $C_7$, $C_6$, $C_5$, $C_4$, $C_3$, $C_2$, $C_1$) is carrying control or data information. If the parallel input data $D_{in}$<7:0> was not scrambled by the encoder 102A/B (e.g., if the parallel input data $D_{in}$<7:0> was carrying control information), then an unscrambled version of the parallel input data $D_{in}$<7:0> is passed through the multiplexer 1408 and output as the parallel output data $D_{out}$<7:0>. However, if the parallel input data $D_{in}$<7:0> was scrambled by the encoder 102A/B (e.g., if the parallel input data $D_{in}$<7:0> was carrying data information), then a scrambled version of the parallel input data $D_{in}$<7:0> is passed through the descrambler 1406, which operates to descramble the scrambled version of the parallel input data $D_{in}$<7:0> that is passed therethrough, which is a common function in many code-based signaling systems. The descrambler 1406 then provides an unscrambled version of the parallel input data $D_{in}$<7:0> to the multiplexer 1408 for output as the parallel output data $D_{out}$<7:0>.

Figure 15A:
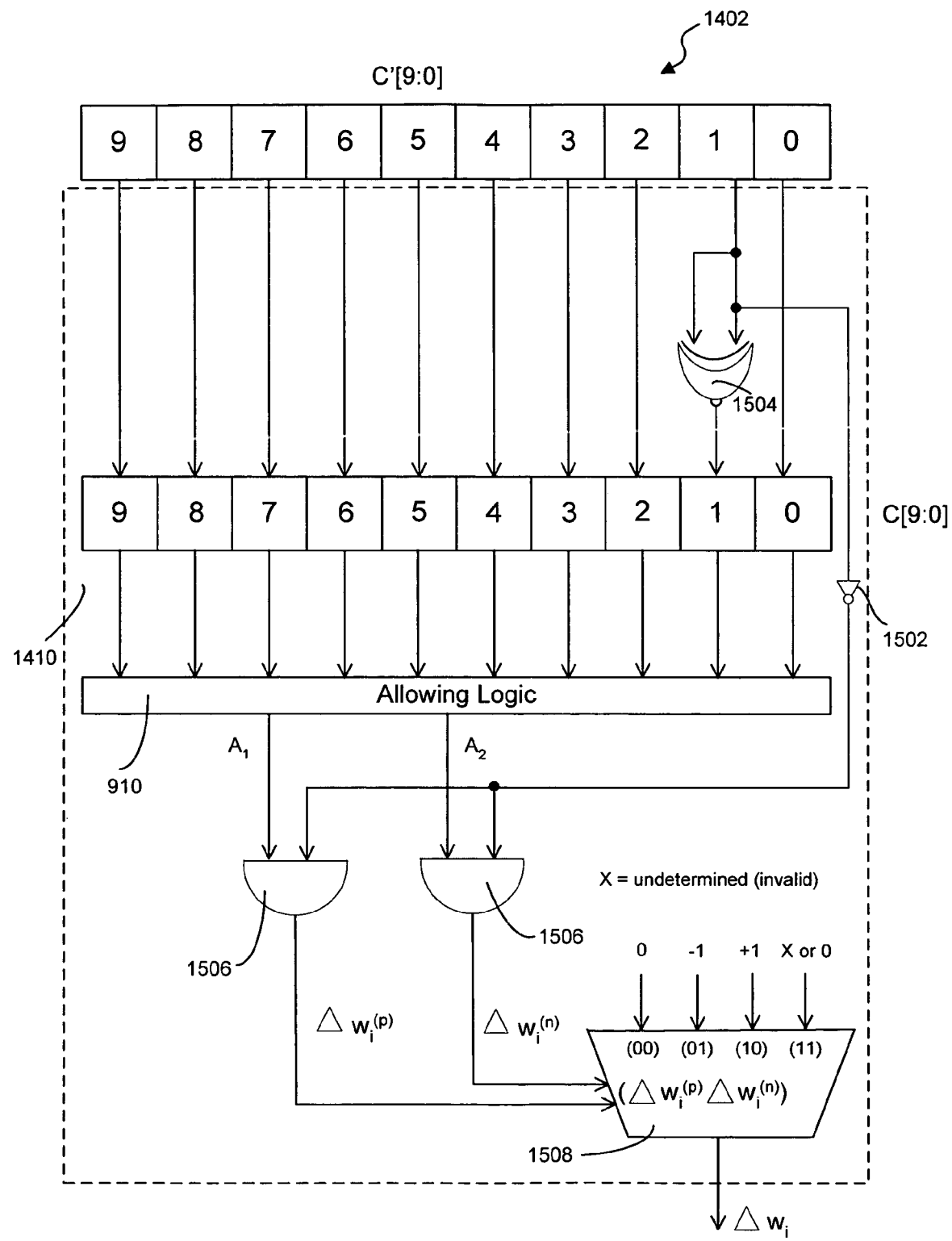
FIG. 15A shows a more detailed view of an exemplary embodiment of the information transfer decoder of FIG. 15.

Referring to FIG. 15A, there is shown a more detailed view of an exemplary embodiment of the information transfer decoder 1402 of FIG. 15. Similar to the information transfer decoder 1402 of FIG. 15, the information transfer decoder 1402 of FIG. 15A comprises the identifying condition and information removal logic 1410. The identifying condition and information removal logic 1410 comprises an inverter device 1502, an exclusive NOR logic device 1504, a plurality of AND logic devices 1506, a multiplexer 1508, and the allowing condition logic 910 of FIG. 10. As described above, the information transfer decoder 1402 operates by receiving the 10-bit information transfer codeword (i.e., $C'[9:0]=C'_{10}, C'_9, C'_8, C'_7, C'_6, C'_5, C'_4, C'_3, C'_2, C'_1$), which is generated by the encoder 102A/B of FIG. 8 as described above, and then generating the original 10-bit codeword (i.e., $C[9:0]=C_{10}, C_9, C_8, C_7, C_6, C_5, C_4, C_3, C_2, C_1$). The information transfer decoder 1402 also recovers the transmitter equalizer coefficient adjustment information (i.e., $\Delta W_i$, wherein i=1, 2, 3, . . . ). FIG. 15A corresponds to the first set of identifying condition and subsequent actions as set forth in FIG. 14.

Figure 16:
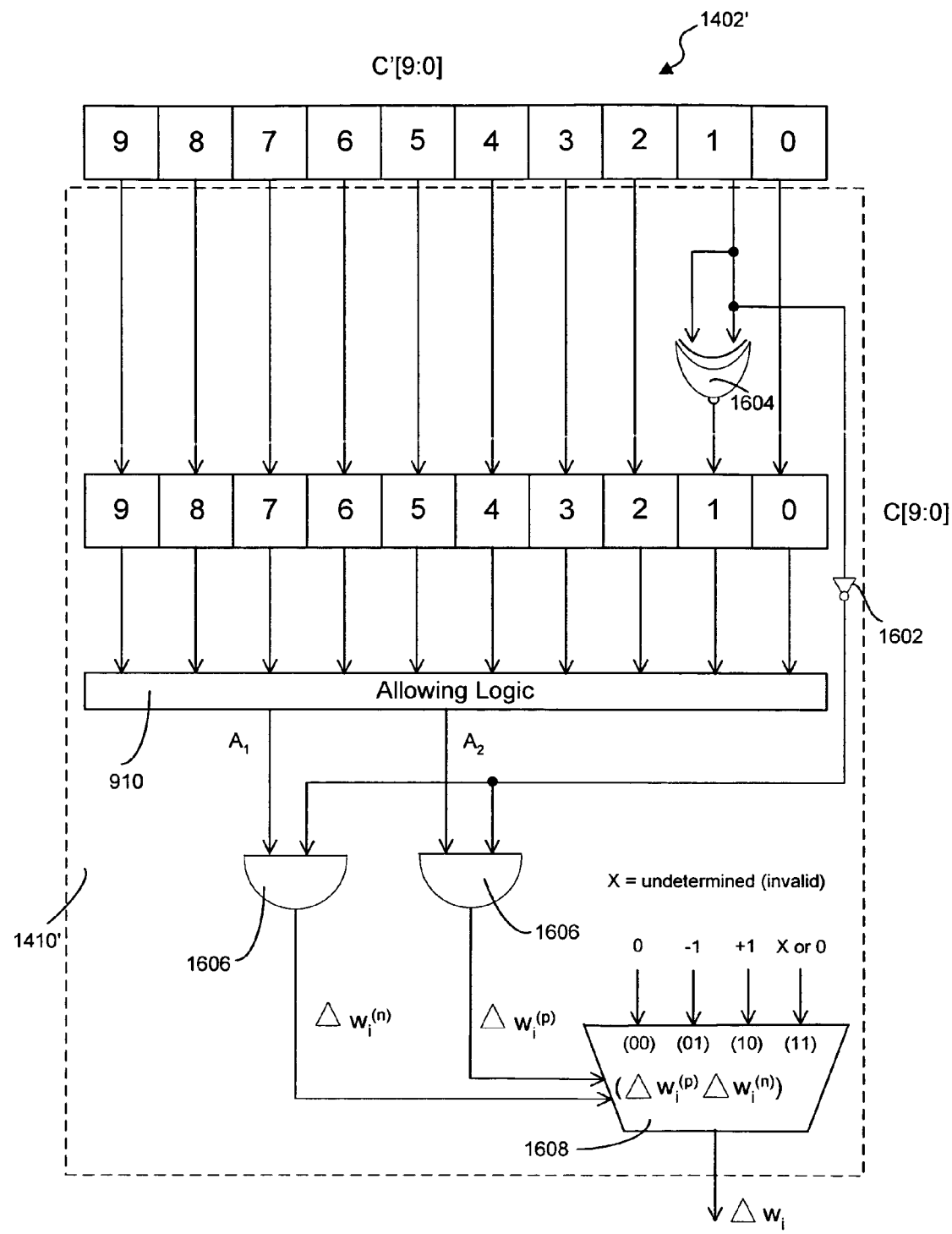
FIG. 16 shows a more detailed view of an alternative exemplary embodiment of the information transfer decoder of FIG. 15.

Referring to FIG. 16, there is shown a more detailed view of an alternative exemplary embodiment of the information transfer decoder 1402 of FIG. 15. Similar to the information transfer decoder 1402 of FIG. 15, the information transfer decoder 1402' of FIG. 16 comprises identifying condition and information removal logic 1410'. The identifying condition and information removal logic 1410' comprises an inverter device 1602, an exclusive NOR logic device 1604, a plurality of AND logic devices 1606, a multiplexer 1608, and the allowing condition logic 910 of FIG. 10. As described above, the information transfer decoder 1402' operates by receiving the 10-bit information transfer codeword (i.e., $C'[9:0]=C'_{10}, C'_9, C'_8, C'_7, C'_6, C'_5, C'_4, C'_3, C'_2, C'_1$), which is generated by the encoder 102A/B of FIG. 8 as described above, and then generating the original 10-bit codeword (i.e., $C[9:0]=C_{10}, C_9, C_8, C_7, C_6, C_5, C_4, C_3, C_2, C_1$) The information transfer decoder 1402' also recovers the transmitter equalizer coefficient adjustment information (i.e., $\Delta W_i$, wherein i=1, 2, 3, . . . ). FIG. 16 corresponds to the first alternative set of identifying condition and subsequent actions as set forth in FIG. 14.

Figure 17:
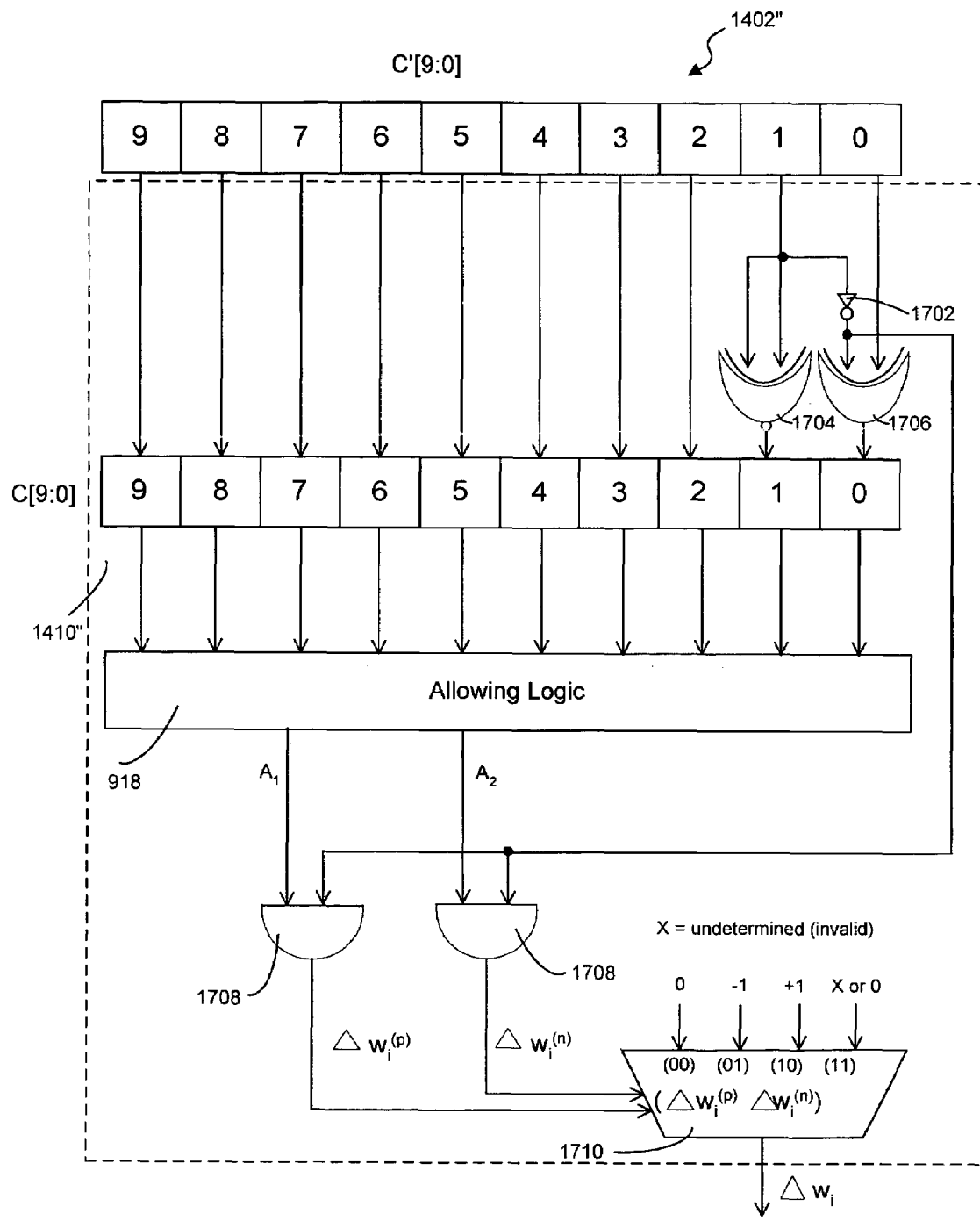
FIG. 17 shows a more detailed view of an alternative exemplary embodiment of the information transfer decoder of FIG. 15.

Referring to FIG. 17, there is shown a more detailed view of another alternative exemplary embodiment of the information transfer decoder 1402 of FIG. 15. Similar to the information transfer decoder 1402 of FIG. 15, the information transfer decoder 1402" of FIG. 17 comprises identifying condition and information removal logic 1410". The identifying condition and information removal logic 1410" comprises an inverter device 1702, an exclusive NOR logic device 1704, an exclusive OR logic device 1706, a plurality of AND logic devices 1708, a multiplexer 1710, and the allowing condition logic 918 of FIG. 12. As described above, the information transfer decoder 1402" operates by receiving the 10-bit information transfer codeword (i.e., $C'[9:0]=C'_{10}, C'_9, C'_8, C'_7, C'_6, C'_5, C'_4, C'_3, C'_2, C'_1$) which is generated by the encoder 102A/B of FIG. 8 as described above, and then generating the original 10-bit codeword (i.e., $C[9:0]=C_{10}, C_9, C_8, C_7, C_6, C_5, C_4, C_3, C_2, C_1$). The information transfer decoder 1402" also recovers the transmitter equalizer coefficient adjustment information (i.e., $\Delta W_i$, wherein i=1, 2, 3, . . . ). FIG. 17 corresponds to the second alternative set of identifying condition and subsequent actions as set forth in FIG. 14.

Figure 18:
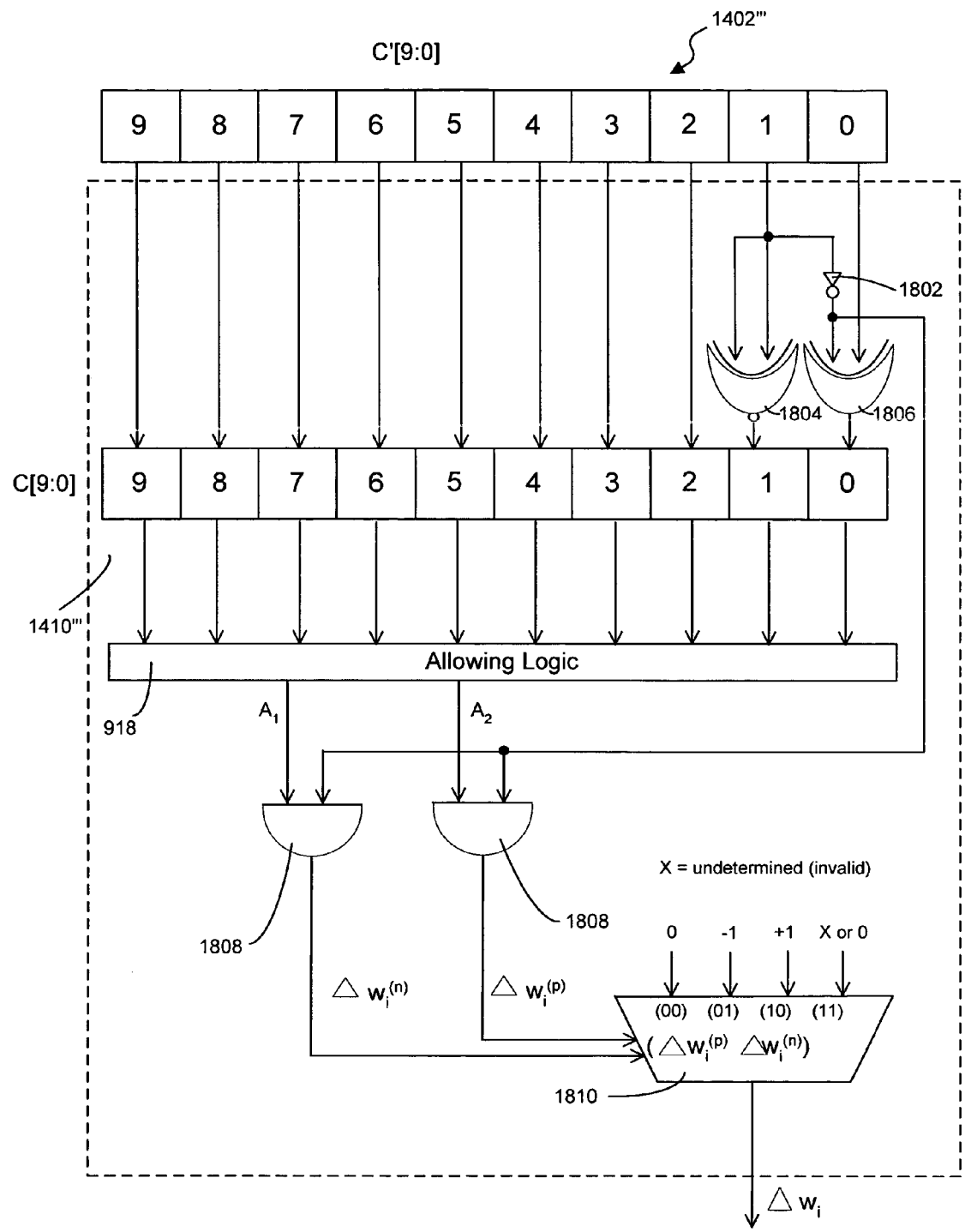
FIG. 18 shows a more detailed view of an alternative exemplary embodiment of the information transfer decoder of FIG. 15.

Referring to FIG. 18, there is shown a more detailed view of another alternative exemplary embodiment of the information transfer decoder 1402 of FIG. 15. Similar to the information transfer decoder 1402 of FIG. 15, the information transfer decoder 1402''' of FIG. 18 comprises identifying condition and information removal logic 1410'''. The identifying condition and information removal logic 1410''' comprises an inverter device 1802, an exclusive NOR device 1804, an exclusive OR logic device 1806, a plurality of AND logic devices 1808, a multiplexer 1810, and the allowing condition logic 918 of FIG. 12. As described above, the information transfer decoder 1402''' operates by receiving the 10-bit information transfer codeword (i.e., $C'[9:0]=C'_{10}, C'_9, C'_8, C'_7, C'_6, C'_5, C'_4, C'_3, C'_2, C'_1$), which is generated by the encoders 102A/B of FIG. 8 as described above, and then generating the original 10-bit codeword (i.e., $C[9:0]=C_{10}, C_9, C_8, C_7, C_6, C_5, C_4, C_3, C_2, C_1$). The information transfer decoder 1402''' also recovers the transmitter equalizer coefficient adjustment information (i.e., $\Delta W_i$, wherein i=1, 2, 3, . . . ). FIG. 18 corresponds to the third alternative set of identifying condition and subsequent actions as set forth in FIG. 14.

In summary, the information transfer encoders 908 and 916 of FIGS. 10, 10A, 11, 12, 12A, and 13 and the information transfer decoders 1402, 1402', 1402", and 1402''' of FIGS. 15, 15A, 16, 17, and 18, respectively, operate in conjunction to utilize the periodically unused outer 4-PAM signal levels associated with the 4S5S transition-limiting code being utilized within the bidirectional 4-PAM signaling system 800 of FIG. 8 to transfer transmitter equalizer coefficient adjustment information (i.e., $\Delta W_i$, wherein i=1, 2, 3, . . . ) in the bidirectional 4-PAM signaling system 800 of FIG. 8.

At this point it should be noted that the above-described DC voltage balancing and information transfer schemes may be combined such that the periodically unused outer 4-PAM signal levels associated with the 4S5S transition-limiting code being utilized within the bidirectional 4-PAM signaling system 800 of FIG. 8 may be utilized to provide simultaneous DC voltage balancing and backchannel information transfer. For example, referring to FIG. 19, there are shown conditions and subsequent actions which may be taken by the encoders 102A/B of FIG. 8 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8. The conditions shown in FIG. 19 comprise a first requiring condition (i.e., requiring condition 1), a second requiring condition (i.e., requiring condition 2), and a first allowing condition (i.e., allowing condition 1), all of which must be met before the encoders 102A/B will act to reverse the weight polarity of a current codeword, and thereby provide a DC voltage balancing property to the 4S5S transition-limiting code being utilized within the bidirectional 4-PAM signaling system 800 of FIG. 8. The first requiring condition (i.e., requiring condition 1) is such that the residual disparity weight polarity of a number of previously transmitted codewords must be the same as the initial weight polarity of the current codeword. The second requiring condition (i.e., requiring condition 2) is such that the weight polarity of the first symbol in the current codeword must be the same as the weight polarity of the remaining portion of the current codeword. The first allowing condition (i.e., allowing condition 1) is such that any change in the initial weight polarity of the current codeword must not violate the transition-limiting properties of the 4S5S transition-limiting code. The subsequent actions of weight polarity reversal and flagging actions are the same as described above with reference to FIG. 4.

The conditions shown in FIG. 19 also comprise a third requiring condition (i.e., requiring condition 3), a second allowing condition (i.e., allowing condition 2) and a third allowing condition (i.e., allowing condition 3), of which the third requiring condition (i.e., requiring condition 3) and either of the second allowing condition (i.e., allowing condition 2) and the third allowing condition (i.e., allowing condition 3) must be met before the encoders 102A/B will act to utilize the periodically unused outer 4-PAM signal levels associated with the 4S5S transition-limiting code being utilized within the bidirectional 4-PAM signaling system 800 of FIG. 8 to transfer transmitter equalizer coefficient adjustment information within the bidirectional 4-PAM signaling system 800 of FIG. 8. The third requiring condition (i.e., requiring condition 3) is such that the weight polarity of a portion of the current codeword must be different than the weight polarity of the first symbol in the current codeword. The second allowing condition (i.e., allowing condition 2) is such that the signal level values of the fifth symbol of a previous codeword, the first symbol of the current codeword, and the second symbol of the current codeword must match the signal level values contained within a first group of sets of signal level values (i.e., S+). The third allowing condition (i.e., allowing condition 3) is such that the signal level values of the fifth symbol of a previous codeword, the first symbol of the current codeword, and the second symbol of the current codeword must match the signal level values contained within a second group of sets of signal level values (i.e., S−). Both the first group of sets of signal level values (i.e., S+) and the second group of sets of signal level values (i.e., S−) are derived so that utilization of the periodically unused outer 4-PAM signal levels associated with the 4S5S transition-limiting code being utilized within the bidirectional 4-PAM signaling system 800 of FIG. 8 does not violate the transition-limiting properties of the 4S5S transition-limiting code. The subsequent action of adding transmitter equalizer coefficient adjustment information to the codeword is the same as described above with reference to FIGS. 8, 9, 10, 10A, and 11.

Figure 20:
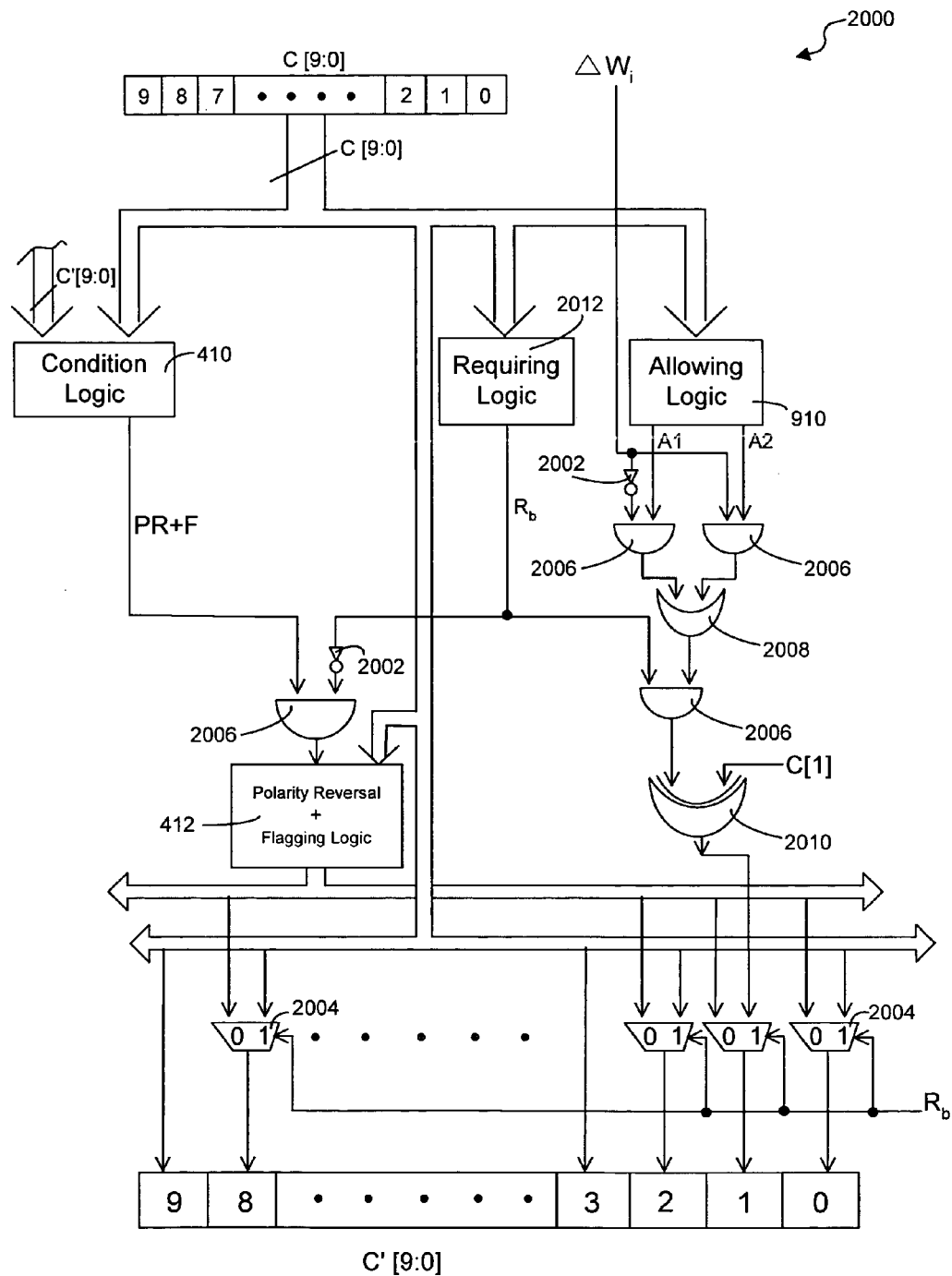
FIG. 20 shows combined DC voltage balancing and backchannel information transfer encoder circuitry in accordance with an embodiment of the present disclosure.

Referring to FIG. 20, there is shown combined DC voltage balancing and backchannel information transfer encoder circuitry 2000 which operates in accordance with the conditions and subsequent actions as set forth in FIG. 19 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8 in accordance with an embodiment of the present disclosure. The encoder circuitry 2000 comprises a plurality of inverter devices 2002, a plurality of multiplexers 2004, a plurality of AND logic devices 2006, an OR logic device 2008, an exclusive OR logic device 2010, requiring logic 2012, the condition logic 410 of FIG. 5, the weight polarity reversal and flagging logic 412 of FIG. 5, and the allowing condition logic 910 of FIG. 10. The encoder circuitry 2000 may reside within the encoders 102A/B of FIG. 8, or be separate from the encoders 102A/B of FIG. 8. In either case, the encoder circuitry 2000 operates by receiving a 10-bit codeword (i.e., C [9:0]=$C_{10}$, $C_9$, $C_8$, $C_7$, $C_6$, $C_5$, $C_4$, $C_3$, $C_2$, $C_1$), which is generated by a 4S5S encoder (not shown) as described above with respect to FIGS. 3, 5, 5A, 8, 10, 10A, and 11, and then generating a 10-bit combined codeword (i.e., C' [9:0]=$C'_{10}$, $C'_9$, $C'_8$, $C'_7$, $C'_6$, $C'_5$, $C'_4$, $C'_3$, $C'_2$, $C'_1$). The 10-bit combined codeword (i.e., C'[9:0]=$C'_{10}$, $C'_9$, $C'_8$, $C'_7$, $C'_6$, $C'_5$, $C'_4$, $C'_3$, $C'_2$, $C'_1$) is then provided to a serializing 4-PAM transmitter 104A/B as an MSB codeword (M<4:0>) and an LSB codeword (L<4:0>) for transmission over a pair of signal carrying conductors 110A/B to a deserializing 4-PAM receiver 106A/B and then on to a decoder 108A/B, respectively, as described above with respect to FIGS. 3, 5, 5A, 8, 10, 10A, and 11.

Figure 21:
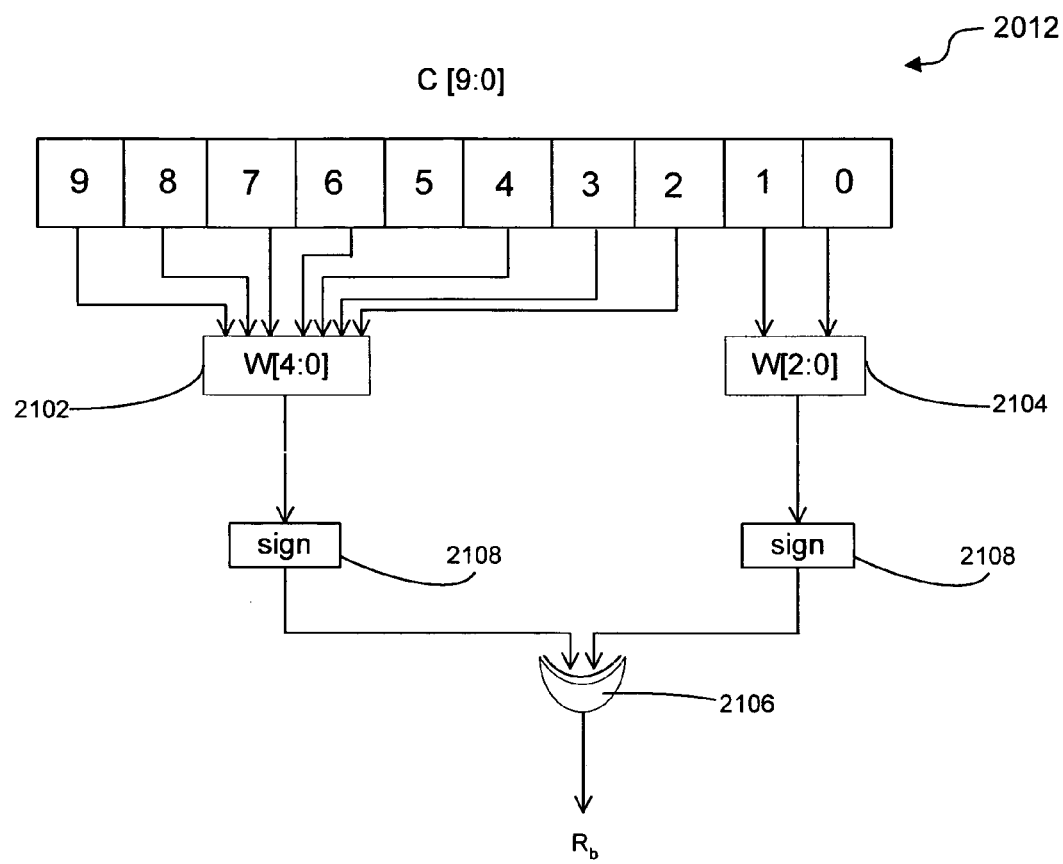
FIG. 21 shows a more detailed view of the requiring logic shown in FIG. 20 in accordance with an embodiment of the present disclosure.

Referring to FIG. 21, there is shown a more detailed view of the requiring logic 2012 shown in FIG. 20 in accordance with an embodiment of the present disclosure. As shown in FIG. 21, the requiring logic 2012 comprises a first weight calculator 2102, a second weight calculator 2104, an exclusive OR logic device 2106, and sign generators 2108.

Figure 22:
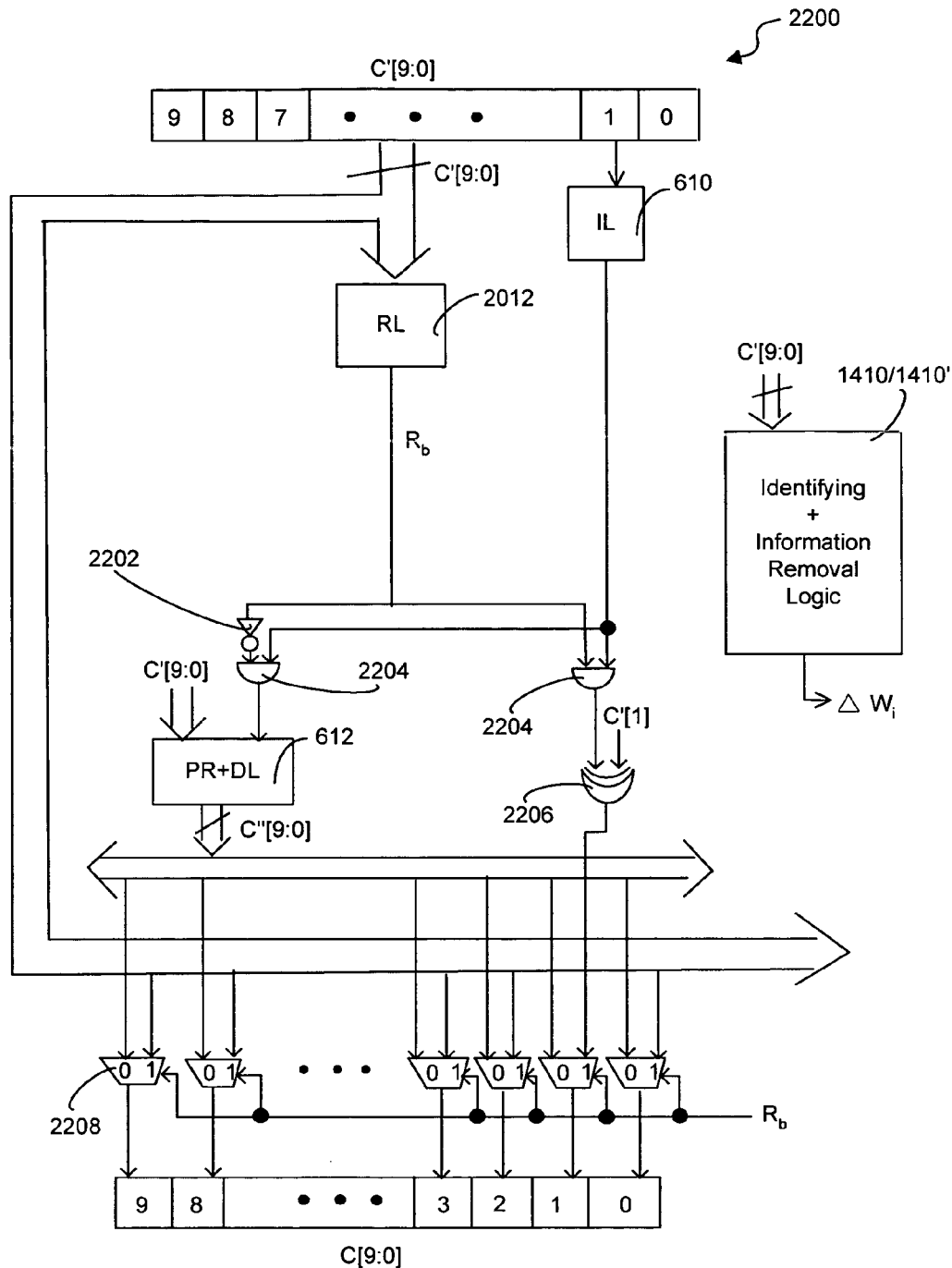
FIG. 22 shows combined DC voltage balancing and backchannel information transfer decoder circuitry for use with the combined DC voltage balancing and backchannel information transfer encoder circuitry of FIG. 20 in accordance with an embodiment of the present disclosure.

Referring to FIG. 22, there is shown combined DC voltage balancing and backchannel information transfer decoder circuitry 2200 for use with the combined DC voltage balancing and backchannel information transfer encoder circuitry 2000 of FIG. 20 in accordance with an embodiment of the present disclosure. The decoder circuitry 2200 comprises the identifying logic 610 of FIG. 7, the weight polarity reversal and deflagging logic 612 of FIG. 7, the identifying condition and information removal logic 1410 or 1410' of FIG. 15A or 16, respectively, the requiring logic 2012 of FIG. 20, an inverter device 2202, a plurality of AND logic devices 2204, an exclusive OR logic device 2206, and a plurality of multiplexers 2208. The decoder circuitry 2200 may reside within the decoders 108A/B of FIG. 8, or be separate from the decoders 108A/B of FIG. 8. In either case, the decoder circuitry 2200 operates by receiving the 10-bit combined codeword (i.e., C'[9:0]=$C'_{10}$, $C'_9$, $C'_8$, $C'_7$, $C'_6$, $C'_5$, $C'_4$, $C'_3$, $C'_2$, $C'_1$), which is generated by a 4S5S encoder (not shown) as described above with respect to FIGS. 5, 5A, 8, 10, 10A, and 11, and then generating the original 10-bit codeword (i.e., C[9:0]=$C_{10}$, $C_9$, $C_8$, $C_7$, $C_6$, $C_5$, $C_4$, $C_3$, $C_2$, $C_1$). The decoder circuitry 2200 also recovers the transmitter equalizer coefficient adjustment information (i.e., $\Delta W_i$, wherein i=1, 2, 3, . . . ). The transmitter equalizer coefficient adjustment information (i.e., $\Delta W_i$, wherein i=1, 2, 3, . . . ) is a qualified signal when the output of the requiring logic 2012 (i.e., the $R_b$ signal) is at a logic "1" level. Thus, both the transmitter equalizer coefficient adjustment information (i.e., $\Delta W_i$, wherein i=1, 2, 3, . . . ) and the output of the requiring logic 2012 (i.e., the Rb signal) may be provided to a transmitter equalizer.

At this point it should be noted that when using the identifying condition and information removal logic 1410' of FIG. 16 in the decoder circuitry 2200 of FIG. 22, and the decoder circuitry 2200 of FIG. 22 is used with the combined DC voltage balancing and backchannel information transfer encoder circuitry 2000 of FIG. 20, the combined DC voltage balancing and backchannel information transfer encoder circuitry 2000 of FIG. 20 must receive an inverted version of the transmitter equalizer coefficient adjustment information (i.e., $\Delta W_i$, wherein i=1, 2, 3, . . . ).

Referring to FIG. 23, there are shown alternative conditions and subsequent actions which may be taken by the encoders 102A/B of FIG. 8 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8. The conditions shown in FIG. 23 comprise a first requiring condition (i.e., requiring condition 1), a second requiring condition (i.e., requiring condition 2), and a first allowing condition (i.e., allowing condition 1), all of which must be met before the encoders 102A/B will act to reverse the weight polarity of a current codeword, and thereby provide a DC voltage balancing property to the 4S5S transition-limiting code being utilized within the bidirectional 4-PAM signaling system 800 of FIG. 8. The first requiring condition (i.e., requiring condition 1) is such that the residual disparity weight polarity of a number of previously transmitted codewords must be the same as the initial weight polarity of the current codeword. The second requiring condition (i.e., requiring condition 2) is such that the weight polarity of the first symbol in the current codeword must be the same as the weight polarity of the remaining portion of the current codeword. The first allowing condition (i.e., allowing condition 1) is such that any change in the initial weight polarity of the current codeword must not violate the transition-limiting properties of the 4S5S transition-limiting code. The subsequent actions of weight polarity reversal and flagging actions are the same as described above with reference to FIG. 4.

The conditions shown in FIG. 23 also comprise a third requiring condition (i.e., requiring condition 3), a second allowing condition (i.e., allowing condition 2) and a third allowing condition (i.e., allowing condition 3), of which the third requiring condition (i.e., requiring condition 3) and either of the second allowing condition (i.e., allowing condition 2) and the third allowing condition (i.e., allowing condition 3) must be met before the encoders 102A/B will act to utilize the periodically unused outer 4-PAM signal levels associated with the 4S5S transition-limiting code being utilized within the bidirectional 4-PAM signaling system 800 of FIG. 8 to transfer transmitter equalizer coefficient adjustment information within the bidirectional 4-PAM signaling system 800 of FIG. 8. The third requiring condition (i.e., requiring condition 3) is such that the weight polarity of a portion of the current codeword must be different than the weight polarity of the first symbol in the current codeword. The second allowing condition (i.e., allowing condition 2) is such that the signal level values of the fifth symbol of a previous codeword, the first symbol of the current codeword, and the second symbol of the current codeword must match the signal level values contained within a first group of sets of signal level values (i.e., S+). The third allowing condition (i.e., allowing condition 3) is such that the signal level values of the fifth symbol of a previous codeword, the first symbol of the current codeword, and the second symbol of the current codeword must match the signal level values contained within a second group of sets of signal level values (i.e., S−). Both the first group of sets of signal level values (i.e., S+) and the second group of sets of signal level values (i.e., S−) are derived so that utilization of the periodically unused outer 4-PAM signal levels associated with the 4S5S transition-limiting code being utilized within the bidirectional 4-PAM signaling system 800 of FIG. 8 does not violate the transition-limiting properties of the 4S5S transition-limiting code. The subsequent action of adding transmitter equalizer coefficient adjustment information to the codeword is the same as described above with reference to FIGS. 8, 9, 12, 12A, and 13.

Figure 24:
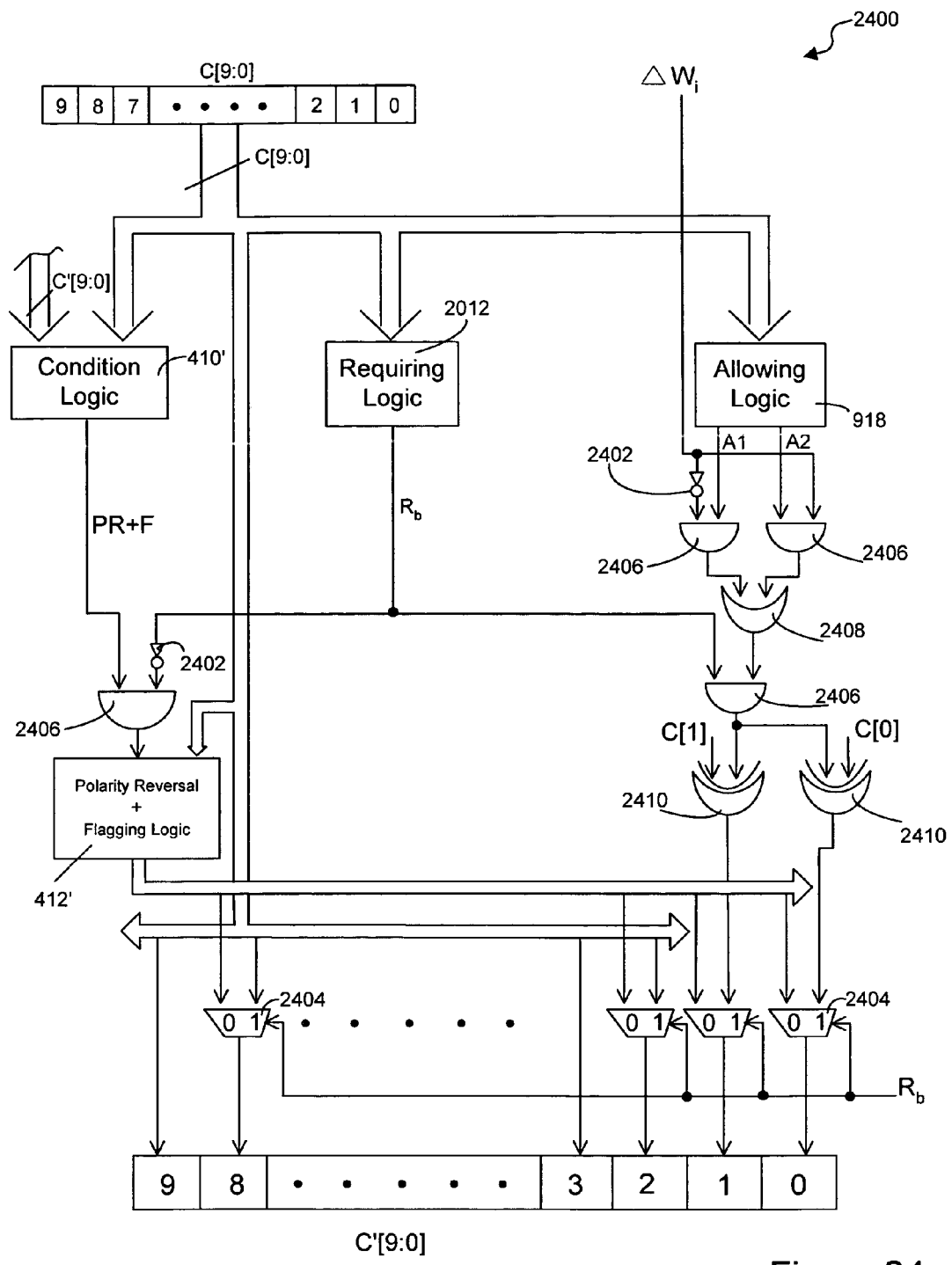
FIG. 24 shows combined DC voltage balancing and backchannel information transfer encoder circuitry which operates in accordance with the conditions and subsequent actions as set forth in FIG. 23 in accordance with an alternate embodiment of the present disclosure.

Referring to FIG. 24, there is shown combined DC voltage balancing and backchannel information transfer encoder circuitry 2400 which operates in accordance with the conditions and subsequent actions as set forth in FIG. 23 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8 in accordance with an alternate embodiment of the present disclosure. The encoder circuitry 2400 comprises a plurality of inverter devices 2402, a plurality of multiplexers 2404, a plurality of AND logic devices 2406, an OR logic device 2408, a plurality of exclusive OR logic devices 2410, the requiring logic 2012 of FIG. 20, a modified version 410' of the condition logic 410 of FIG. 5, the weight polarity reversal and flagging logic 412' of FIG. 5B, and the allowing condition logic 918 of FIG. 12. The encoder circuitry 2400 may reside within the encoders 102A/B of FIG. 8, or be separate from the encoders 102A/B of FIG. 8. In either case, the encoder circuitry 2400 operates by receiving a 10-bit codeword (i.e., C[9:0]=$C_{10}$, $C_9$, $C_8$, $C_7$, $C_6$, $C_5$, $C_4$, $C_3$, $C_2$, $C_1$), which is generated by a 4S5S encoder (not shown) as described above with respect to FIGS. 3, 5, 5A, 8, 12, 12A, and 13, and then generating a 10-bit combined codeword (i.e., C'[9:0]=$C'_{10}$, $C'_9$, $C'_8$, $C'_7$, $C'_6$, $C'_5$, $C'_4$, $C'_3$, $C'_2$, $C'_1$). The 10-bit combined codeword (i.e., C'[9:0]=$C'_{10}$, $C'_9$, $C'_8$, $C'_7$, $C'_6$, $C'_5$, $C'_4$, $C'_3$, $C'_2$, $C'_1$) is then provided to a serializing 4-PAM transmitter 104A/B as an MSB codeword (M<4:0>) and an LSB codeword (L<4:0>) for transmission over a pair of signal carrying conductors 110A/B to a deserializing 4-PAM receiver 106A/B and then on to a decoder 108A/B, respectively, as described above with respect to FIGS. 3, 5, 5A, 8, 12, 12A, and 13.

Figure 25:
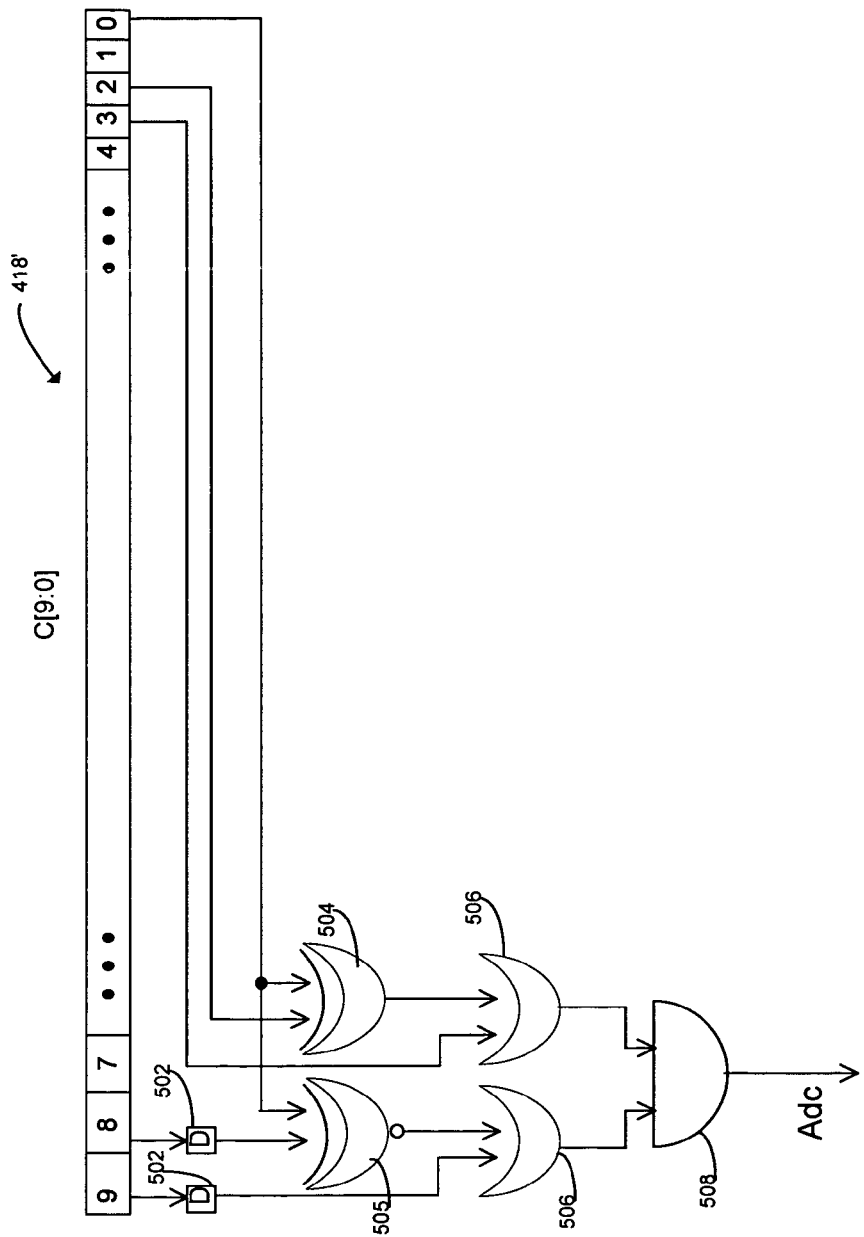
FIG. 25 shows a modified version of the allowing condition logic of FIG. 5 in accordance with an embodiment of the present disclosure.

Referring to FIG. 25, there is shown a modified version 418' of the allowing condition logic 418 of FIG. 5 shown in FIG. 24 in accordance with an embodiment of the present disclosure. The modified version 410' of the condition logic 410 of FIG. 5 shown in FIG. 24 is created when the condition logic 410 of FIG. 5 is modified with the modified version 418' of the allowing condition logic 418 of FIG. 5 as shown in FIG. 25.

Figure 26:
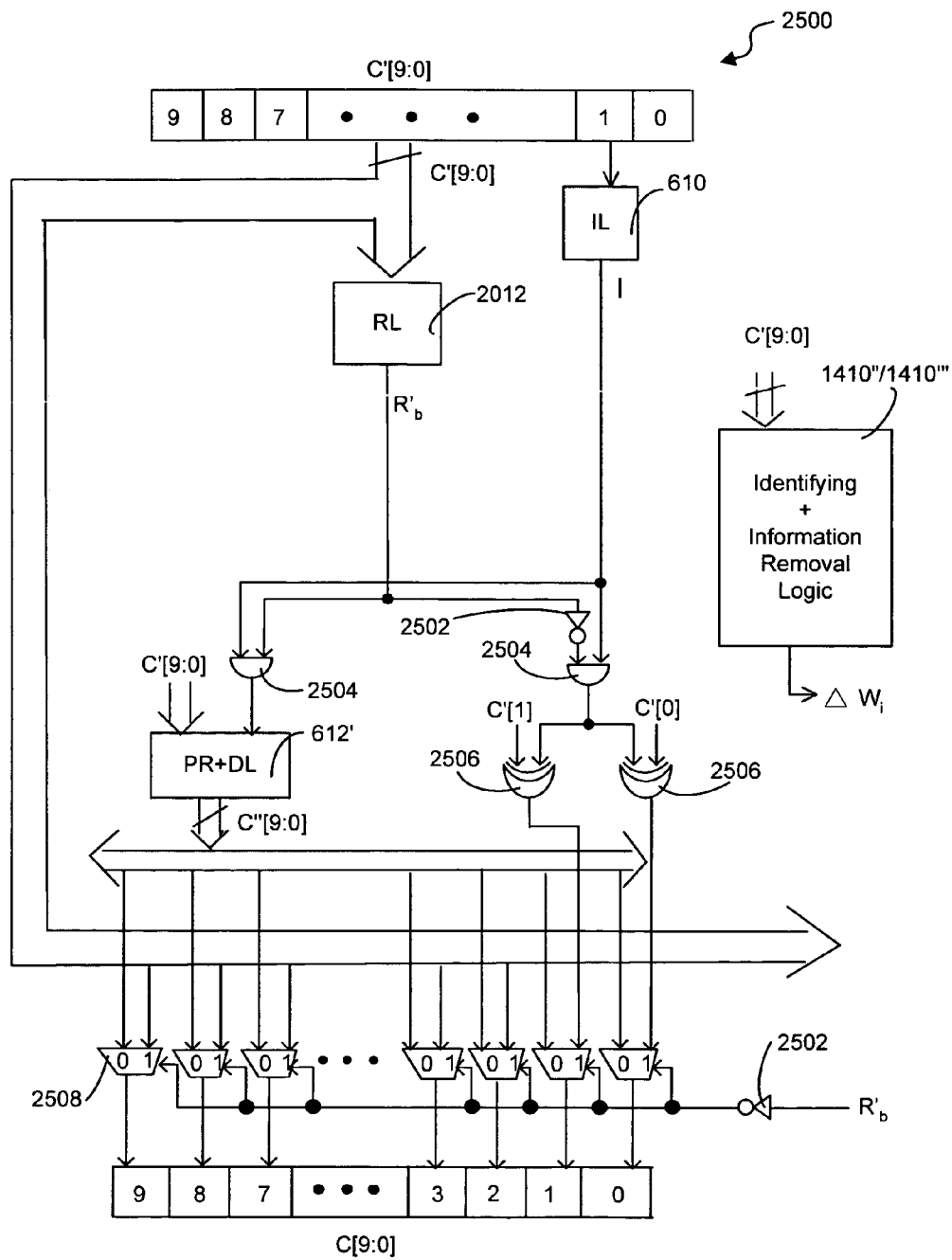
FIG. 26 shows combined DC voltage balancing and backchannel information transfer decoder circuitry for use with the combined DC voltage balancing and backchannel information transfer encoder circuitry of FIG. 24 in accordance with an alternate embodiment of the present disclosure.

Referring to FIG. 26, there is shown combined DC voltage balancing and backchannel information transfer decoder circuitry 2500 for use with the combined DC voltage balancing and backchannel information transfer encoder circuitry 2400 of FIG. 24 in accordance with an alternate embodiment of the present disclosure. The decoder circuitry 2500 comprises the identifying logic 610 of FIG. 7, the weight polarity reversal and deflagging logic 612' of FIG. 7B, the identifying condition and information removal logic 1410" or 1410"' of FIG. 17 or 18, respectively, the requiring logic 2012 of FIG. 20, a plurality of inverter devices 2502, a plurality of AND logic devices 2504, a plurality of exclusive OR logic devices 2506, and a plurality of multiplexers 2508. The decoder circuitry 2500 may reside within the decoders 108A/B of FIG. 8, or be separate from the decoders 108A/B of FIG. 8. In either case, the decoder circuitry 2500 operates by receiving the 10-bit combined codeword (i.e., C'[9:0]=$C'_{10}$, $C'_9$, $C'_8$, $C'_7$, $C'_6$, $C'_5$, $C'_4$, $C'_3$, $C'_2$, $C'_1$), which is generated by a 4S5S encoder (not shown) as described above with respect to FIGS. 5, 5A, 8, 12, 12A, and 13, and then generating the original 10-bit codeword (i.e., C[9:0]=$C_{10}$, $C_9$, $C_8$, $C_7$, $C_6$, $C_5$, $C_4$, $C_3$, $C_2$, $C_1$). The decoder circuitry 2500 also recovers the transmitter equalizer coefficient adjustment information (i.e., $\Delta W_i$, wherein i=1, 2, 3, . . . ). The transmitter equalizer coefficient adjustment information (i.e., $\Delta W_i$, wherein i=1, 2, 3, is a qualified signal when the output of the requiring logic 2012 (i.e., the $R_b$ signal) is at a logic "1" level. Thus, both the transmitter equalizer coefficient adjustment information (i.e., $\Delta W_i$, wherein i=1, 2, 3, . . . ) and the output of the requiring logic 2012 (i.e., the $R_b$ signal) may be provided to a transmitter equalizer.

At this point it should be noted that when using the identifying condition and information removal logic 1410"' of FIG. 18 in the decoder circuitry 2500 of FIG. 26, and the decoder circuitry 2500 of FIG. 26 is used with the combined DC voltage balancing and backchannel information transfer encoder circuitry 2400 of FIG. 24, the combined DC voltage balancing and backchannel information transfer encoder circuitry 2400 of FIG. 24 must receive an inverted version of the transmitter equalizer coefficient adjustment information (i.e., $\Delta W_i$, wherein i=1, 2, 3, . . . ).

At this point it should be noted that the conditions and subsequent actions which may be taken by the encoders 102A/B of FIG. 8 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8 may be generalized. For example, referring to FIG. 27, there are shown generalized conditions and subsequent actions which may be taken by the encoders 102A/B of FIG. 8 to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8.

Figure 28:
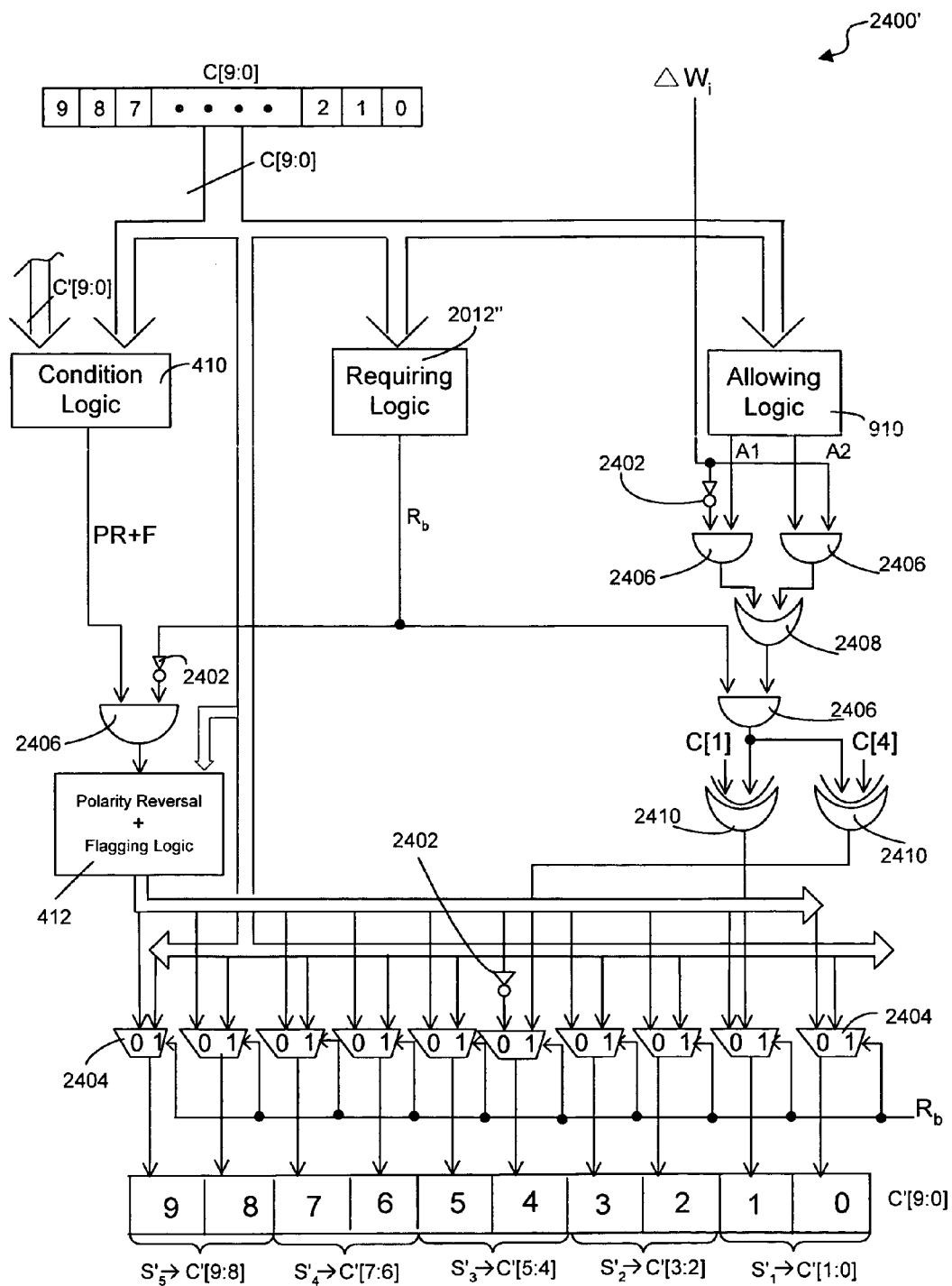
FIG. 28 shows combined DC voltage balancing and backchannel information transfer encoder circuitry which operates in accordance with the conditions and subsequent actions as set forth in FIG. 27 in accordance with an embodiment of the present disclosure.

Referring to FIG. 28, there is shown combined DC voltage balancing and backchannel information transfer encoder circuitry 2400' which operates in accordance with the conditions and subsequent actions as set forth in FIG. 27 (for the case when x=3) to provide a DC voltage balancing property to the 4S5S transition-limiting code being utilized within the bidirectional 4-PAM signaling system 800 of FIG. 8 and to transfer transmitter equalizer coefficient adjustment information (i.e., $\Delta W_i$, wherein i=1, 2, 3, . . . ) in the bidirectional 4-PAM signaling system 800 of FIG. 8 in accordance with an embodiment of the present disclosure. The encoder circuitry 2400' of FIG. 28 is similar to the encoder circuitry 2400 of FIG. 24 with the exception that the encoder circuitry 2400' of FIG. 28 comprises a modified version 2012" of the requiring logic 2012 of FIG. 21, the condition logic 410 of FIG. 5 instead of the modified version 410' of the condition logic 410 of FIG. 5 shown in FIG. 24, the weight polarity reversal and flagging logic 412 of FIG. 5A instead of the weight polarity reversal and flagging logic 412' of FIG. 5B, and the allowing condition logic 910 of FIG. 10 instead of the allowing condition logic 918 of FIG. 12. Also, the input to one of the exclusive OR logic devices 2410 is C[4] instead of C[0], the output of the same exclusive OR logic device 2410 is fed to the multiplexer 2404 corresponding to bit C'[4] instead of bit C'[0], and one of the inputs to the multiplexer 2404 corresponding to bit C'[4] is inverted.

At this point it should be noted that the allowing logic 910 of FIG. 28 is designed such that the first group of sets of signal level values (i.e., $S_1^{(+)}$) comprises the sets of (1,1,3), (3,1,1), (−1,1,3), (3,1,−1), (3,1,3), (1,1,1), (1,1,−1), (−1,1,1), and (−1,1,−1). Also, the allowing logic 910 of FIG. 28 is designed such that the second group of sets of signal level values (i.e., $S_1^{(-)}$) comprises the sets of (1,−1,−3), (−3,−1,1), (−3,−1,−1), (−1,−1,−3), (−3,−1,−3), (−1,−1,−1), (−1,−1,1), (1,−1,−1), and (−1,−1,1).

Figure 29:
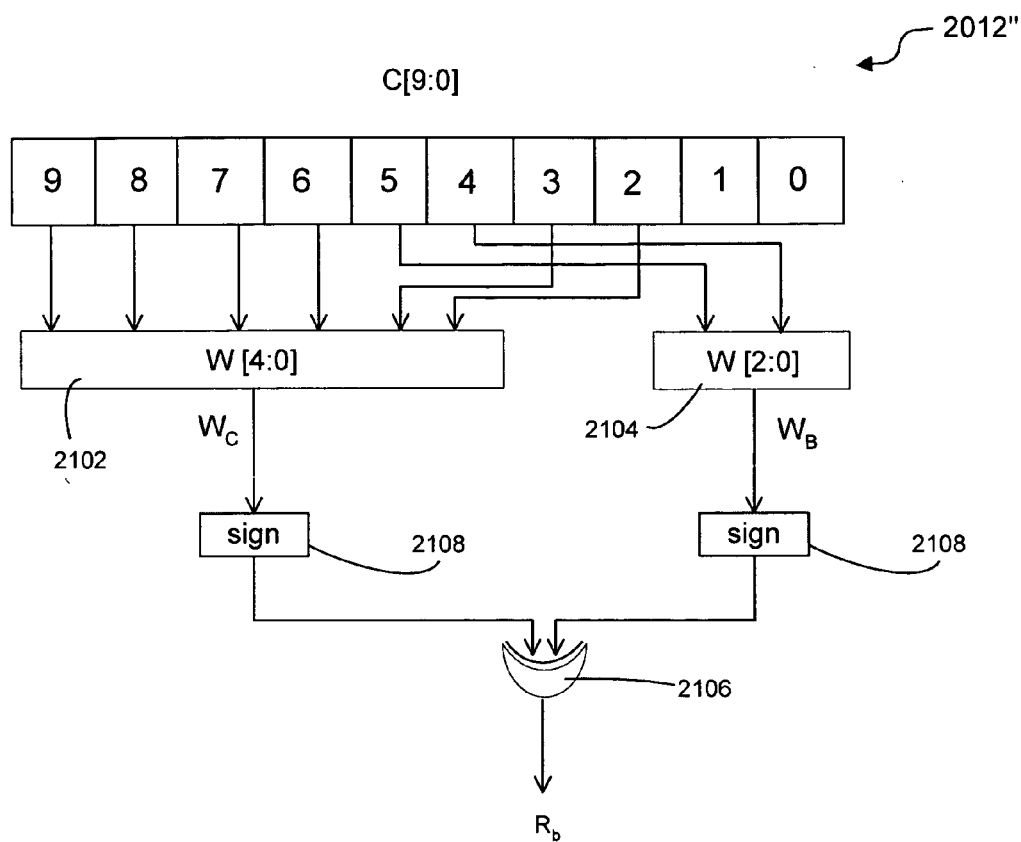
FIG. 29 shows a more detailed view of the modified version of the requiring logic of FIG. 21 shown in FIG. 28 in accordance with an embodiment of the present disclosure.

Referring to FIG. 29, there is shown a more detailed view of the modified version 2012" of the requiring logic 2012 of FIG. 21 shown in FIG. 28 in accordance with an embodiment of the present disclosure. As shown in FIG. 29, the modified version 2012" of the requiring logic 2012 of FIG. 21 shown in FIG. 28 is similar to the requiring logic 2012 of FIG. 21 with the exception that (since x=3) the first weight calculator 2102 has bits C[9:6,3:2] as inputs and the second weight calculator 2104 has bits C[5:4] as inputs.

Figure 30:
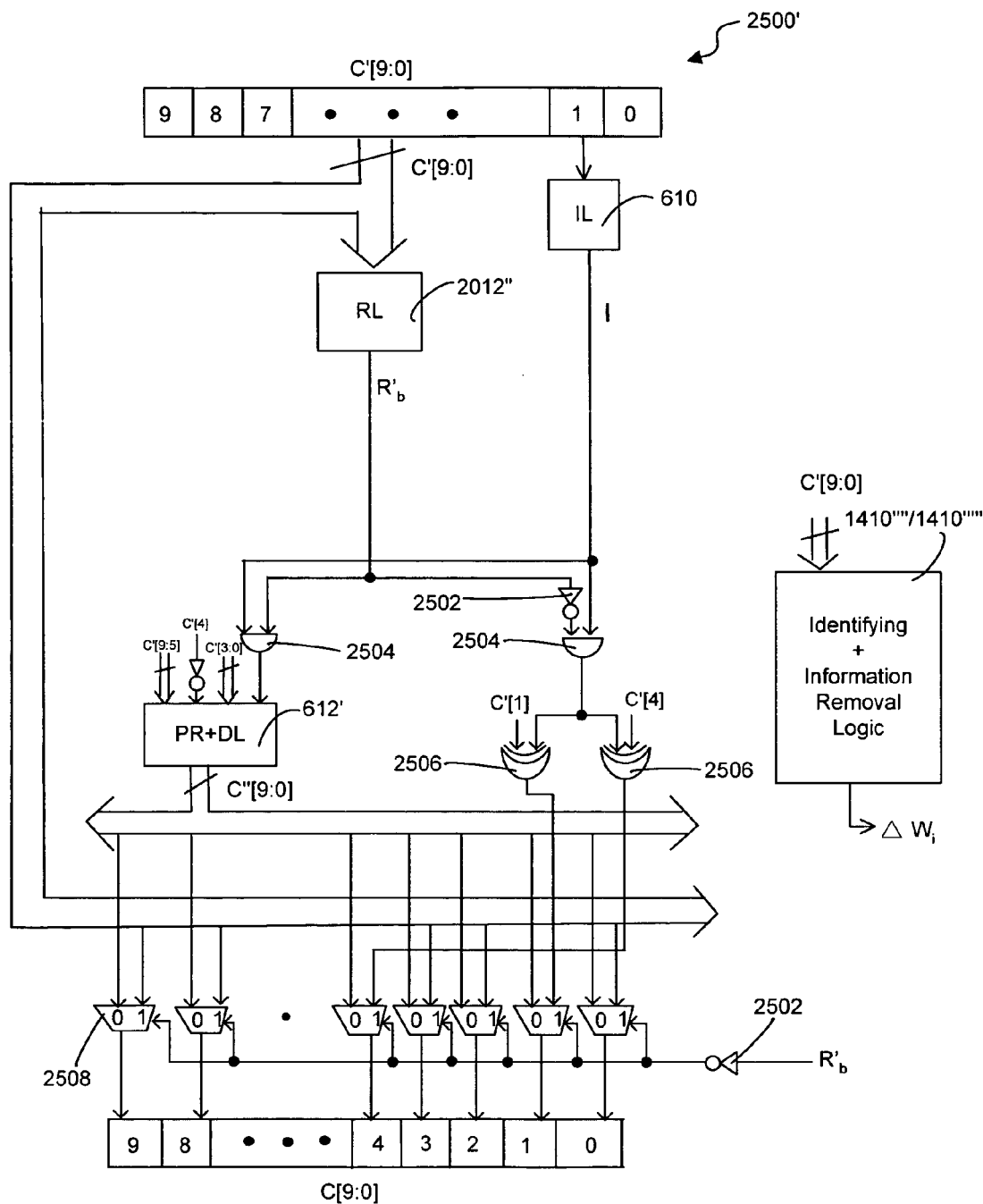
FIG. 30 shows combined DC voltage balancing and backchannel information transfer decoder circuitry for use with the combined DC voltage balancing and backchannel information transfer encoder circuitry of FIG. 28 in accordance with an embodiment of the present disclosure.

Referring to FIG. 30, there is shown combined DC voltage balancing and backchannel information transfer decoder circuitry 2500' for use with the combined DC voltage balancing and backchannel information transfer encoder circuitry 2400' of FIG. 28 in accordance with an embodiment of the present disclosure. The decoder circuitry 2500' of FIG. 30 is similar to the decoder circuitry 2500 of FIG. 26 with the exception that the decoder circuitry 2500' of FIG. 30 comprises the modified version 2012" of the requiring logic 2012 of FIG. 21 as shown in FIG. 29, and the decoder circuitry 2500' of FIG. 30 comprises one of two modified versions 1410"" or 1410""" of the identifying condition and information removal logic 1410 of FIG. 15A.

Figure 32:
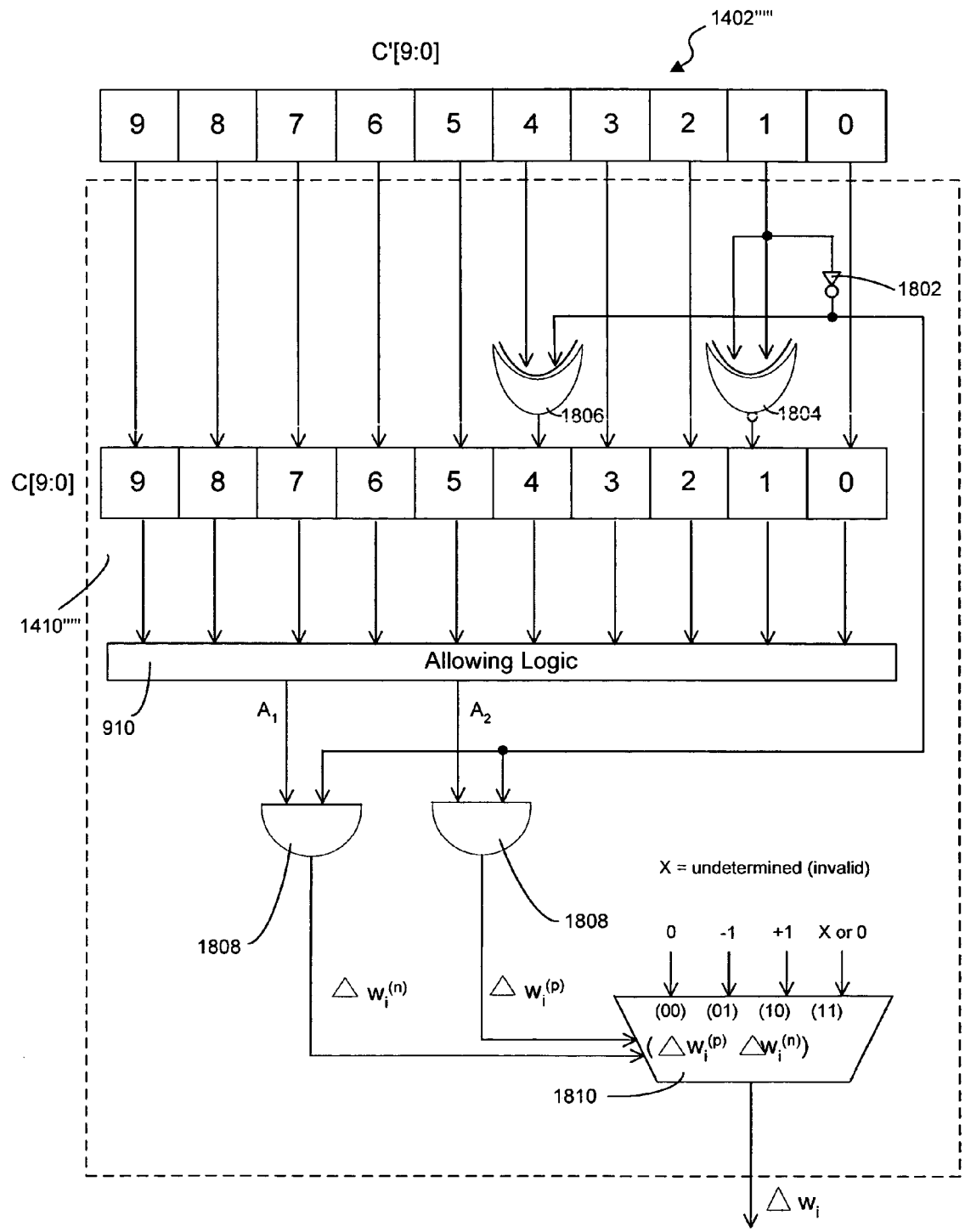
FIG. 32 shows a more detailed view of another alternative exemplary embodiment of the identifying condition and information removal logic of FIG. 30.

At this point it should be noted that when using the identifying condition and information removal logic 1410"" of FIG. 32 in the decoder circuitry 2500' of FIG. 30, and the decoder circuitry 2500' of FIG. 30 is used with the combined DC voltage balancing and backchannel information transfer encoder circuitry 2400' of FIG. 28, the combined DC voltage balancing and backchannel information transfer encoder circuitry 2400' of FIG. 28 must receive an inverted version of the transmitter equalizer coefficient adjustment information (i.e., $\Delta W_i$, wherein i=1, 2, 3, . . . ).

Figure 31:
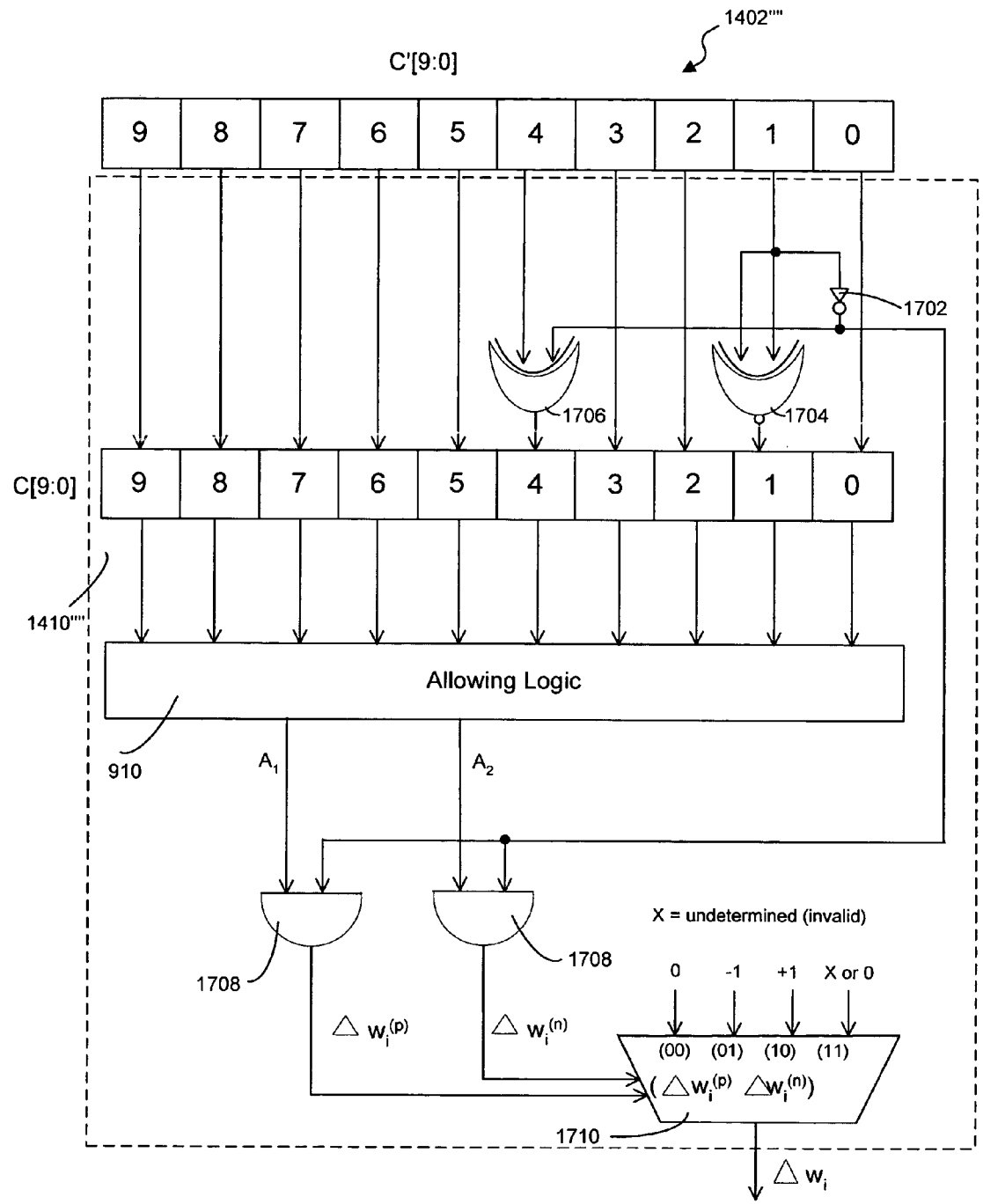
FIG. 31 shows a more detailed view of an alternative exemplary embodiment of the identifying condition and information removal logic of FIG. 30.

Referring to FIG. 31, there is shown an information transfer decoder 1402"" comprising the modified version 1410"" of the identifying condition and information removal logic 1410 of FIG. 15A shown in FIG. 30. The identifying condition and information removal logic 1410"" of FIG. 31 is similar to the identifying condition and information removal logic 1410" of FIG. 17 with the exception that the identifying condition and information removal logic 1410"" of FIG. 31 comprises the allowing condition logic 910 of FIG. 10 instead of the allowing condition logic 918 of FIG. 12.

Referring to FIG. 32, there is shown an information transfer decoder 1402"" comprising the modified version 1410""" of the identifying condition and information removal logic 1410 of FIG. 15A shown in FIG. 30. The identifying condition and information removal logic 1410""" of FIG. 32 is similar to the identifying condition and information removal logic 1410''' of FIG. 18 with the exception that the identifying condition and information removal logic 1410""" of FIG. 32 comprises the allowing condition logic 910 of FIG. 10 instead of the allowing condition logic 918 of FIG. 12.

At this point it should be noted that utilizing spare bandwidth resulting from the use of transition-limiting codes in multi-PAM signaling systems in accordance with the present disclosure as described above may involve the processing of input data and the generation of output data to some extent. This input data processing and output data generation may be implemented in hardware or software. For example, as described above, specific electronic components may be employed in an encoder, decoder, or other similar or related circuitry for implementing the functions associated with utilizing spare bandwidth resulting from the use of transition-limiting codes in multi-PAM signaling systems in accordance with the present disclosure as described above. Alternatively, one or more processors operating in accordance with stored instructions may implement the functions associated with utilizing spare bandwidth resulting from the use of transition-limiting codes in multi-PAM signaling systems in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various modifications of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for utilizing spare bandwidth resulting from the use of a transition-limiting code in a multi-level signaling system, the transition-limiting code having a characteristic wherein at least one signal level is periodically unused, the method comprising the step of:
utilizing the at least one periodically unused signal level in a codeword that has been encoded using the transition-limiting code so as to represent additional information in the multi-level signaling system.

2. The method of claim 1, wherein the codeword is formed by encoding digital values represented by sets of N bits to provide corresponding sets of P symbols.

3. The method of claim 2, wherein each set of P symbols is formed with Q bits, wherein Q is greater than N.

4. The method of claim 3, wherein N=8 and Q=10.

5. The method of claim 4, wherein each symbol represents two bits.

6. The method of claim 1, further comprising the step of:
changing the polarity of the codeword so as to provide a DC balancing property to the transition-limiting code.

7. The method of claim 6, wherein the polarity of the codeword is changed so as not to violate a transition-limiting property of the transition-limiting code.

8. The method of claim 6, wherein the polarity of the codeword is changed by reversing the polarity of the codeword.

9. The method of claim 6, wherein the step of utilizing comprises:
changing the logic state of at least one bit of the codeword so as to provide an indicator of such polarity change.

10. The method of claim 9, wherein the logic state of the at least one bit of the codeword is changed so as not to violate a transition-limiting property of the transition-limiting code.

11. The method of claim 1, wherein the step of utilizing comprises:
changing the logic state of at least one bit of the codeword so as to represent the additional information.

12. The method of claim 11, wherein the logic state of the at least one bit of the codeword is changed so as not to violate a transition-limiting property of the transition-limiting code.

13. The method of claim 11, wherein the additional information comprises transmitter equalizer coefficient adjustment information.

14. The method of claim 1, further comprising the step of:
transmitting the codeword that utilizes the at least one periodically unused signal level to represent additional information in the multi-level signaling system.

15. The method of claim 14, wherein the codeword is transmitted at four signal levels on a single transmission medium.

16. The method of claim 15, wherein the single transmission medium comprises a single electrical conductor.

17. The method of claim 15, wherein the single transmission medium comprises a differential pair of electrical conductors.

18. The method of claim 15, wherein the single transmission medium comprises an optical fiber.

19. The method of claim 14, further comprising the steps of:
receiving the transmitted codeword; and
detecting the additional information in the received codeword.

20. The method of claim 19, further comprising the step of:
removing the additional information from the received codeword so as to return the codeword to an original state.

21. The method of claim 20, further comprising the step of:
decoding the received codeword after the additional information is removed.

22. At least one signal embodied in at least one carrier wave for transmitting a computer program of instructions configured to be readable by at least one processor for instructing the at least one processor to execute a computer process for performing the method as recited in claim 1.

23. At least one processor readable carrier for storing a computer program of instructions configured to be readable by at least one processor for instructing the at least one processor to execute a computer process for performing the method as recited in claim 1.

24. An apparatus for utilizing spare bandwidth resulting from the use of a transition-limiting code in a multi-level signaling system, the transition-limiting code having a characteristic wherein at least one signal level is periodically unused, the apparatus comprising:
an encoder configured to utilize the at least one periodically unused signal level in a codeword that has been encoded using the transition-limiting code so as to represent additional information in the multi-level signaling system.

25. The apparatus of claim 24, wherein the codeword is formed by encoding digital values represented by sets of N bits to provide corresponding sets of P symbols.

26. The apparatus of claim 25, wherein each set of P symbols is formed with Q bits, wherein Q is greater than N.

27. The apparatus of claim 26, wherein N=8 and Q=10.

28. The apparatus of claim 27, wherein each symbol represents two bits.

29. The apparatus of claim 24, wherein the encoder also changes the polarity of the codeword so as to provide a DC balancing property to the transition-limiting code.

30. The apparatus of claim 29, wherein the polarity of the codeword is changed so as not to violate a transition-limiting property of the transition-limiting code.

31. The apparatus of claim 29, wherein the polarity of the codeword is changed by reversing the polarity of the codeword.

32. The apparatus of claim 29, wherein the encoder utilizes the at least one periodically unused signal level in the codeword by changing the logic state of at least one bit of the codeword so as to provide an indicator of such polarity change.

33. The apparatus of claim 32, wherein the logic state of the at least one bit of the codeword is changed so as not to violate a transition-limiting property of the transition-limiting code.

34. The apparatus of claim 24, wherein the encoder utilizes the at least one periodically unused signal level in the codeword by changing the logic state of at least one bit of the codeword so as to represent the additional information.

35. The apparatus of claim 34, wherein the logic state of the at least one bit of the codeword is changed so as not to violate a transition-limiting property of the transition-limiting code.

36. The apparatus of claim 34, wherein the additional information comprises transmitter equalizer coefficient adjustment information.

37. The apparatus of claim 24, further comprising:
   a transmitter configured to transmit the codeword that utilizes the at least one periodically unused signal level to represent additional information in the multi-level signaling system.

38. The apparatus of claim 37, wherein the codeword is transmitted at four signal levels on a single transmission medium.

39. The apparatus of claim 38, wherein the single transmission medium comprises a single electrical conductor.

40. The apparatus of claim 38, wherein the single transmission medium comprises a differential pair of electrical conductors.

41. The apparatus of claim 38, wherein the single transmission medium comprises an optical fiber.

42. The apparatus of claim 37, further comprising:
   a receiver configured to receive the transmitted codeword; and
   a detector configured to detect the additional information in the received codeword.

43. The apparatus of claim 42, wherein the detector is also configured to remove the additional information from the received codeword so as to return the codeword to an original unutilized state.

44. The apparatus of claim 43, further comprising:
   a decoder configured to decode the received codeword after the additional information is removed.

45. An apparatus for utilizing spare bandwidth resulting from the use of a transition-limiting code in a multi-level signaling system, the transition-limiting code having a characteristic wherein at least one signal level is periodically unused, the apparatus comprising:
   means for utilizing the at least one periodically unused signal level in a codeword that has been encoded using the transition-limiting code so as to represent additional information in the multi-level signaling system.

* * * * *